US007241853B2

(12) United States Patent
King et al.

(10) Patent No.: US 7,241,853 B2
(45) Date of Patent: Jul. 10, 2007

(54) PRINTING PROCESSES EMPLOYING INTERMEDIATE TRANSFER WITH MOLTEN INTERMEDIATE TRANSFER MATERIALS

(75) Inventors: Clifford R. King, Hendersonville, NC (US); Wolfgang G. Wedler, Tualatin, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/430,747

(22) Filed: May 9, 2006

(65) Prior Publication Data

US 2006/0204768 A1 Sep. 14, 2006

Related U.S. Application Data

(62) Division of application No. 10/679,240, filed on Oct. 3, 2003, now Pat. No. 7,128,412.

(51) Int. Cl.
*C08G 77/04* (2006.01)

(52) U.S. Cl. .......................... 528/31; 524/588; 528/35; 528/26; 528/28; 528/29; 522/99; 522/148

(58) Field of Classification Search .................. 528/31, 528/35, 26, 28, 29; 524/588; 522/99, 148
See application file for complete search history.

(56) References Cited

U.S. PATENT DOCUMENTS

| | | | |
|---|---|---|---|
| 3,454,137 | A | 7/1969 | Krebs et al. |
| 3,810,776 | A | 5/1974 | Banks et al. |
| 3,941,085 | A | 3/1976 | Hattler et al. |
| 4,049,792 | A | 9/1977 | Elsnan |
| 4,063,585 | A | 12/1977 | Thettu et al. |
| 4,065,585 | A | 12/1977 | Jelfo et al. |
| 4,083,956 | A | 4/1978 | Shelton |
| 4,126,679 | A | 11/1978 | Dary et al. |
| 4,185,140 | A | 1/1980 | Strella et al. |
| 4,218,250 | A | 8/1980 | Kasprzak |
| 4,258,095 | A | 3/1981 | Larson et al. |
| 4,265,878 | A | 5/1981 | Keil |
| 4,268,499 | A | 5/1981 | Keil |
| 4,311,695 | A | 1/1982 | Starch |
| 4,538,156 | A | 8/1985 | Durkee et al. |
| 4,745,420 | A | 5/1988 | Gerstenmaier |
| 4,853,474 | A | 8/1989 | Bahr et al. |
| 4,889,761 | A | 12/1989 | Titterington et al. |
| 5,051,489 | A | 9/1991 | O'Lenick, Jr. |
| 5,070,168 | A | 12/1991 | O'Lenick, Jr. |
| 5,070,171 | A | 12/1991 | O'Lenick, Jr. |
| 5,099,256 | A | 3/1992 | Anderson |
| 5,102,656 | A | 4/1992 | Kasat |
| 5,122,519 | A | 6/1992 | Ritter |
| 5,136,063 | A | 8/1992 | O'Lenick, Jr. |
| 5,136,068 | A | 8/1992 | Bahr et al. |
| 5,159,096 | A | 10/1992 | Austin et al. |
| 5,164,471 | A | 11/1992 | O'Lenick, Jr. |
| 5,195,430 | A | 3/1993 | Rise |
| 5,225,188 | A | 7/1993 | Abrutyn et al. |
| 5,235,017 | A | 8/1993 | O'Lenick, Jr. |
| 5,260,401 | A | 11/1993 | O'Lenick, Jr. |
| 5,300,299 | A | 4/1994 | Sweet et al. |
| 5,316,692 | A | 5/1994 | John |
| 5,362,485 | A | 11/1994 | Hayama et al. |
| 5,372,852 | A | 12/1994 | Titterington et al. |
| 5,389,958 | A | 2/1995 | Bui et al. |
| 5,446,114 | A | 8/1995 | O'Lenick, Jr. |

(Continued)

FOREIGN PATENT DOCUMENTS

| | | |
|---|---|---|
| EP | 0 639 969 B1 | 6/1996 |
| EP | 0 842 996 | 5/1998 |
| EP | 0 769 290 | 12/2001 |
| EP | 0 719 836 B1 | 8/2002 |
| EP | 0 853 470 | 12/2002 |
| EP | 0 582 152 B1 | 4/2003 |

(Continued)

OTHER PUBLICATIONS

English abstract for European Patent Publication EP 0 714 275.
English abstract for French Patent 2,756,176.
English abstract for German Patent Publication DE 19,749,380.
German Patent Publication 19,627,022.
English abstract for French Patent Publication FR 2 755 695.

(Continued)

*Primary Examiner*—Margaret G. Moore
(74) *Attorney, Agent, or Firm*—Judith L. Byorick

(57) ABSTRACT

A block of intermediate transfer material for use in a printing apparatus having an intermediate transfer member, said intermediate transfer member being equipped with a heater to heat said intermediate transfer member to a temperature of at least about 40° C., said intermediate transfer member having a surface with a first shape, a marking material applicator situated to apply marking material in an imagewise pattern to the intermediate transfer member, and a transferring apparatus to transfer the imagewise pattern of marking material to a final recording substrate, said block of intermediate transfer material comprising a silicone polymer containing monomers of the formula

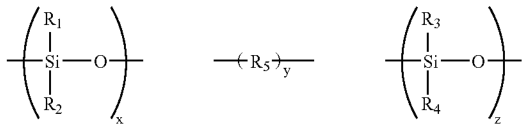

wherein $R_1$, $R_2$, $R_3$, $R_4$, $R_5$, x, y, and z are as defined herein, wherein the monomers can be directly bonded to each other or bonded through spacer groups, said block of intermediate transfer material having a surface with a second shape substantially the complement of the first shape.

45 Claims, 4 Drawing Sheets

U.S. PATENT DOCUMENTS

| | | | |
|---|---|---|---|
| 5,473,038 A | 12/1995 | O'Lenick, Jr. | |
| 5,493,041 A | 2/1996 | Biggs et al. | |
| 5,502,476 A | 3/1996 | Neal et al. | |
| 5,614,933 A | 3/1997 | Hindman et al. | |
| 5,620,942 A | 4/1997 | Kung et al. | |
| 5,623,296 A | 4/1997 | Fujino et al. | |
| 5,645,888 A | 7/1997 | Titterington et al. | |
| 5,648,066 A | 7/1997 | Stepniewski | |
| 5,670,686 A | 9/1997 | Cobb et al. | |
| 5,744,529 A | 4/1998 | Butler et al. | |
| 5,760,145 A | 6/1998 | Herzig et al. | |
| 5,761,597 A | 6/1998 | Smith et al. | |
| 5,790,160 A | 8/1998 | Reeves et al. | |
| 5,805,191 A | 9/1998 | Jones et al. | |
| 5,939,491 A | 8/1999 | Wilt et al. | |
| 5,958,169 A | 9/1999 | Titterington et al. | |
| 5,976,517 A | 11/1999 | Dubief et al. | |
| 5,981,679 A | 11/1999 | Taker et al. | |
| 6,007,800 A | 12/1999 | Dubief et al. | |
| 6,042,227 A | 3/2000 | Meinhardt et al. | |
| 6,059,407 A | 5/2000 | Komatsu et al. | |
| 6,060,205 A | 5/2000 | Takeichi et al. | |
| 6,084,049 A * | 7/2000 | Beach et al. | 528/15 |
| 6,086,862 A | 7/2000 | Dubief et al. | |
| 6,090,376 A | 7/2000 | Dubief et al. | |
| 6,110,264 A | 8/2000 | Banning et al. | |
| 6,132,707 A | 10/2000 | Dubief et al. | |
| 6,165,444 A | 12/2000 | Dubief et al. | |
| 6,193,366 B1 | 2/2001 | Thomas et al. | |
| 6,201,058 B1 | 3/2001 | Mahr et al. | |
| 6,211,322 B1 | 4/2001 | Dohler et al. | |
| 6,218,445 B1 | 4/2001 | Priou et al. | |
| 6,271,309 B1 | 8/2001 | Robert et al. | |
| 6,295,438 B1 | 9/2001 | Fujishiro et al. | |
| 6,354,700 B1 | 3/2002 | Roth | |
| 6,354,701 B2 | 3/2002 | Korem | |
| 6,432,418 B1 | 8/2002 | Dubief et al. | |
| 6,444,018 B1 | 9/2002 | King et al. | |
| 6,458,461 B1 * | 10/2002 | Blair et al. | 428/447 |
| 6,481,840 B1 | 11/2002 | Mueller et al. | |
| 6,540,345 B1 | 4/2003 | Wagner et al. | |
| 6,837,578 B2 | 1/2005 | Tanikawa et al. | |
| 6,894,137 B2 * | 5/2005 | Pickering | 528/38 |
| 2001/0055052 A1 | 12/2001 | Mueller et al. | |
| 2002/0028218 A1 | 3/2002 | Dubief et al. | |
| 2003/0038871 A1 | 2/2003 | Shinkoda et al. | |
| 2004/0246318 A1 | 12/2004 | Askren et al. | |
| 2005/0025520 A1 | 2/2005 | Murakami et al. | |
| 2005/0074260 A1 | 4/2005 | King et al. | |

FOREIGN PATENT DOCUMENTS

| | | |
|---|---|---|
| WO | WO 93/23009 | 11/1993 |
| WO | WO 95/03776 | 2/1995 |
| WO | WO 97/12584 | 4/1997 |
| WO | WO 97/12585 | 4/1997 |
| WO | WO 97/12586 | 4/1997 |
| WO | WO 97/12587 | 4/1997 |
| WO | WO 97/12588 | 4/1997 |
| WO | WO 97/12592 | 4/1997 |
| WO | WO 97/12593 | 4/1997 |
| WO | WO 97/12596 | 4/1997 |
| WO | WO 97/14400 | 4/1997 |
| WO | WO 98/03574 | 1/1998 |
| WO | WO 98/07798 | 2/1998 |
| WO | WO 99/06487 | 2/1999 |
| WO | WO 00/59992 | 10/2000 |
| WO | WO 01/09250 A1 | 2/2001 |

OTHER PUBLICATIONS

English abstract for German Patent Publication DE 19 746 909.

English abstract for German Patent Publication DE 19 711 694.

English abstract for European Patent Publication EP 0 916 702.

English abstract for Japanese Patent Publication JP 11140090.

English abstract for European Patent Publication EP 0 903 385.

English abstract for Japanese Patent Publication JP 11236532.

English abstract for European Patent Publication EP 0 940 422.

English abstract for European Patent Publication EP 0 940 458.

English abstract for Japanese Patent Publication JP 10060377.

English abstract for Japanese Patent Publication JP 11021326.

D. W. Butler, "Low Coefficient of Friction Additives for Overprint Varnishes," *Radcure Coat. Inks: Appl. Perform., [Conf. Pap.]*, 1996, Paper 7.

D. W. Butler, "Low Coefficient of Friction Additives for Overprint Varnishes," *Surf. Coatings Int.* 5 (1997) 230-234.

D. W. Butler, "Low Coefficient of Friction Additives for Overprint Varnishes," *PPCJ, Polym. Paint Colour J.* 1997, 187 (4397), S8-S10.

J. D. Greene, "Polysiloxanes for High-Temperature-Resistant Powder Coatings,"*Paint & Coatings Industry* Feb. 1998, 65-72.

A. J. O'Lenick, Jr. and J. K. Parkinson, "Silanol Esters: A New Series of Intermediate transfer Compounds," *Soap/Costmetic/ Chemical Specialties* Aug. 1994, 50-54.

"Silicone Surfactants, Fluids, Emulsions Antifoams & Specialties," Product Information Brochure, Siltech, Inc. (Georgia), 1996.

"Information About Dow Corning® 190 and 193 Surfactants".

"Information About Dow Corning® 2-5220 Resin Modifier".

"Information About Dow Corning® 5200 Formulation Aid".

"Information About Dow Corning® 2503 Wax".

"Information About Dow Corning® 3225C Formulation Aid".

"Product Information: Paints, Inks & Coatings, Dow Corning® 31 Additive".

* cited by examiner

PRINTING PROCESSES EMPLOYING INTERMEDIATE TRANSFER WITH MOLTEN INTERMEDIATE TRANSFER MATERIALS

This application is a divisional of application U.S. Ser. No. 10/679,240, filed Oct. 3, 2003, now U.S. Pat. No. 7,128,412, the disclosure of which is totally incorporated herein by reference.

CROSS-REFERENCES TO COPENDING APPLICATIONS

Copending application U.S. Ser. No. 10/679,053, filed Oct. 3, 2003, U.S. Publication 20050074260, entitled "Printing Apparatus and Processes Employing Intermediate Transfer with Molten Intermediate Transfer Materials," with the named inventors Clifford R. King and Wolfgang G. Wedler, the disclosure of which is totally incorporated herein by reference, discloses a printing apparatus for applying a marking material to a final substrate, said printing apparatus comprising an intermediate transfer member; an intermediate transfer material applicator for transferring intermediate transfer material from a solid block of intermediate transfer material to form a molten layer of intermediate transfer material on the intermediate transfer member; a marking material applicator situated to apply marking material in an imagewise pattern to the molten layer of intermediate transfer material on the intermediate transfer member; and a transferring apparatus to transfer the imagewise pattern of marking material to a final recording substrate.

BACKGROUND

Disclosed herein are printing processes employing intermediate transfer members. More specifically, disclosed herein are printing processes wherein a molten layer of an intermediate transfer material is applied to the surface of an intermediate transfer member, followed by printing upon the molten intermediate transfer material layer and transferring the printed image to a final substrate. One specific embodiment is directed to a block of intermediate transfer material for use in a printing apparatus having (a) an intermediate transfer member; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

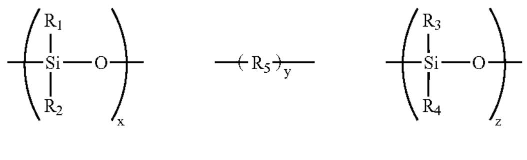

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_2$ has at least about 12 carbon atoms, wherein $R_1+R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others, are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape, wherein the second shape is substantially the complement of the first shape.

Printing systems typically employ either a direct printing process, in which the marking material is applied directly to the final substrate (such as paper, transparency stock, or the like) or an indirect or offset printing transfer system, in which the marking material is first applied in an imagewise pattern to an intermediate transfer member and the marking material in the imagewise pattern is subsequently transferred from the intermediate transfer member to a final recording substrate.

In phase change ink printing systems, including phase change ink jet printing systems, wherein the ink is typically a solid at room temperature and is melted to a temperature above its melting point prior to being jetted in droplets onto a substrate, both direct processes and indirect processes are known. In direct printing phase change ink jet processes, droplets of the melted ink are ejected in an imagewise pattern onto a recording substrate which is a final recording substrate. Direct printing processes are disclosed in, for example, U.S. Pat. No. 5,195,430, U.S. Pat. No. 4,745,420, U.S. Pat. No. 4,889,761, and U.S. Pat. No. 5,761,597, the disclosures of each of which are totally incorporated herein by reference. In indirect (offset) printing phase change ink jet applications, droplets of the melted ink are ejected in an imagewise pattern onto a recording substrate which is an intermediate transfer member, and the ink in the imagewise pattern is subsequently transferred from the intermediate transfer member to a final recording substrate. Offset or indirect printing processes are disclosed in, for example, U.S. Pat. No. 5,389,958, U.S. Pat. No. 5,099,256, and U.S. Pat. No. 4,538,156, the disclosures of each of which are totally incorporated herein by reference.

When indirect or offset printing methods are used with phase change ink jet printing processes, it is known to apply a liquid to the intermediate transfer member prior to printing thereon. The liquid forms a layer which performs as a release agent or as a sacrificial layer to enhance performance. Examples of liquids used include water, fluorinated oil, glycol, surfactant, mineral oil, silicone oils, intermediate transfer oil, functional oil (such as mercapto-intermediate transfer oils, fluorinated intermediate transfer oils, and the like), and combinations thereof.

Intermediate transfer oils in particular are known for such processes. A uniform coating of intermediate transfer oil is applied to the intermediate transfer member prior to the deposition of ink in an imagewise pattern. The intermediate transfer oil provides a means for efficient transfer of the ink image on the intermediate transfer member to the final substrate. Film splitting usually occurs at the intermediate transfer oil layer and not within the ink. Pixel picking, ink delamination, and ink cohesive failure are all undesired failure mechanisms during the printing process and can be avoided by the use of intermediate transfer oil.

Intermediate transfer oil, however, has certain limitations and disadvantages. The liquid oil must be dispensed evenly to the intermediate transfer member. In addition, the liquid in the intermediate transfer member maintenance cartridge is susceptible to leakage during shipping. Further, the oil is not completely transferred to the printed article. Additionally, the oil on the printed article is mobile, and wipes off, wears off, or wicks into the printed article. The oil also serves no function other than film splitting during the process of transferring the image from the intermediate transfer member to the final substrate.

U.S. Pat. No. 6,444,018, the disclosure of which is totally incorporated herein by reference, discloses a phase change ink carrier composition comprising at least one anhydride/amino alcohol based adduct which is a reaction product of at least one anhydride and at least one amino alcohol, wherein the reaction product is an ester material or an amide material, but not an ester-amide material.

U.S. Pat. No. 6,110,264, the disclosure of which is totally incorporated herein by reference, discloses a phase change ink carrier composition comprising at least one anhydride/alcohol inclusive reaction product.

U.S. Pat. No. 6,042,227, the disclosure of which is totally incorporated herein by reference, discloses a phase change ink carrier composition which includes a Diels-Alder polymerization precursor wherein the composition forms a low viscosity liquid at temperatures in the range from about 90° C. to at least about 160° C., and forms a malleable material at temperatures from about 40° C. to about 80° C., and a solid at temperatures less than about 30° C.

U.S. Pat. No. 5,389,958, the disclosure of which is totally incorporated herein by reference, discloses a method and the apparatus for employing the method whereby an intermediate transfer surface of a layer of sacrificial liquid is applied to a supporting surface and a phase change ink is deposited on the liquid layer. The inked image is then contact transferred to a final receiving substrate.

U.S. Pat. No. 5,372,852, the disclosure of which is totally incorporated herein by reference, discloses a process wherein a phase change ink composition is indirectly applied to a substrate by raising the temperature of the phase change ink composition to form a liquid phase change ink composition, applying droplets of the phase change ink composition in a liquid phase to a liquid intermediate transfer surface on a solid support in a pattern using a device such as an ink jet printhead, solidifying the phase change ink composition on the liquid intermediate transfer surface, transferring the phase change ink composition from the liquid intermediate transfer surface to the substrate, and fixing the phase change ink composition to the substrate. The phase change ink composition is malleable when the ink is transferred from the intermediate transfer surface to the substrate and is ductile after the ink has been transferred to the substrate and cooled to ambient temperature to preclude the ink from crumbling and cracking.

U.S. Pat. No. 5,805,191, the disclosure of which is totally incorporated herein by reference, discloses an apparatus and method for applying an intermediate transfer surface, in the form of a liquid layer, on a support surface as may be used in a phase change ink printing system. The apparatus includes an applicator assembly for distributing the liquid layer onto the support surface to produce the intermediate transfer surface and an apparatus for metering the liquid layer uniformly on the support surface. The applicator assembly has a contact medium for removing foreign matter from and delivering the liquid onto the support surface. Preferably the contact medium is a liquid impregnated web that is periodically incremented to present a clean web surface in contact with the support surface. The metering apparatus is a hydrodynamic blade that uniformly distributes the liquid intermediate transfer layer over the support surface. The apparatus provides for sequencing of the applicator, then the applicator and the blade together, and finally the blade only to ensure proper application of the intermediate transfer layer and cleaning of the support surface.

U.S. Pat. No. 5,790,160, the disclosure of which is totally incorporated herein by reference, discloses a method and an apparatus for processing an image transparency that entails the application of an intermediate transfer surface of a layer of sacrificial liquid to a supporting surface and the deposition of a phase change ink onto the liquid layer. The inked image is then contact transferred to an optically transmissive final receiving substrate, such as a plastic transparency.

U.S. Pat. No. 6,007,800 and WO 97/12585, the disclosures of each of which are totally incorporated herein by reference, disclose a composition for the treatment of keratinous material, in particular human hair, comprising, in a cosmetically or dermatologically acceptable medium, at least one grafted intermediate transfer polymer, containing a polysiloxane skeleton grafted with non-intermediate transfer organic monomers and at least one hydrocarbon which is liquid at room temperature, the hydrocarbon chain of which has from 11 to 26 linear or branched, cyclic or acyclic carbon atoms, as well as its applications. The compositions according to the invention are used in particular as rinse-out products or as leave-in products, in particular for the washing, care and conditioning of the hair, for maintaining the hairstyle or for shaping the hairstyle.

U.S. Pat. No. 5,976,517 and WO 97/12596, the disclosures of each of which are totally incorporated herein by reference, disclose a cosmetic or dermatological composition for treating keratinous material, particularly human hair, including a cosmetically or dermatologically acceptable medium containing at least one anionic, amphoteric or non-ionic- intermediate transfer-grafted polymer with a polysiloxane backbone grafted by non-intermediate transfer organic monomers, and at least one amphoteric polymer, wherein the ratio of the amphoteric polymer to the intermediate transfer-grafted polymer is 0.25-15. Such compositions are particularly suitable for use as rinsable or non-rinsable products for washing and conditioning hair, hair setting or hair styling.

U.S. Pat. No. 6,132,707 and WO 97/12586, the disclosures of each of which are totally incorporated herein by reference, disclose a cosmetic or dermatological composition for treating keratinous material, particularly human hair, including a cosmetically or dermatologically acceptable medium containing at least one intermediate transfer-grafted polymer with a polysiloxane backbone grafted by non-intermediate transfer organic monomers and at least one amphiphilic polymer comprising at least one fatty chain and at least one hydrophilic unit. Such compositions are particularly suitable for use as rinsable or non-rinsable products for washing and conditioning hair, hair setting or hair styling.

U.S. Pat. No. 5,648,066 and WO 97/12584, the disclosures of each of which are totally incorporated herein by reference, disclose solid intermediate transfer compositions comprising low molecular weight polyethylene solidifying agents and one or more non-volatile intermediate transfer fluids, along with a method for their preparation. The compositions are suitable for topical application to skin or hair, and are particularly useful in the preparation of novel skin treatment, hair treatment, lipstick and makeup products.

U.S. Pat. No. 5,670,686, the disclosure of which is totally incorporated herein by reference, discloses alkyl substituted siloxanes and alkyl substituted polyether fluids prepared by reacting an unsaturated alkyl, a aralkyl or ether with alkylhydrido siloxanes such as (i) comonomers $RSi(OSiMe_2H)_3$, (ii) oligomers $(HMe_2SiO)_2$—Si(R)—O—Si(R)—$(OSiMe_2H)_2$, and (iii) higher molecular weight siloxane species $RSi[(OSiMe_2)_xOSiMe_2H]_3$ and $[HMe_2SiO(Me_2SiO)_x]_2Si(R)O(R)Si[(OSiMe_2)_xOSiMe_2H]_2$. R is a $C_2$ to $C_{18}$ straight-chain or branched-chain alkyl substituent.

U.S. Pat. No. 5,493,041, the disclosure of which is totally incorporated herein by reference, discloses that the crosslinking and simultaneous alkylation of poly(hydridomethylsiloxanes) form crosslinked siloxanes having n-alkylmethyl groups. Without changing the chain length of the poly(hydridomethylsiloxane) starting material, a family of lightly crosslinked siloxanes having n-alkylmethyl groups, with a range of viscosities, can be produced using one or more alpha-olefins along with a small amount of an unconjugated alpha, omega-diene added as a crosslinker. The poly(hydridomethyl siloxanes) are made from highly pure silanol-free hexamethyldisiloxane and highly pure mixtures of silanol-free tetramethylcyclotetrasiloxane ($D^H{}_4$) and pentamethylcyclopentasiloxane $D^H5$ containing no more than about 100 parts per million (ppm) water, with anhydrous trifluoromethane sulfonic acid (triflic acid, $CF_3SO_3H$), at room temperature, to provide linear poly(hydridomethylsiloxanes) having degrees of polymerization of up to about 250.

U.S. Pat. No. 5,744,529 and EP 0 719 836, the disclosures of each of which are totally incorporated herein by reference, disclose a curable composition comprising a polysiloxane additive having at least one unit $R_aSiO_{(4-a)/2}$ and at least one unit $R_bR^1SiO_{(3-b)/2}$ wherein R is a $C_{1-12}$ hydrocarbon, $R^1$ is $—(CH_2)_n(OR^2)_mX$ where $R^2$ is $C_{2-3}$ alkylene, a is 0, 1, 2 or 3 and b is 0, 1 or 2 and X is OH or $—OCOCR^3{=}CH_2$ where $R^3$ is H, methyl or ethyl, n is 2 to 5 and m is 8 to 50, provided where X is OH, n is 3 and m is 18. The compositions are useful with polyacrylates as overprint varnishes with improved stability of friction coefficients. Also disclosed is a method for making the additives.

U.S. Pat. No. 4,049,792, the disclosure of which is totally incorporated herein by reference, discloses an antiperspirant composition in the form of a stick comprising from about 1 percent to about 20 percent of a water-insoluble wax, from about 20 percent to about 50 percent of an essentially water-insoluble, but water-dispersible, liquid emollient, and from about 30 percent to about 60 percent of an active aluminum or zirconium astringent antiperspirant salt in the form of finely divided particles, said composition being essentially water-insoluble with the exception of the active particles.

U.S. Pat. No. 4,083,956, the disclosure of which is totally incorporated herein by reference, discloses anhydrous antiperspirant compositions in the form of thixotropic creams. Such compositions, which contain emollients, gelling agents, and antiperspirant active ingredients, are physically stable and cosmetically superior to conventional antiperspirant cream products.

U.S. Pat. No. 4,126,679, the disclosure of which is totally incorporated herein by reference, discloses a combination of powdered materials such as zirconium and aluminum salts suspended in a solid solution of volatile intermediate transfers and long chain alcohols. The intermediate transfers and alcohols are brought into solid solution by mixing the components in liquid phase at temperatures not to exceed 150° F. (66° C.). The addition of the powdered material to the intermediate transfer oil and alcohol matrix prevents the separation of the components upon cooling.

U.S. Pat. No. 5,102,656, the disclosure of which is totally incorporated herein by reference, discloses a creamy, heterogeneous anhydrous antiperspirant product and a method for making it. The product of the invention comprises essentially a volatile intermediate transfer product as a carrier, a gelling agent, and a physiologically acceptable antiperspirant agent. Optional ingredients which can be included comprise surfactants, emollients, fillers, fragrances, coloring agents, and the like. The method of the invention comprises mixing and heating the ingredients to a temperature above the melting point of the gelling agent, then cooling while mixing thoroughly to a temperature below the normal solidification point of the product.

U.S. Pat. No. 5,122,519, the disclosure of which is totally incorporated herein by reference, discloses stable, cosmetically acceptable gel formulations of the tetracycline antibiotics for the topical treatment of acne in humans. Minocycline hydrochloride is the preferred antibiotic and the pharmaceutical vehicle is a volatile intermediate transfer solvent in combination with an emollient ester cosolvent and a polyethylene gelling agent.

U.S. Pat. No. 6,090,376 and EP 0 769 290, the disclosures of each of which are totally incorporated herein by reference, disclose a cosmetic or dermatological composition for the treatment of keratinous substances, in particular human hair, comprising, in a cosmetically or dermatologically acceptable medium, at least one grafted intermediate transfer polymer with a non-intermediate transfer organic skeleton grafted by monomers containing a polysiloxane and at least one ionic amphiphilic polymer containing at least one fatty chain and at least one hydrophilic unit. The compositions according to the invention are in particular used as products which are rinsed out or as products which are not rinsed out, in particular for washing, caring for or conditioning the hair, form retention of the hair style or shaping of the hair style.

U.S. Pat. No. 6,165,444 and WO 97/12587, the disclosures of each of which are totally incorporated herein by reference, disclose a cosmetic or dermatological composition for treating keratinous material, particularly human hair, including a cosmetically or dermatologically acceptable medium containing at least one intermediate transfer-grafted polymer with a polysiloxane portion and a portion consisting of a non-intermediate transfer organic chain, wherein one of the two portions constitutes the main polymeric chain while the other is grafted onto said main chain, and at least one selected fatty-chain amide. Such compositions are particularly suitable for use as rinsable or non-rinsable products for washing and conditioning hair, hair setting or hair styling.

WO 97/12588 and EP 0 853 470, the disclosures of each of which are totally incorporated herein by reference, disclose a cosmetic or dermatological composition for treating keratinous material, particularly hair, including a cosmetically or dermatologically acceptable medium containing at least one intermediate transfer-grafted polymer with a polysiloxane portion and a portion consisting of a non-intermediate transfer organic chain, wherein one of the two portions constitutes the main polymeric chain while the other is grafted onto said main chain, and at least one combination of at least one anionic polymer and at least one cationic polymer. Such compositions are particularly suitable for use as rinsable or non-rinsable products for washing and conditioning hair, hair setting or hair styling.

U.S. Pat. No. 6,086,862 and WO 97/12592, the disclosures of each of which are totally incorporated herein by reference, disclose a cosmetic or dermatological composition for the treatment of keratinous material, in particular the hair, comprising, in a cosmetically or dermatologically acceptable medium, at least one grafted intermediate transfer polymer, containing a polysiloxane skeleton grafted with non-intermediate transfer organic monomers and at least one anionic polymer in an anionic polymer/grafted intermediate transfer polymer weight ratio of between 0.25 and 15. The compositions according to the invention are used in particular as rinse-out products or as leave-in products, in particular for the washing, care and conditioning of the hair, for maintaining the hairstyle or for shaping the hairstyle.

U.S. Pat. No. 6,432,418 and WO 97/12593, the disclosures of each of which are totally incorporated herein by reference, disclose a cosmetic or dermatological composition for treating keratinous material, particularly human hair, including a cosmetically or dermatologically acceptable medium containing at least one intermediate transfer-grafted polymer with a polysiloxane portion and a portion consisting of a non-intermediate transfer organic chain, wherein one of the two portions constitutes the main polymeric chain while the other is grafted onto said main chain, and at least one copolymer with a polysiloxane-polyoxyalkylene linear block as the repetitive units, as well as the uses thereof. Such compositions are particularly suitable for use as rinsable or non-rinsable products for washing and conditioning hair, hair setting or hair styling.

U.S. 2002/0028218 A1 and WO 97/14400, the disclosures of each of which are totally incorporated herein by reference, disclose a cosmetic or dermatological composition for the treatment of keratinous materials, particularly hair, comprising in a cosmetically or dermatologically acceptable medium at least a grafted intermediate transfer polymer with a polysiloxanic skeleton grafted by organic non intermediate transfer monomers and at least an aqueous dispersion of insoluble particles of non ionic or cationic polymer. The compositions of the invention are used particularly as rinsed products or as non rinsed products particularly for hair washing, hair care, hair conditioning, hair dressing or hair setting.

U.S. Pat. No. 5,362,485 and EP 0 582 152, the disclosures of each of which are totally incorporated herein by reference, disclose a hair cosmetic composition containing a graft copolymer or an alternating block copolymer, each of which comprises a first unit containing a polysiloxane group and a second unit containing a polymer of unsaturated monomers. The first and second units are linked by sulfide linkage. The hair cosmetic composition provides hair with softness, luster, combing smoothness, styling ease, enhanced volume, and has good hairstyle retainability and damage-restoring characteristics.

WO 93/23009, EP 0 639 969, WO 95/03776, and EP 0 714 275, the disclosures of each of which are totally incorporated herein by reference, disclose cosmetic compositions containing vinyl-intermediate transfer graft or block copolymers of the formula

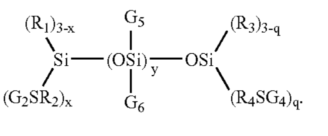

U.S. Pat. No. 6,481,840, the disclosure of which is totally incorporated herein by reference, discloses a method of improving automatic document feed of media printed with phase change inks wherein the surface of the phase change inks on the media is coated with fine particles. The particles can include PMMA, glass bead, silica particles, crushed glass particles, kaolin clay, micronized PE and PTFE, calcium carbonate powder, hard inks, or toner powder. The particles can be applied to the surface of a transfix drum by oil transfer or electrostatically prior to jetting the phase change ink, or in the case of hard inks can be jetted onto the surface of the transfix drum (offset) with the phase change ink or onto the print media (direct) after application of the phase change ink in an overprint printing process. Also the particles can be applied by a pair of finishing rollers after the media has been printed with the phase change inks, either in a direct or offset print process, the finishing roller on the print side being coated with the fine particles.

French 2,756,176, the disclosure of which is totally incorporated herein by reference, discloses a cosmetic composition which includes a lipid phase containing at least one volatile component, at least one wax, and at least one non-volatile fatty liquid.

DE 19,749,380 and U.S. Pat. No. 6,201,058, the disclosures of each of which are totally incorporated herein by reference, disclose organopolysiloxanes that have amino groups and are solid at room temperature which can reversibly change their states of aggregation on the basis of temperature changes. Preparations containing these organopolysiloxanes are useful in the cleaning, care, and hydrophobicization of surfaces.

U.S. Pat. No. 5,620,942, the disclosure of which is totally incorporated herein by reference, discloses a dye-receiving element for thermal dye transfer comprising a support having on one side thereof, in order, a dye image-receiving layer and an overcoat layer thereon, the overcoat layer comprising: a) a linear condensation copolymer containing block polysiloxane units copolymerized into a linear polymer chain, the linear copolymer comprising from about 1 to about 40 weight percent of polysiloxane units; and b) a polycarbonate having a $T_g$ of from about 10° C. to about 120° C. and a molecular weight of from about 1,000 to about 6,000, said polycarbonate having the following formula:

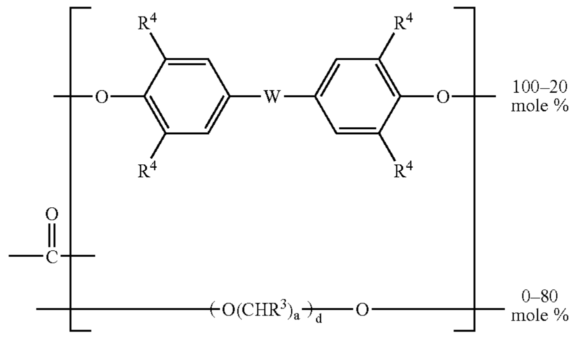

wherein $R^3$ represents hydrogen, methyl or ethyl; $R^4$ represents hydrogen, alkyl of 1 to 6 carbon atoms or halogen; a represents an integer from 2 to 10; d is an integer from 1 to 6; and W represents

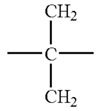

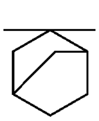

or

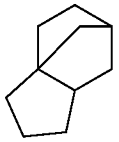

U.S. Pat. No. 5,159,096, the disclosure of which is totally incorporated herein by reference, discloses an improved solventless hydrosilation process for preparing a siloxane-oxyalkylene copolymers, the improvement comprising conducting the reaction in the presence of at least one sodium metal phosphate.

U.S. Pat. No. 5,070,171, the disclosure of which is totally incorporated herein by reference, discloses a series of organofunctional silicone polymers which have a phosphate pendant functionality present within the polymer. The compounds by virtue of their phosphate group, provide a non-volatile lubricant, antistat which can be applied to a variety of fibers. The compounds deposit on the fiber surface thereby altering the surface's physical properties. The compounds are prepared by phosphation of a hydroxyl group on the silicone polymer. The compounds useful as raw materials are dimethicone copolyols. The introduction of a phosphate group onto the silicone polymer is achieved by reaction of the hydroxyl group on the silicone with a suitable phosphating reagent. Another method of introducing the phosphate group is by the phosphation of the hydroxy containing vinyl intermediate which is subsequently reacted with the silicone polymer by hydrosilation.

U.S. Pat. No. 5,070,168, the disclosure of which is totally incorporated herein by reference, discloses amino functional silicone polymers which have an ether amino pendant group. The compounds by virtue of their ether amino group, deposition on the surface of substrates, either alone or as complexes with cations, thereby altering the substrate's surface physical properties. The desirable durable properties which can be given to substrates include: softness, lubrication, soil release, and hydrophobicity. The compounds are prepared by introduction of an amino group onto the silicone pendant group. Cyanoethylation followed by hydrogenation or reaction with ethylenimine or propylenimine of a hydroxy containing silicone polymer, or hydroxy containing vinyl intermediate which is subsequently introduced into the polymer backbone by hydrosilation are the preferred methods of preparation.

U.S. Pat. No. 5,136,063, the disclosure of which is totally incorporated herein by reference, discloses a series of silicone fatty esters. This class of compounds provide outstanding softening and lubricating when applied to textiles and fibers. The compounds are prepared by reacting a hydroxyl group in a silicone polymer with a fatty carboxylic acid, ester or anhydride.

U.S. Pat. No. 5,051,489, the disclosure of which is totally incorporated herein by reference, discloses silanol waxes. Compounds by virtue of their silanol fatty ester group are waxy lubricious solids which provide outstanding lubrication and hydrophobicity when applied to hair, skin, and textile fibers. The compounds are prepared by reacting a silanol compound with a fatty carboxylic and or polycarboxylic acid, ester or anhydride.

U.S. Pat. No. 5,164,471, the disclosure of which is totally incorporated herein by reference, discloses fluorine containing silanol polyester waxes. The compounds by virtue of (a) the polyester group, and (b) the fluorine containing terminal groups are extremely efficient lubricating materials when applied to a variety of surfaces. These materials spread out when applied and provide durable lubrication and hydrophobicity when applied to hair, skin, wood, plastic, and textile fibers. The compounds are prepared by reacting a silanol compound with a dicarboxylic acid and a fluorine containing alcohol.

U.S. Pat. No. 5,235,017, the disclosure of which is totally incorporated herein by reference, discloses fluorine containing polyester compounds. The compounds by virtue of (a) the silicone containing polyester group, (b) the fluorine containing terminal groups and (c) the polyoxyalkylene containing dimethicone copolyol group are extremely efficient lubricating materials when applied to a variety of surfaces and are water dispersible or water soluble depending upon the specific molecule. These materials have a water soluble portion in the silicone backbone which allows for the preparation of water dispersible and water soluble fluorine containing compounds useful in personal care applications as conditioners and softeners. The compounds are prepared by reacting a dimethicone copolyol compound with a dicarboxylic acid and a fluorine containing alcohol.

U.S. Pat. No. 5,260,401, the disclosure of which is totally incorporated herein by reference, discloses fluorine containing polyester compounds. The compounds by virtue of (a) the silicone containing polyester group, (b) the fluorine containing terminal groups and (c) the polyoxyalkylene containing dimethicone copolyol group are extremely efficient lubricating materials when applied to a variety of surfaces and are water dispersible or water soluble depending upon the specific molecule. These materials have a water soluble portion in the silicone backbone which allows for the preparation of water dispersible and water soluble fluorine containing compounds useful in personal care applications as conditioners and softeners. The compounds are prepared from terminal silicone containing dimethicone copolyols, which results in substantially linear polymers that form non-occlusive, hydrophobic films which are useful in barrier creams, automotive waxes, and other lubricating compositions. These materials are prepared by reacting a terminal substituted dimethicone copolyol compound with a dicarboxylic acid and a fluorine containing alcohol.

U.S. Pat. No. 5,446,114, the disclosure of which is totally incorporated herein by reference, discloses a series of silicone fluorinated dimethicone copolyols. This class of compounds provides breathable barriers when applied to textiles and paper. These barriers allow for the passage of water and air through the barrier, but do not allow for the passage of oils. The compounds are prepared by reacting a silanic hydrogen containing silicone polymer with a vinyl containing fluoro compound and an allyl alcohol alkoxylate.

U.S. Pat. No. 5,473,038, the disclosure of which is totally incorporated herein by reference, discloses a series of silicone polymers containing both fluorinated and alkyl side chains. This class of compounds provides very thin breathable barriers which are very durable when applied to textiles and paper. The compounds are prepared by reacting a silanic hydrogen containing silicone polymer with a vinyl containing fluoro compound and an alpha olefin.

U.S. Pat. No. 5,760,145 and German Publication 19,627,022, the disclosures of each of which are totally incorporated herein by reference, disclose crosslinkable compositions comprising (A) organopolysiloxanes containing aliphatically unsaturated hydrocarbon radicals, comprising; (a) at least one unit, per molecule, of the formula

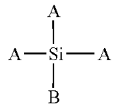

in which A is a radical of the formula $—(OSiR^1R^2)_z—(OSiR_2)_x—Y—SiR_2O_{1/2}$, R is identical or different and is a monovalent, aliphatically saturated or aromatic hydrocarbon radical having 1 to 12 carbon atoms per radical, $R^1$ is a radical of the formula $—OSiR_2—Y—SiR_2O_{1/2}$, $R^2$ has the meaning of R, $R^1$ or R', where R' is a monovalent, aliphatically saturated or aromatic hydrocarbon radical having 1 to 12 carbon atoms per radical, which contains one or more heteroatoms chosen from the group consisting of O, S, N, Si and Ti, Y is a divalent hydrocarbon radical of the formula $—CH_2CHR^5(—R^4)_v—$, in which $R^4$ is a divalent hydrocarbon radical having 1 to 10 carbon atoms per radical or a chemical bond, if v has the value 0, $R^5$ is a hydrogen atom or has the meaning of R, v is 0 or 1, x and z is identical or different and is 0 or 1, and B has the meaning of A or R or R', with the proviso that B is R or R' if x is 0, (b) at least one unit, per molecule, of the formula $O_{1/2}SiR_2R^3$ (II), in which R has the meaning given above for this radical and $R^3$ is an aliphatically unsaturated hydrocarbon radical of the formula $H_2C{=}CR^5(—R^4)_v—$, in which $R^4$ and $R^5$ have the meaning given above for these radicals.

U.S. Pat. No. 6,218,445 and WO 98/07798, the disclosures of each of which are totally incorporated herein by reference, disclose a composition cross-linkable under radiation. The composition includes at least one polyorganosiloxane with cross-linkable functional groups, a stabilizing amino agent, and an initiator system for hardening under radiation. The composition is stable for use and storage.

WO 98/03574, the disclosure of which is totally incorporated herein by reference, discloses a fluorine-containing organic silicon compound represented by the following formula

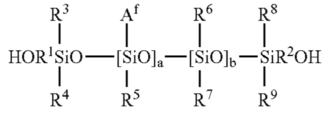

which is useful as various industrial base materials required to have performances such as water and oil repellency, anti-fouling properties or release properties and as raw materials therefor. Here, $A^f$ represents a specific polyfluorohydrocarbon group-containing organic group; $R^1$ and $R^2$ which are independent of each other, represent bivalent organic groups; $R^3$ to $R^9$ which are independent of one another, represent monovalent organic groups; a is an integer of at least 1, and b is an integer of at least 0.

EP 0 842 996, the disclosure of which is totally incorporated herein by reference, discloses solventless silicone release coating composition comprising (A) 100 weight parts of silicone-grafted alicyclic epoxy-functional vinyl copolymer obtained by a method comprising (I) copolymerizing a mixture of (a) 1 to 80 weight % of a silicone macromonomer free of alicyclic epoxy groups and having a vinyl-polymerizable group at a single molecular chain terminal, (b) 5 to 90 weight % of a monomer containing at least 1 alicyclic epoxy group and one vinyl polymerizable group, (c) up to 94 weight % of vinyl-polymerizable monomer except (a) and (b), (d) optionally a polymerization initiator, and (e) optionally at least one solvent, (B) 120 to 10,000 weight parts of at least one silicone compound containing at least 1 alicyclic epoxy group, and (C) 0.1 to 20 weight parts per 100 weight parts of the total of components (A) and (B) of an onium salt photocuring catalyst. The solventless silicone release coating compositions of this invention, upon exposure to ultraviolet radiation, cure into a highly paintable release film that is strongly adherent to a variety of substrates.

FR 2 755 695, the disclosure of which is totally incorporated herein by reference, discloses a cross-linkable composition which comprises 20-50 wt. % polyisocyanate; 50-80 wt. % acrylic oligomer containing hydroxyl groups whose content in weight relative to oligomer is 2.5-4%; and 1-10 wt. % silicone oil of formula

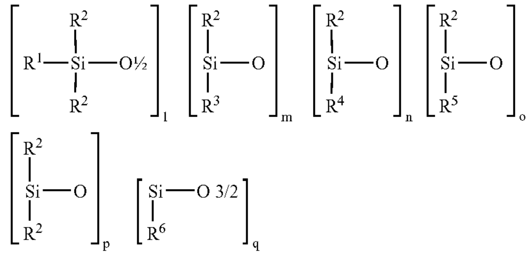

where o and p=1-100, preferably 1-50; I=2+q; q=0-10; m=1-60, preferably 1-30 most preferably 1-10; n is number such that 20<(100xm)/(m+n)<60, preferably 25<(100xm)/(m+n)<55; $R^1$, $R^2$=1-4 C alkyl or alkoxy, or aryl, e.g. methyl, phenyl or methoxy; $R^3$, $R^4$ are selected from monovalent radicals of type $—(CH_2)_h—Si—(R^1)_3$, where h=1-10, preferably 1-3, and monovalent 1-4 C alkylaryl radicals; $R^5$, $R^6$=monovalent functional group selected from $—R^7—NH_2$, where $R^7$=1-6 C alkyl, $—R^8—NH—R^9$, where $R^8$; $R^9$=1-6 C alkyl; $—(CH_2)_a(NHCH_2CH_2)_bNH_2$ where a=preferably 1-3 and b=preferably 0-1; $—(CH_2)_c(OCH_2CH_2)_d(OCH_2CHCH_3)_e—OH$, where c=preferably 1-10, d=preferably 0-12, and e=preferably 0-15; $—(CH_2)_f—SH$ where f=preferably 1-3; and $—(CH_2)_g—C(R')_2—OH$, where g=preferably 1-3 and R'=1-4 C alkyl, alkylaryl or aryl. Also claimed are: method for preparation of polyurethane film using said composition; polyurethane film obtained by thermal hardening of said composition; use of composition in making polyurethane films for protective covering; and article covered with said polyurethane film.

U.S. Pat. No. 5,981,679 and DE 19 746 909, the disclosures of each of which are totally incorporated herein by reference, disclose an organopolysiloxane having acryloyl groups or methacryloyl groups at both terminals thereof, where silicon atoms at both terminals of the organopolysiloxane are each independently added to double bonds each of acryloyl groups or methacryloyl groups of compounds each having at least two acryloyl groups or methacryloyl groups; a curable resin composition comprising such an organopolysiloxane; and a process for producing such an organopolysiloxane comprising adding a compound having at least two acryloyl groups or methacryloyl groups to an organopolysiloxane having SiH groups at only both terminals thereof. The curable resin composition has distinguished transparency, luster, peelability, surface lubricity and water and oil repellency, and therefore is useful as a resin for mold-releasable paper, a coating agent, an anticorrosive agent for printed substrate, etc.

DE 19 711 694, the disclosure of which is totally incorporated herein by reference, discloses crosslinkable compositions containing (A) linear organopolysiloxane of formula (I) with unsaturated aliphatic hydrocarbon groups; $R^1_a R_{3-a}SiO(R_2SiO)_cR_2Si—Y—SiR_2O(R_2SiO)_c]_dSiR_{3-b}R^1_b$ (I) R=optionally substituted 1-18C hydrocarbyl with no terminal aliphatic carbon-carbon multiple bonds; $R^1$=2-14C unsaturated aliphatic hydrocarbyl, optionally containing one or more separate oxygen and/or silicon atoms; Y=divalent organic residue with no terminal aliphatic C—C multiple bonds; a, b=0 or 1; a+b=1 or 2 for each molecule, on average 1.3-1.9; c=1-1000;and d=0 or 1-10; (B) organosilicon compounds with hydrogen atoms attached to Si; (C) catalysts for the addition of Si-linked hydrogen to aliphatic multiple bonds; and optionally (D) retarders for this addition reaction at room temperature. Also claimed is a process for the production of adhesive-repellent coatings by applying the composition to a surface and hardening the composition.

U.S. Pat. No. 5,939,491 and WO 99/06487, the disclosures of each of which are totally incorporated herein by reference, disclose curable compositions containing novel polysiloxanes having various reactive functional groups. The curable compositions are useful as both ambient-cured and thermally-cured coating compositions which provide such properties as excellent appearance, mar resistance, acid etch resistance, adhesion, pot life, improved tack time, mar resistance and corrosion resistance.

EP 0 916 702, the disclosure of which is totally incorporated herein by reference, discloses a composition capable of curing to form an elastomeric mass which comprises a polymeric material having at least one hydroxyl or hydrolyzable group bonded to silicon, a crosslinking agent of the formula $R—Si—(OR^1)_3$ wherein R denotes an alkyl group having from 4 to 8 carbon atoms and each $R^1$ independently denotes an alkyl or acyl group having from 1 to 20 carbon atoms and a catalyst compound comprising a titanium compound. A method of using the composition as a sealing material is also disclosed.

JP 11140090, the disclosure of which is totally incorporated herein by reference, discloses a compound containing nitrogen and silicon that is obtained by blending a monomer of a tetraalkoxysilane and/or an oligomer with a compound containing amino group expressed by the following formula in a ratio of (the number of moles of amino group)/(the number of moles of amino acid group+the number of moles of an alkoxy group)=0.015 to 0.09. Formula: $R^2R^3N—[\{(CR'R'')_a—O—\}_b—(CR'''R'''')_c]—OH$ [$R^2$, $R^3$ are each one or more of H, alkyl, alkenyl or aryl; R', R", R''' and R'''' are each one or more of H, alkyl or halogen; (a), (c) are each >=1 integer, and (b) is >=0 integer].

EP 0 903 385, the disclosure of which is totally incorporated herein by reference, discloses a method of reducing coefficient of friction of a silicone release coating and a corresponding a low coefficient of friction release coating composition. The low coefficient of friction release coating composition includes: (a) an epoxy functional polyorganosiloxane; (b) a fine particle silicone resin; and (c) a photoinitiator.

JP 11236532, the disclosure of which is totally incorporated herein by reference, discloses a coating agent which imparts excellent stainproofness, anticorrosiveness, low adhesion, high lubricity, and heat resistance to a substrate by using a polymer or prepolymer having specified fluoroalkylsiloxane groups as the principal component. This coating agent mainly consists of a polymer or prepolymer having fluoroalkylsiloxane groups represented by formula I

I

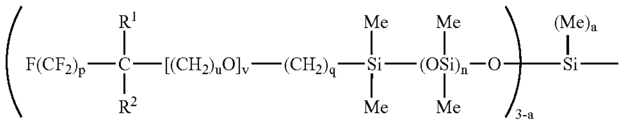

(p is an integer of 0-16; q is an integer of 2-10; n is an integer of 0-1,000; a is an integer of 0-2; u is an integer of 1-6; v is 0 or 1; $R^1$ and $R^2$ are each independently fluorine or trifluoromethyl). This polymer or prepolymer may be one produced by any desired process. For example, it is prepared by reacting a fluoroalkylsiloxane-group-containing alcohol of formula II with an isocyanato-containing compound.

II

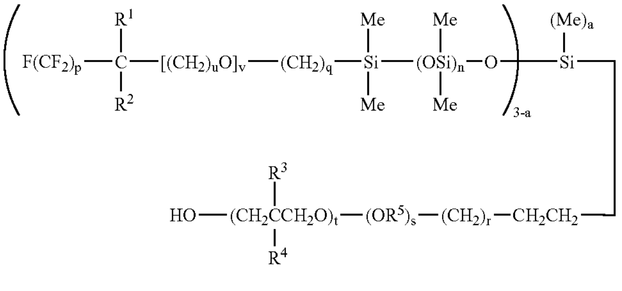

In formula II, p, q, n, a, u, v, $R^1$, and $R^2$ are as defined in formula I; $R^3$ is H or the like; $R^4$ is OH or the like; and $R^5$ is an ethylene group or the like.

U.S. Pat. No. 6,211,322 and EP 0 940 422, the disclosures of each of which are totally incorporated herein by reference, disclose organopolysiloxanes comprising (meth)acrylate groups, a process for their preparation, and their use as radiation-curing coating materials.

EP 0 940 458, the disclosure of which is totally incorporated herein by reference, discloses organopolysiloxanes containing (meth)acrylate groups that are useful as an additive at a concentration of 0.01-10 wt. % in radiation curable coatings. Organopolysiloxanes containing (meth)acrylate groups are useful as an additive at a concentration of 0.01-10 wt. % in radiation curable coatings. The organopolysiloxane is prepared by addition of an organopolysiloxane of formula (1)

(1)

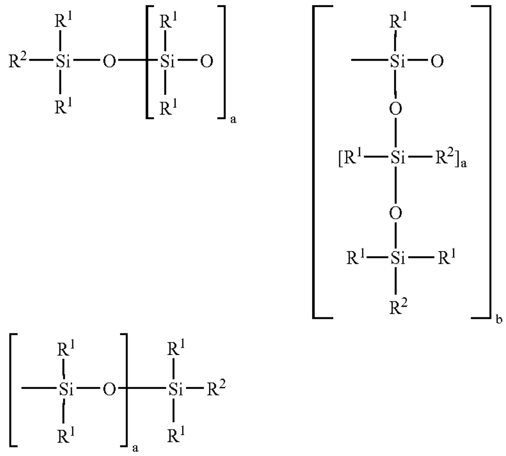

and a polyhydroxyalkenylether of formula (2)

$$H_2C{=}CH{-}(CH_2)_c{-}O{-}CH_2{-}R^3{-}(CH_2{-}OH)_d \quad (2)$$

to 0.4-1 moles (meth)acrylic acid and 0-0.6 moles of a 2-10C monocarboxylic acid (w.r.t. hydroxyl groups) that is free from polymerizable double bonds, in the presence of a platinum or rhodium catalyst under conventional esterification conditions. $R^1$=1-10C aliphatic or aromatic hydrocarbon; $R^2$=$R^1$ or H whereby at least one $R^2$ is H; $R^3$=1-20C hydrocarbon, optionally containing ether linkages; a=0-500; b=0-5; c=0-10; and d=2-10.

WO 00/59992, the disclosure of which is totally incorporated herein by reference, discloses silicone compositions that are used in the production of varnishes that can be applied to supports in order to reduce the friction coefficient. The inventive composition comprises at least one polyorganosiloxane A (POS)

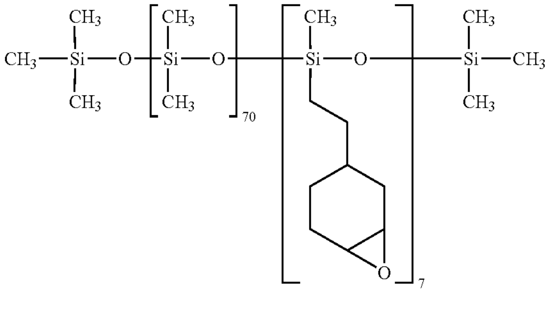

which can be cationically and radically cross-linked by functional cross-linking groups (GFR) and a primer C

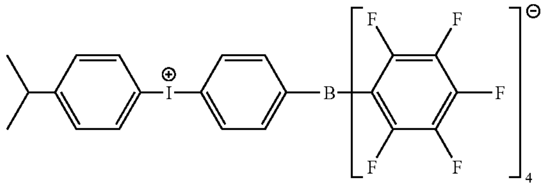

chosen from onium borates, charcterised in that the inventive composition also comprises molecules (POS D)

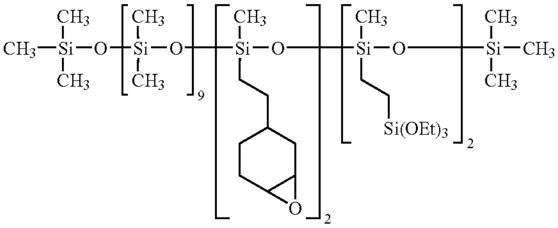

which are substituted by secondary functional groups (GFS) carried by silicon atoms and selected from those that include at least one alkoxy and/or epoxy and/or carboxy motif and optionally a charge (e.g. silica). The invention can be used with anti-friction varnishes for RTV silicone coatings for material used in air bags, thermal transfer ribbons or packing films.

U.S. Pat. No. 6,271,309 and WO 01/09250, the disclosures of each of which are totally incorporated herein by reference, disclose curable compositions comprising the hydrosilation product of olefin-containing polymers and organosiloxane hydrides. The curable compositions may be cured to form low surface energy cured composition which may be suitable, for example, as antifouling coatings on substrates such as boat or ship hulls.

U.S. Pat. No. 5,316,692, the disclosure of which is totally incorporated herein by reference, discloses a cleanser composition for hard surfaces, for example baths, tiles, laminated surfaces and the like, which contains at least one surfactant, an abrasive substance, water and an organosiloxane component which comprises both (A) a dimethylsiloxane having from 2 to 10 silicon atoms and (B) a polydiorganosiloxane in which there is present at least one Si-bonded substituent selected from alkyl groups having from 6 to 50 carbon atoms and the styryl group.

U.S. Pat. No. 5,300,299, the disclosure of which is totally incorporated herein by reference, discloses hot-melt silicone pressure sensitive adhesive compositions containing alkylmethylsiloxane waxes, methods of using the compositions and devices made using the compositions. The hot-melt silicone pressure sensitive adhesive compositions include a mixture of (i) a silicate resin, (ii) a silicone fluid, and (iii) an alkylmethylsiloxane wax having a melting point of between 30° C. and 70° C. The alkylmethylsiloxane wax decreases dynamic viscosity of the adhesive at temperatures ranging from about 50° C. to about 200° C.

U.S. Pat. No. 5,225,188, the disclosure of which is totally incorporated herein by reference, discloses an underarm formulation containing volatile and/or non-volatile alkylmethylsiloxanes. Incorporation of such agents results in formulations which have beneficial effects such as decreased whitening, less crumbling, better compatibility, controlled vapor pressure, and better aesthetics. In addition, use of these materials often results in processing advantages over the prior art.

U.S. Pat. No. 4,311,695, the disclosure of which is totally incorporated herein by reference, discloses water-in-oil type emulsions wherein the water phase comprises a water-soluble alcohol and the oil phase comprises a volatile component and a soluble personal-care component. The emulsions further comprise certain polydiorganosiloxane-polyoxyalkylene copolymers and, optionally, a silicon-free organic surfactant having an HLB value of from 2 to 10. A preferred composition is a personal-care emulsion composition wherein the volatile, oil-phase component is a methylsiloxane fluid.

U.S. Pat. No. 4,268,499, the disclosure of which is totally incorporated herein by reference, discloses antiperspirant emulsion compositions which comprise an aqueous solution of an astringent agent; a volatile, water-insoluble liquid; a polydiorganosiloxane-polyoxyalkylene copolymer; an oil-in-water type surfactant; and a water-in-oil type surfactant. A preferred embodiment comprises an emulsion of aqueous aluminum chlorhydrate in cyclopolydimethylsiloxanes as the volatile fluid. These compositions have improved efficacy as measured by their drying times.

U.S. Pat. No. 4,265,878, the disclosure of which is totally incorporated herein by reference, discloses antiperspirant stick compositions which comprise an aqueous solution of an astringent dispersed in a solid matrix comprising a volatile, water-insoluble liquid; a polydiorganosiloxane-polyoxyalkylene copolymer; a solid alkanoic acid; a waxy ester; and optionally containing a solid alkanol. A preferred embodiment comprises an aqueous solution of aluminum chlorhydrate dispersed in a solid matrix comprising cyclopolydimthylsiloxanes as the volatile liquid. These compositions are stable to separation in the molten state and provide non-leaking sticks of controllable softness when solidified by cooling.

U.S. Pat. No. 4,218,250, the disclosure of which is totally incorporated herein by reference, discloses improvement of polish formulations containing a wax and/or an abrasive and optionally at least one member selected from the group consisting of solvents, surfactants, thickening agents, detergent resistant additives, colorants, odorants, and other ingredients normally used in making polishes by incorporating in the polish (a) a cyclodimethylsiloxane fluid, (b) a polydiorganosiloxane-polyoxyalkylene copolymer, and (c) water. Further advantages may also be achieved by the incorporation of an organic water-in-oil surfactant having an HLB value of 2-10 and/or certain silicone-glycol copolymers in the polish.

U.S. Pat. No. 5,136,068, the disclosure of which is totally incorporated herein by reference, discloses an organopolysiloxane-polyoxyalkylene emulsifier for polar in nonpolar liquid emulsions wherein organopolysiloxane-polyoxyalkylene polymer molecules are intentionally cross linked through a cross linking agent joined thereto by nonhydrolyzable bonds and being free of internal hydrolyzable bonds.

U.S. Pat. No. 4,853,474, the disclosure of which is totally incorporated herein by reference, discloses an organopolysiloxane-polyoxyalkylene emulsifier for polar in nonpolar liquid emulsions wherein organopolysiloxane-polyoxyalkylene polymer molecules are intentionally cross linked through a cross linking agent joined thereto by nonhydrolyzable bonds and being free of internal hydrolyzable bonds.

JP 10060377, the disclosure of which is totally incorporated herein by reference, discloses a coating agent composition which is freed from colloidal silica, can cure at ordinary temperature or on heating to low temperatures, and can form coating films having excellent weathering resistance, water resistance, etc., high hardness and excellent bendability on the surface of a metal, by mixing four specified components with each other. This composition comprises 100 pts. wt. silanol-containing polyorganosiloxane (A) represented by formula I $$R^1_aSi(OH)_bO_{(4-a-b)/2}$$

($R^1$ is a 1-8C monovalent hydrocarbon; $0.2 \leqq a \leqq 2$; $0.0001 \leqq b \leqq 3$; and $a+b<4$), 3-25 pts. wt. glycidoxypropyl-containing silane (B) represented by formula II

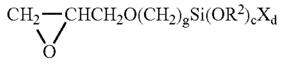

($R^2$ is a 1-4C alkyl; X is a 1-4C alkyl; $1 \leqq c \leqq 3$; and $c+d=3$), 10-40 pts. wt. mixture (C) of silanes having two hydrolyzable groups, represented by formula III $$R^3{}_2Si(OR^4)_2$$

($R^3$ is a 1-8C monovalent hydrocarbon group; and $R^4$ is a 1-4C alkyl), and 0.001-15 pts. wt., per 100 pts. wt. total of components A, B and C, curing catalyst (D) being a mixture of an amino alkoxysilane with an organotin compound and a carboxylic acid amine salt. This is used after being diluted with a solvent.

JP 11021326, the disclosure of which is totally incorporated herein by reference, discloses a graft copolymer that can form a coating film exhibiting excellent stainproofness for a long term owing to the stainproofness and proper consumption property of the coating film itself, by copolymerizing a silicone compound prepared by bonding groups having a reactive double bond to the side chains of a nonyl-phenyl-polyether-modified silicone with an ethylenically unsaturated monomer. A nonyl-phenyl-polyether-modified silicone represented by the formula

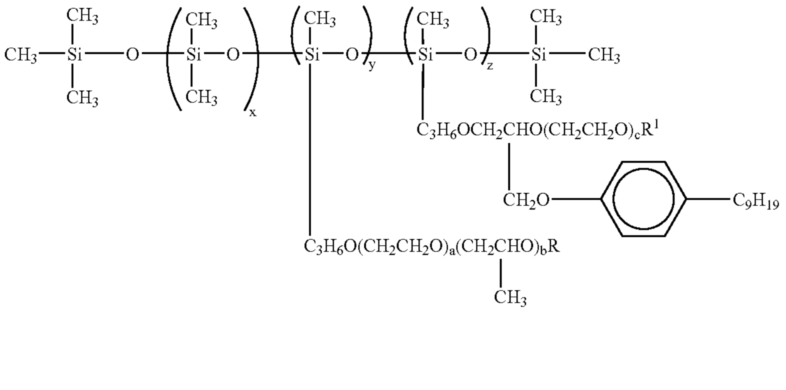

(wherein R and R' are each H or methyl, provided at least either of them is H; x is 5-50; y is 1-20; z is 1-30; a and c are each 1-30; and b is 0-20) is reacted with a compound having a group (e.g. isocyanato or carboxyl) reactive with the hydroxyl group as its side chain and a reactive double bond to obtain a silicone compound (A) having reactive double bonds in side chains. Compound A is reacted with an ethylenically unsaturated monomer copolymerizable with the reactive double bonds in the side chains of compound A to obtain a graft copolymer.

D. W. Butler, "Low Coefficient of Friction Additives for Overprint Varnishes," *Radcure Coat. Inks: Appl. Perform., [Conf. Pap.]* 1996, Paper 7, the disclosure of which is totally incorporated herein by reference, discloses a discussion of the phenomena of low coefficient of friction and anti-blocking performance as demonstrated by some new silicone/organic copolymers.

D. W. Butler, "Low Coefficient of Friction Additives for Overprint Varnishes," *Surf. Coatings Int.* 5 (1997) 230-234, the disclosure of which is totally incorporated herein by reference, discloses various silicone-organic materials useful as UV-curable coatings.

D. W. Butler, "Low Coefficient of Friction Additives for Overprint Varnishes," *PPCJ, Polym. Paint Colour J.* 1997, 187 (4397), S8-S10, the disclosure of which is totally incorporated herein by reference, discloses a discussion of the phenomena of low coefficient of friction and anti-blocking performance as demonstrated by some new silicone/organic copolymers.

J. D. Greene, "Polysiloxanes for High-Temperature-Resistant Powder Coatings," *Paint & Coatings Industry* February 1998, 65-72, the disclosure of which is totally incorporated herein by reference, discloses various polysiloxanes as high temperature powder coatings.

A. J. O'Lenick, Jr. and J. K. Parkinson, "Silanol Esters: A New Series of Intermediate transfer Compounds," *Soap/Cosmetic/Chemical Specialties* August 1994, 50-54, the disclosure of which is totally incorporated herein by reference, discloses properties and applications for various silicon-based compounds.

"Silicone Surfactants, Fluids, Emulsions Antifoams & Specialties," Product Information Brochure, Siltech, Inc. (Georgia), 1996, the disclosure of which is totally incorporated herein by reference, discloses properties and applications of various silicone materials.

"Information About Dow Corning® 190 and 193 Surfactants," "Information About Dow Corning® 2-5220 Resin Modifier," "Information About Dow Corning® 5200 Formulation Aid," "Information About Dow Corning® 2503 Wax," "Information About Dow Corning® 3225C Formulation Aid," and "Product Information: Paints, Inks & Coatings: Dow Corning® 31 Additive," the disclosures of each of which are totally incorporated herein by reference, disclose properties and applications of various silicone materials.

While known compositions and processes are suitable for their intended purposes, a need remains for improved printing processes using intermediate transfer members. A need also remains for improved printing processes using intermediate transfer members with release agents and/or sacrificial layers thereon. In addition, a need remains for printing processes using intermediate transfer members with release agents and/or sacrificial layers thereon wherein efficient transfer of an image from the release agent or sacrificial layer to a final substrate can be achieved. Further, a need remains for printing processes using intermediate transfer members with release agents and/or sacrificial layers thereon wherein pixel picking, ink delamination, and ink cohesive failure can be avoided. Additionally, a need remains for printing processes using intermediate transfer members with release agents and/or sacrificial layers thereon wherein the release agent or sacrificial layer can be applied uniformly to the intermediate transfer member. There is also a need for printing processes using intermediate transfer members with release agents and/or sacrificial layers thereon wherein the intermediate transfer member maintenance cartridge is not susceptible to leakage during shipping. In addition, there is a need for printing processes using intermediate transfer members with release agents and/or sacrificial layers thereon wherein transfer of the release agent or sacrificial layer to the final recording substrate is substantially uniform. Further, there is a need for printing processes using intermediate transfer members with release agents and/or sacrificial layers thereon wherein the release agent or sacrificial layer does not wipe off, wear off, or wick into the final recording substrate. Additionally, there is a need for printing processes using intermediate transfer members with release agents and/or sacrificial layers thereon wherein the resulting generated images are mechanically robust, exhibiting one or more of increased durability, lower coefficient of friction, and improved feeding through automatic document handlers. A need also remains for printing processes using intermediate transfer members with release agents and/or sacrificial layers thereon wherein the surface characteristics, such as gloss, transparency, or the like, of the images generated can be altered. In addition, a need remains for printing processes using intermediate transfer members with release agents and/or sacrificial layers thereon wherein the surface characteristics, such as gloss, transparency, or the like, of the entire surface of the final recording substrate, including both imaged and nonimaged areas, can be altered.

SUMMARY

Disclosed herein is a block of intermediate transfer material for use in a printing apparatus having (a) an intermediate transfer member; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

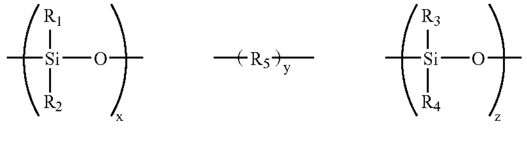

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_2$ has at least about 12 carbon atoms, wherein $R_1+R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others, are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape, wherein the second shape is substantially the complement of the first shape.

DETAILED DESCRIPTION

The apparatus and process can be employed with any desired printing system and marking material suitable for applying a marking material in an imagewise pattern to an intermediate transfer member, such as thermal ink jet printing (both with inks liquid at room temperature and with phase change inks), piezoelectric ink jet printing (both with inks liquid at room temperature and with phase change inks), acoustic ink jet printing (both with inks liquid at room temperature and with phase change inks), thermal transfer printing, gravure printing, electrostatographic printing methods (both those employing dry marking materials and those employing liquid marking materials), or the like. For the purpose of illustration, a piezoelectric phase change ink jet printer will be employed to apply marking material in an imagewise pattern to the intermediate transfer member; it is to be understood that the present invention is not limited to this specific embodiment.

Figure 1:
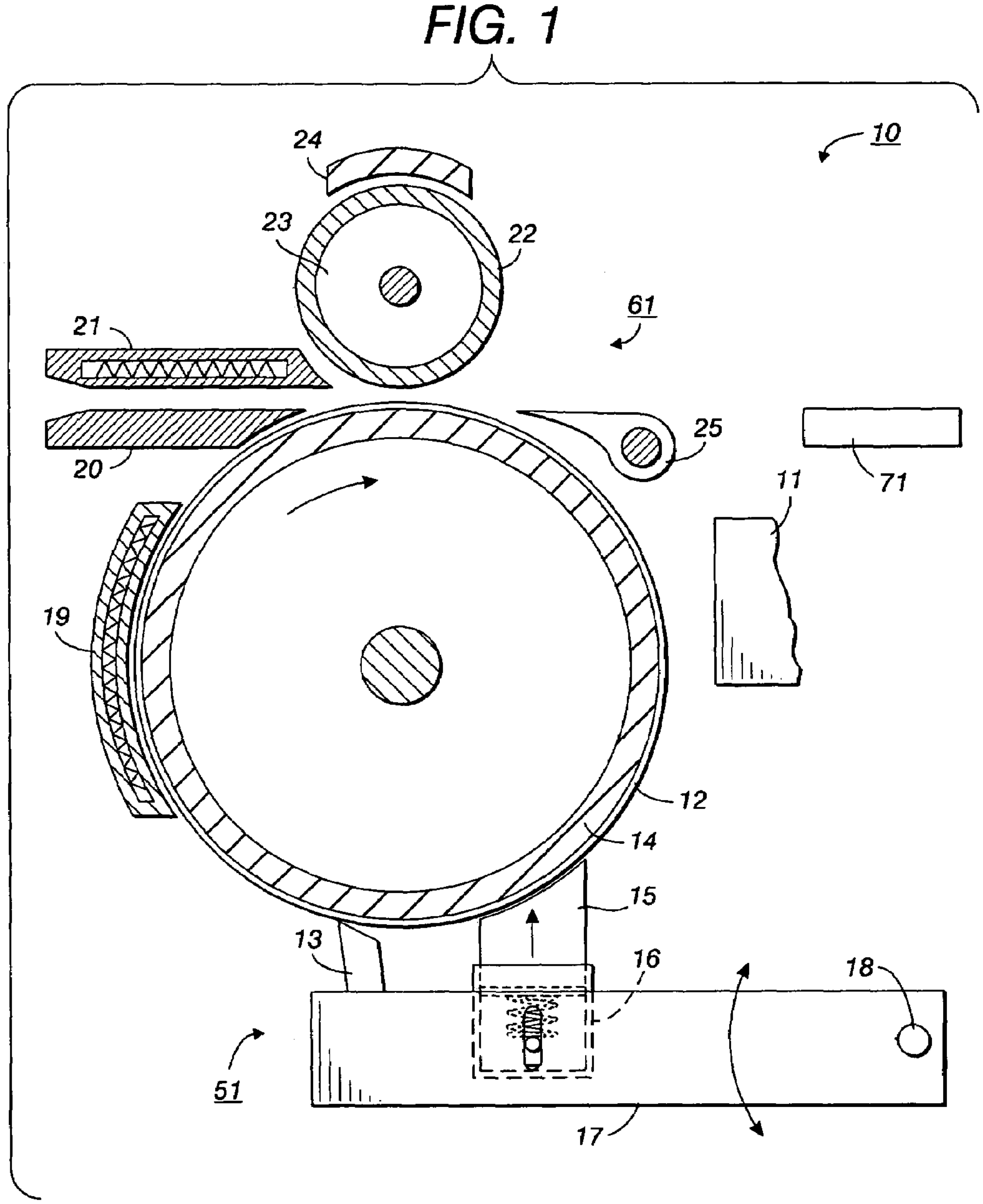
FIGS. 1, 2, and 3 are diagrammatic illustrations of a printing apparatus having an intermediate transfer member with a molten intermediate transfer material layer applicator and a printhead which applies the image to be transferred to the molten intermediate transfer material layer.
Figure 2:
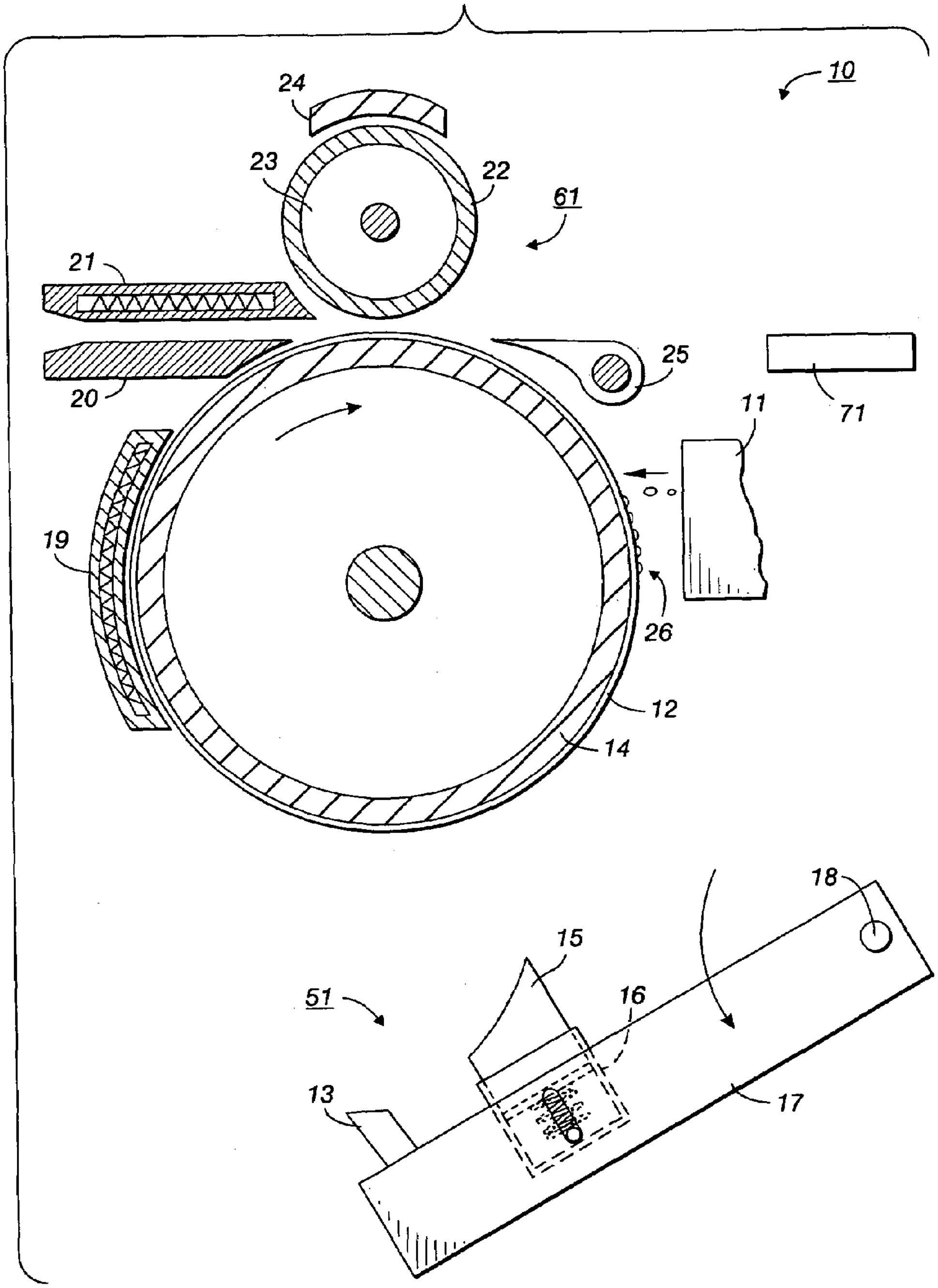
Figure 3:
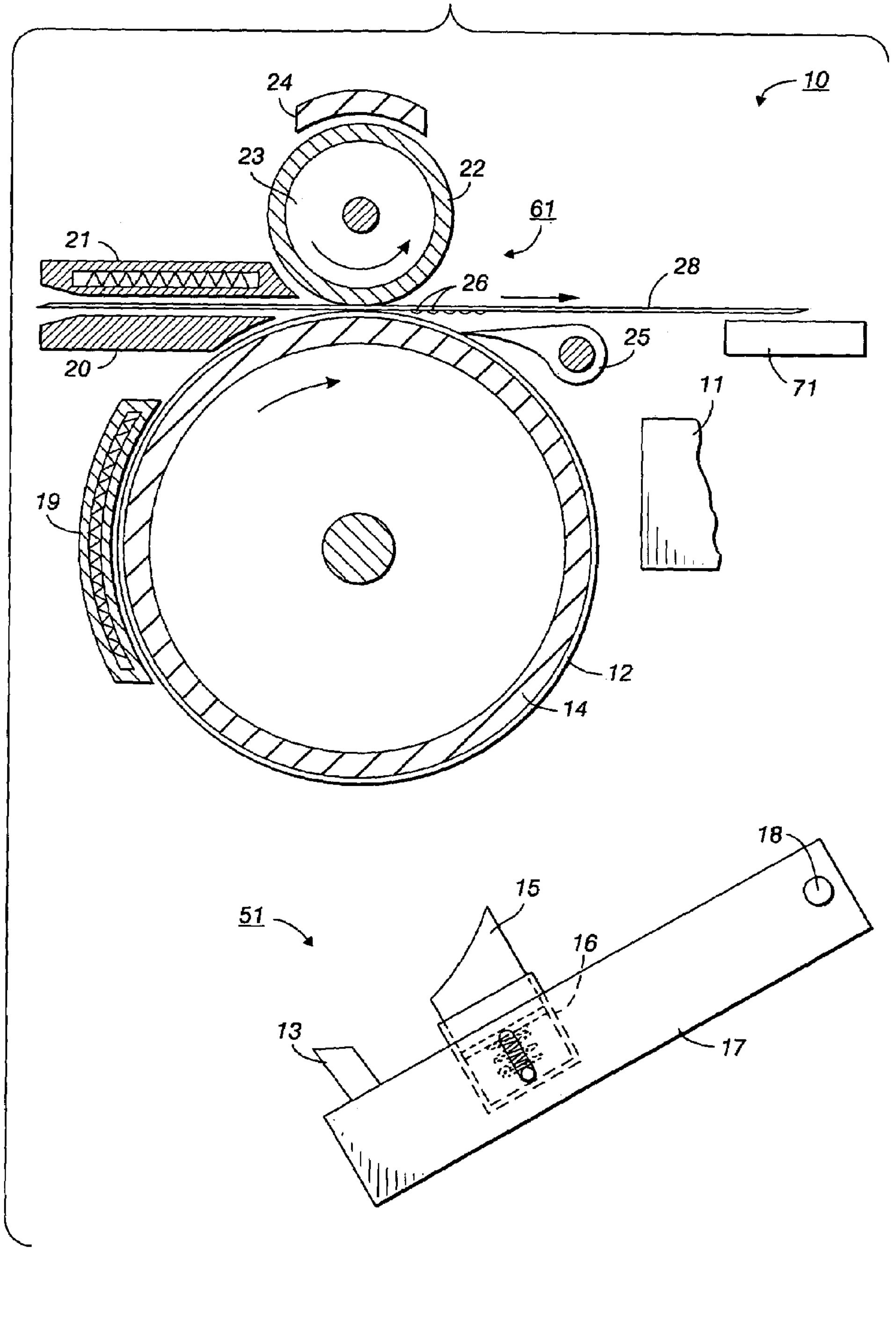

FIGS. 1, 2, and 3 are diagrammatical illustrations of an example of a suitable imaging apparatus 10 for forming an image on an intermediate transfer member and subsequently transferring that image from the intermediate transfer member to a final recording substrate. The illustrated imaging apparatus 10 includes an intermediate transfer member 14. An applicator apparatus 51 applies a molten layer of intermediate transfer material 12 to the surface of the intermediate transfer member. A marking material applicator 11 applies marking material in an imagewise pattern onto the molten layer of intermediate transfer material. A transferring apparatus including a transfer roller 22 transfers the imagewise pattern of marking material from the intermediate transfer member onto a final recording substrate 18.

Figure 4:
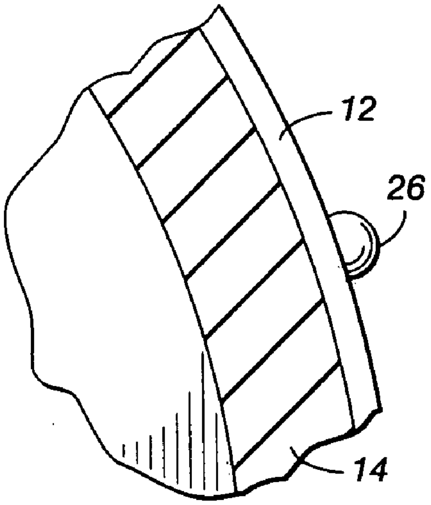
FIG. 4 is an enlarged diagrammatic illustration of the molten intermediate transfer material layer acting as an intermediate transfer surface supporting the marking material.
Figure 5:
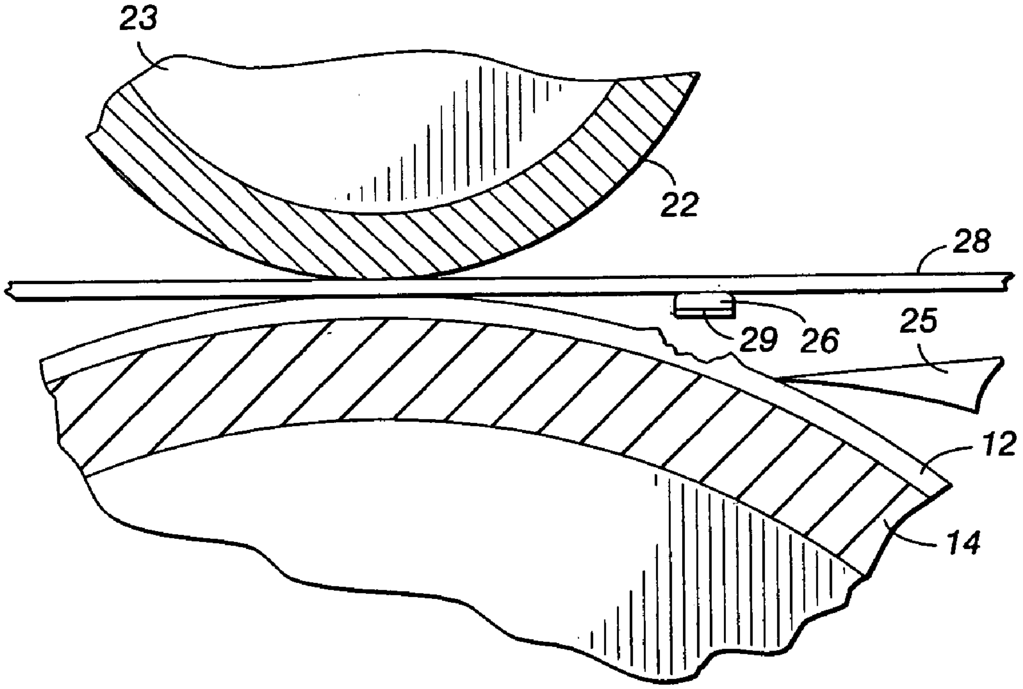
FIG. 5 is an enlarged diagrammatic illustration of the transfer of the image from the molten intermediate transfer material layer to a final recording substrate.

A marking material applicator 11, such as a printhead, is supported by an appropriate housing and support elements (not shown) for either stationary or moving utilization to place a marking material in the liquid or molten state on the molten intermediate transfer material layer 12 of FIGS. 4 and 5 that is applied to the surface of the intermediate transfer member 14. Layer 12 is a layer of a molten intermediate transfer material that is applied to the intermediate transfer member 14, which is shown as a drum, but can also be a web, platen, or any other suitable design, by contact with solid block of intermediate transfer material 15 contained within applicator assembly 16. The intermediate transfer member 14 can be formed from any appropriate material, such as metals, including but not limited to aluminum, nickel or iron phosphate, elastomers, including but not limited to fluoroelastomers, perfluoroelastomers, intermediate transfer rubber, and polybutadiene, plastics, including but not limited to polytetrafluorethylene loaded with polyphenylene sulfide, thermoplastics such as polyethylene, nylon, and FEP, thermosets such as acetals, ceramics, or the like, provided that the exposed surface is sufficiently rigid to deform the transferred image 26 when the final recording substrate passes between it and the transfer and fixing roller 22 and sufficiently smooth so as not to interfere with the ability of the molten intermediate transfer material layer 12 to support the image 26 of FIG. 4. One specific example of a suitable material is anodized aluminum.

Referring to FIG. 1, an applicator assembly 51 applies a molten layer of intermediate transfer material to the surface of the intermediate transfer member 14. Applicator assembly 51 comprises a holder 16 containing a solid block 15 of the intermediate transfer material. Solid block 15 can be of any desired shape, such as a rectangle, a cylinder, a sphere, or the like, and can also be of no particular defined or symmetrical shape. In one specific embodiment, block 15 is cast by pouring molten intermediate transfer material at a temperature above the melting point of the intermediate transfer material into a mold shaped such that the solid block obtained upon cooling of the mold and removal of the block therefrom results in formation of a block having at least one surface that substantially conforms to the shape of intermediate transfer member 14. For example, when intermediate transfer member 14 is flat, at least one surface of block 15 is substantially flat. As illustrated in the Figures, when intermediate transfer member 14 is a cylindrical drum, block 15 has at least one surface shaped in an arc with a radius substantially similar to that of the radius of drum 14. Holder 16 is mounted for retractable movement into an engaged position toward the surface of intermediate transfer member 14 or into a disengaged position away from the surface of the intermediate transfer member 14 and the molten layer 12 by means of any desired or appropriate mechanism, such as an air cylinder or an electrically actuated solenoid. In the engaged position, a surface of the block of intermediate transfer material held in holder 16 of the applicator assembly 51 contacts the surface of the intermediate transfer member 14. In the illustrated embodiment, holder 16 is mounted on platform 17 which can swing upward into position or downward around pivot 18. The pivot 18 can be a rotatable shaft retractor fixedly attached to the platform 17 so that rotation of the shaft moves the platform between the engaged position and the disengaged position. In another configuration, the pivot 18 can be a pin, and a separate retractor attached to the platform causes the platform to rotate about the pin and move between the engaged and disengaged positions. In yet another configuration, a retractor can cause the platform 17 to move linearly toward and away from the intermediate transfer member. Any other method of moving holder 16 toward and away from intermediate transfer member 14 can also be employed. In FIG.

1, platform 17 is in a first position wherein block 15 is in contact with intermediate transfer member 14, and in FIGS. 2 and 3, platform 17 is in a second position wherein block 15 is not in contact with intermediate transfer member 14. In addition, block 15 within holder 16 is mounted with a biasing mechanism, such as a spring, positive hydraulic pressure, positive pneumatic pressure, a screw mechanism, an extruder wherein soft material replenishes block 15 either periodically or incrementally each time applicator apparatus is raised to be in contact with intermediate transfer member 14, a stepping mechanism whereby block 15 is raised either periodically or incrementally each time applicator apparatus 51 is raised to be in contact with intermediate transfer member 14, a ratchet, a motor, or the like continually to urge the surface of the block 15 toward the surface of the intermediate transfer member 14 and to maintain block 15 in contact with intermediate transfer member 14 as block 15 melts and is consumed. Holder 16 can be mounted in the apparatus in any desired or effective configuration, such as in the illustrated embodiment being mounted adjacent to intermediate transfer member 14, being mounted on the central shaft or axis of rotation of intermediate transfer member 14 when member 14 is a drum (not shown), or the like. Blade 13 meters the molten material applied from block 15 to form a film of the desired thickness of molten intermediate transfer material layer 12 on intermediate transfer member 14. In the illustrated embodiment, blade 13 is mounted on platform 17 and is a part of applicator assembly 51; alternatively (not shown), blade 13 can be mounted separately from applicator assembly 51. The blade 13 meters the film of intermediate transfer material to a substantially uniform thickness.

As shown in FIG. 2, applicator assembly 51 is in the disengaged position and marking material applicator 11 applies droplets of marking material 26 in an imagewise pattern to the layer of molten intermediate transfer material 12 on intermediate transfer member 14.

A transferring apparatus 61, including a transfer roller 22, transfers the imagewise pattern of marking material from the intermediate transfer member 14 to a final recording substrate 28, as shown in FIG. 3. The transferring apparatus 61 is shown in an engaged position toward intermediate transfer member 14 in FIG. 3 and is shown in a disengaged position away from intermediate transfer member 14 in FIGS. 1 and 2. An optional final recording substrate guide 20 passes the final recording substrate 28, such as paper, from a positive feed device (not shown) and guides it through the nip formed by the opposing arcuate surfaces of the roller 22 and the molten intermediate transfer material layer 12 supported by the intermediate transfer member 14. Optional stripper fingers 25 (only one of which is shown) can be mounted to the imaging apparatus 10 to assist in removing any final recording substrate medium from the exposed surface of the molten intermediate transfer material layer 12. Roller 22 in one embodiment has a metallic core 23, such as steel, with an elastomeric covering that typically has a 40 to 45 Shore D rating, although the value can be outside of this range. Suitable elastomeric covering materials include intermediate transfers, urethanes, nitrites, EPDM, and other appropriately resilient materials. The elastomeric covering on roller 22 engages the final recording substrate 28 on the reverse side to which the image 26 is transferred from the exposed surface of the molten intermediate transfer material layer 12, which fuses or fixes the image 26 to the surface of the final recording substrate so that the image is spread, flattened, and adhered. When fusing is not taking place, roller 22 is retracted to eliminate contact between roller 22 and intermediate transfer member 14.

The marking material used in the process and system is in one embodiment initially in solid form and is then changed to a molten state by the application of heat energy to raise the temperature, typically to from about 85 to about 150° C., although the temperature can be outside of this range. The molten marking material is then applied, as shown in FIG. 2, in raster fashion from the ink jets in the printhead 11 to the exposed surface of the molten intermediate transfer material layer 12, where it is cooled to an intermediate temperature and solidifies to a malleable state in which it is transferred, as shown in FIG. 3, to the final recording surface 28 via a contact transfer by entering the nip between the roller 22 and the molten intermediate transfer material layer 12 on the intermediate transfer member 14. This intermediate temperature where the marking material is maintained in its malleable state is typically from about 30 to about 80° C., although the temperature can be outside of this range.

Once the solid malleable image enters the nip, it is deformed to its final image conformation and adheres or is fixed to the final recording substrate either by the pressure exerted against image 26 on the final recording substrate 28 by the roller 22 alone, or by the combination of the pressure and heat supplied by optional heater 21 and/or optional heater 19. Optional heater 24 can also be employed to supply heat to facilitate the process at this point. The pressure exerted on the image 26 in one embodiment is from about 10 to about 2000 pounds per square inch (psi), in another embodiment from about 500 to about 1000 psi, and in yet another embodiment from about 750 to about 850 psi, although the pressure can be outside of these ranges. The pressure generally causes the image 26 to adhere to the final recording substrate 28 and to be sufficiently deformed to ensure that light is transmitted through the image rectilinearly or without significant deviation in its path from the inlet to the outlet, in those instances when the final recording substrate is a transparency. Once adhered to the final recording substrate 28, the image is cooled to ambient temperature, typically about 20 to 25° C., although the temperature can be outside of this range.

FIG. 5 diagrammatically illustrates the sequence when an image 26 is transferred from the molten intermediate transfer material layer 12 to the final recording substrate 28. As seen in FIG. 5, the image 26 transfers to the final recording substrate 28 with a small but measurable quantity of the intermediate transfer material in layer 12 attached thereto as an outer layer 29. The average thickness of the transferred intermediate transfer material forming outer layer 29 is in one embodiment at least about 0.1 nanometer, and in another embodiment at least about 1 nanometer, and in one embodiment no more than about 100 nanometers, and in another embodiment no more than about 10 nanometers, although the thickness can be outside of this range. Alternatively, the quantity of transferred intermediate transfer material outer layer 29 can be expressed in terms of mass as being in one embodiment at least about 0.1 milligram per page, in another embodiment at least about 0.5 milligram per page, and in yet another embodiment at least about 1 milligram per page, and in one embodiment no more than about 200 milligrams per page, in another embodiment no more than about 50 milligrams per page, and in yet another embodiment no more than about 10 milligrams per page of final recording substrate 28, although the mass can be outside of these ranges. The amount or thickness of intermediate transfer material transferred to the final recording substrate will depend upon, or can be controlled by adjusting, variables such as the viscosity of the intermediate transfer material, the temperature of the intermediate transfer material, the temperature of the intermediate transfer member, the temperature of the final recording substrate, the composition of the intermediate transfer material, the process used to transfer and/or fuse the image to the final recording substrate, and the like. Transfer of the intermediate transfer material to the final recording substrate can enable control of the surface characteristics of the imaged final recording substrate, such as gloss, transparency, and the like; surface characteristics of the imaged final recording substrate can be thus adjusted in image areas only, or on the entire surface in both imaged and nonimaged areas.

Some of the intermediate transfer material in the molten intermediate transfer material layer 12 also is transferred to the final recording substrate in areas adjacent to the transferred image 26.

While the thickness of the molten intermediate transfer material layer 12 on the intermediate transfer member 14 can be measured, such as by the use of reflectance Fourier Transform infrared spectroscopy or a laser interferometer, it is theorized that the thickness can be in one embodiment at least about 0.05 micron, in another embodiment at least about 0.1 micron, and in yet another embodiment at least about 1 micron, and in one embodiment no more than about 60 microns, in another embodiment no more than about 50 microns, and in yet another embodiment no more than about 10 microns, although the thickness can be outside of these ranges. The thickness of the layer forming molten intermediate transfer material surface 12 can increase if rougher surfaced intermediate transfer members 14 are employed. The surface topography of the intermediate transfer member 14 has a roughness average ($R_a$) in one embodiment of at least about 254 Angstroms and in one embodiment no more than about 25,400 Angstroms (in one embodiment at least about 1 microinch, and in another embodiment at least about 5 microinches, and in one embodiment no more than about 100 microinches, and in another embodiment no more than about 15 microinches), although the roughness can be outside of these ranges.

The molten intermediate transfer material layer 12 on the surface of intermediate transfer member 14 is heated in one embodiment by an appropriate heater device 19. Heater device 19 can be a radiant resistance heater, a heating lamp, or the like, positioned as shown or, in another embodiment, positioned internally within the intermediate transfer member 14. Optional heater devices 21 and 24 can also be employed in the optional final recording substrate guide apparatus 20 and in the fusing and fixing roller 22, respectively. Heater device 19 increases the temperature of the intermediate transfer member 14 from ambient temperature to a temperature at which the intermediate transfer material will melt upon contacting intermediate transfer member 14, in one embodiment at least about 40° C., in another embodiment at least about 50° C., and in yet another embodiment at least about 60° C., and in one embodiment no more than about 120° C., in another embodiment no more than about 100° C., in yet another embodiment no more than about 80° C., and in still another embodiment no more than about 70° C., although the temperature can be outside of these ranges. This temperature is dependent upon the exact nature of the intermediate transfer material employed in molten intermediate transfer material layer 12 and the marking material employed. Heater device 19 can also be situated in any other effective position relative to the other components; for example, it can be situated so that it applies heat to intermediate transfer member 14 prior to application of intermediate transfer material layer by applicator assembly 51, or it can be situated inside of intermediate transfer member 14, as, for example, a heating spiral, a lamp, a near-IR incubator, or the like.

Optional substrate heater 21 preheats the final recording substrate prior to the fixation of the image by being set to heat to a temperature of in one embodiment at least about 60° C., and in another embodiment at least about 65° C., and in one embodiment no more than about 80° C., in another embodiment no more than about 75° C., and in yet another embodiment no more than about 70° C., although the temperature can be outside of these ranges. It is theorized that optional substrate heater 21 raises the temperature of the final recording substrate; the thermal energy of the final recording substrate, however, is kept sufficiently low so as not to melt the marking material upon transfer to the final recording substrate 28. Optional heater 24, when employed, heats the transfer and fixing roller 22 to a temperature of in one embodiment from about 25 to about 200° C., although the temperature can be outside of this range, and alternatively can also be situated internally within roller 22.

In operation the intermediate transfer member 14 has a layer of molten intermediate transfer material applied to its surface by the action of the applicator assembly 51. The retractor moves the holder 16 mounted on platform 17 into its engaged position by an appropriate mechanism, such as a gear mechanism, an air cylinder, or the like, in which the solid block of intermediate transfer material 15 is in contact with the surface of the intermediate transfer member 14. The intermediate transfer material is retained as block 15 within the holder 16 until it is placed in contact with moving (for example, rotating, when intermediate transfer member 14 is a cylinder) heated intermediate transfer member 14 to permit melting of the material within block 15 to enable formation of a substantially uniform layer of desired thickness of the molten intermediate transfer material to be deposited as a layer on the surface of the intermediate transfer member 14, metered by blade 13. In the shown specific embodiment wherein the intermediate transfer member is in the form of a drum, the drum 14 rotates about a journalled shaft in the direction shown in FIG. 1 while the heater 19 heats the surface of the intermediate transfer member 14 to the desired temperature. Once the entire periphery of the intermediate transfer member 14 has been coated, the applicator assembly 51 is moved to a disengaged, or non-contact, position as shown in FIGS. 2 and 3, with the molten intermediate transfer material layer 12 on the exterior of the intermediate transfer member 14.

Marking material is then applied to the exposed surface of the molten intermediate transfer material layer 12 by the printhead 11 as shown in FIG. 2. In one specific embodiment, the marking material is applied in molten form, having been melted from its solid state form by appropriate heating means (not shown). The image 26 solidifies on the surface of the molten intermediate transfer material layer by cooling to a malleable solid intermediate state as the intermediate transfer member continues to rotate. Thereafter, as shown in FIG. 3, transfer roller 22 moves into contact with intermediate transfer member 14 and the image on the intermediate transfer member 14 enters the nip formed by the transfer roller 22 and the surface of the molten intermediate transfer material layer 12 supported by the intermediate transfer member 14. The image 26 is deformed to its final image conformation and adhered to the final recording substrate 28 by being pressed thereagainst. The image 26 is thus transferred and fixed to the final recording substrate 28 by the pressure exerted on it in the nip by the resilient or elastomeric surface of the roller 22. Optional stripper fingers 25 help to remove the imaged final recording substrate 28 from the molten intermediate transfer material layer 12 as the intermediate transfer member 14 rotates. The image 26 then cools to ambient temperature, where it possesses sufficient strength and ductility to ensure its durability.

The final recording substrate can have images generated on only one surface thereof, or both surfaces thereof can be imaged by this imaging method in a duplex printing process.

While intermediate transfer member is shown in the Figures as rotating in the same direction throughout all of the printing steps, it is also possible to reverse the direction of intermediate transfer member at any point in the process. For example, between the imaging step shown in FIG. 2 and the transfer step shown in FIG. 3, intermediate transfer member 14 can be reversed in its direction of rotation; in this instance, elements 20, 21, 22, 23, 24, and 25 would be in mirror image configuration to what they are shown in FIG. 3. In addition, the speed of movement of intermediate transfer member 14 can be varied at any point throughout the process. For example, between the imaging step shown in FIG. 2 and the transfer step shown in FIG. 3, intermediate transfer member 14 can be slowed if desired.

In a specific embodiment, wherein the intermediate transfer material (and also, optionally, the marking material such as a phase change ink) contains a reactive material, such as crosslinkable monomers, oligomers, or polymers, the apparatus can further comprise optional curing station 71 which can cure the reactive material in the intermediate transfer material and/or the marking material by any desired or effective method, such as by exposure to ultraviolet radiation, infrared radiation, light in the visible wavelength range, e-beam radiation, X-ray radiation, heat, moisture, or the like, as well as combinations thereof.

For the purposes of the present invention, the terms "printer", "printing apparatus", "printing process", and the like include any and all processes in which an image is generated on a final recording substrate, such as sending images from a computer to a printer, generating copies in a copier by scanning the original images either optically or digitally and printing the copies, sending images via facsimile to an output printer, or any other apparatus or combination of apparatus that can generate or reproduce an image on a final recording substrate such as paper, transparency stock, cloth, wood, or the like. Any suitable final recording substrate can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

Examples of suitable intermediate transfer materials include (but are not limited to) silicone compositions, such as those including silicone polymers containing monomers of the formula

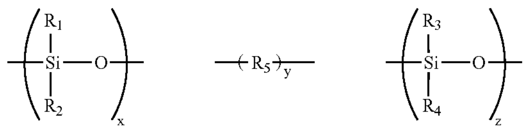

wherein $R_1$ and $R_2$ each, independently of the other, are hydrogen atoms, hydroxy groups, alkyl groups (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 2 carbon atoms, in yet another embodiment with at least about 3 carbon atoms, in still another embodiment with at least about 12 carbon atoms, in another embodiment with at least about 14 carbon atoms, in yet another embodiment with at least about 16 carbon atoms, and in still another embodiment with at least about 18 carbon atoms, and in one embodiment with no more than about 100 carbon atoms, and in another embodiment with no more than about 50 carbon atoms, although the number of carbon atoms can be outside of these ranges, aryl groups (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 100 carbon atoms, and in another embodiment with no more than about 50 carbon atoms, although the number of carbon atoms can be outside of these ranges, arylalkyl groups (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 100 carbon atoms, and in another embodiment with no more than about 50 carbon atoms, although the number of carbon atoms can be outside of these ranges, such as benzyl or the like, or alkylaryl groups (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 100 carbon atoms, and in another embodiment with no more than about 50 carbon atoms, although the number of carbon atoms can be outside of these ranges, such as tolyl or the like, provided that at least one of $R_1$ and $R_2$ have in one embodiment at least about 12 carbon atoms, in another embodiment at least about 14 carbon atoms, in yet another embodiment at least about 16 carbon atoms, in still another embodiment at least about 18 carbon atoms, in another embodiment at least about 20 carbon atoms, in yet another embodiment at least about 22 carbon atoms, in still another embodiment at least about 24 carbon atoms, in another embodiment at least about 26 carbon atoms, and in yet another embodiment at least about 28 carbon atoms, wherein the total number of carbon atoms in $R_1+R_2$ is no more than about 100, $R_3$ and $R_4$ each, independently of the other, are hydrogen atoms, hydroxy groups, alkyl groups (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group) with at least 1 carbon atom, and in one embodiment with no more than about 12 carbon atoms, in another embodiment with no more than about 10 carbon atoms, and in yet another embodiment with no more than about 8 carbon atoms, although the number of carbon atoms can be outside of these ranges, aryl groups (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 12 carbon atoms, in another embodiment with no more than about 10 carbon atoms, and in yet another embodiment with no more than about 8 carbon atoms, although the number of carbon atoms can be outside of these ranges, arylalkyl groups (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 12 carbon atoms, in another embodiment with no more than about 10 carbon atoms, and in yet another embodiment with no more than about 8 carbon atoms, although the number of carbon atoms can be outside of these ranges, such as benzyl or the like, or alkylaryl groups (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 12 carbon atoms, in another embodiment with no more than about 10 carbon atoms, and in yet another embodiment with no more than about 8 carbon atoms, although the number of carbon atoms can be outside of these ranges, such as tolyl or the like, wherein the total number of carbon atoms in $R_3+R_4$ is in one embodiment no more than about 20, in another embodiment no more than about 18, in yet another embodiment no more than about 16, in still another embodiment no more than about 14, in another embodiment no more than about 12, in yet another embodiment no more than about 10, in still another embodiment no more than about 8, in another embodiment no more than about 6, in yet another embodiment no more than about 4, and in still another embodiment no more than about 2, $R_5$ is an alkylene group (including linear, branched, cyclic, saturated, unsaturated, substituted, and unsubstituted alkylene groups, and wherein hetero atoms, such as oxygen, nitrogen, sulfur, silicon, phosphorus, and the like either may or may not be present in the alkylene group), having at least 1 carbon atom (as in the case of $—(CH_2)_y—$) and in one embodiment with no more than about 40 carbon atoms, in another embodiment with no more than about 30 carbon atoms, in yet another embodiment with no more than about 24 carbon atoms, in still another 35 embodiment with no more than about 20 carbon atoms, and in another embodiment with no more than about 16 carbon atoms, although the number of carbon atoms can be outside of these ranges, an arylene group (including substituted and unsubstituted arylene groups, and wherein hetero atoms, such as oxygen, nitrogen, sulfur, silicon, phosphorus, and the like either may or may not be present in the arylene group), in one embodiment with at least about 4 carbon atoms, in another embodiment with at least about 5 carbon atoms, and in yet another embodiment with at least about 6 carbon atoms (as in the case of a polyphenylene $(-(\phi)_y-)$, and in one embodiment with no more than about 24 carbon atoms, and in another embodiment with no more than about 12 carbon atoms, although the number of carbon atoms can be outside of these ranges, an arylalkylene group (including substituted and unsubstituted arylalkylene groups, wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the alkyl and the aryl portions of the arylalkylene group), in one embodiment with at least about 5 carbon atoms, in another embodiment with at least about 6 carbon atoms, in yet another embodiment with at least about 7 carbon atoms, in still another embodiment with at least about 8 carbon atoms, and in another embodiment with at least about 9 carbon atoms, and in one embodiment with no more than about 42 carbon atoms, in another embodiment with no more than about 36 carbon atoms, and in yet another embodiment with no more than about 30 carbon atoms, although the number of carbon atoms can be outside of these ranges, or an alkylarylene group (including substituted and unsubstituted alkylarylene groups, wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the alkyl and the aryl portions of the alkylarylene group), in one embodiment with at least about 5 carbon atoms, in another embodiment with at least about 6 carbon atoms, in yet another embodiment with at least about 7 carbon atoms, in still another embodiment with at least about 8 carbon atoms, and in another embodiment with at least about 9 carbon atoms, and in one embodiment with no more than about 42 carbon atoms, in another embodiment with no more than about 36 carbon atoms, and in yet another embodiment with no more than about 30 carbon atoms, although the number of carbon atoms can be outside of these ranges, wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, ethylene oxide groups, oxiran groups, vinyl groups, allyl groups, mixtures thereof, and the like, wherein two or more substituents can be joined together to form a ring.

Since the $R_1$, $R_2$, $R_3$, $R_4$, and $R_5$ groups can include hetero atoms, included in the range of possible $R_1$, $R_2$, $R_3$, $R_4$, and $R_5$ groups are alkoxy groups, wherein the alkyl portion of the alkoxy group is as defined for alkyl, such as methoxy, ethoxy, propoxy, butoxy, and the like, polyalkyleneoxy groups, such as polyethylene oxide groups ($—(CH_2CH_2O)_a—$), polypropylene oxide groups ($—(C_3H_6O)_a—$), polybutylene oxide groups ($—(C_4H_8O)_a—$), and the like, aryloxy groups, wherein the aryl portion of the aryloxy group is as defined for aryl, polyaryleneoxy groups, such as polyphenylene oxide groups ($—(C_6H_4O)_a—$) and the like, arylalkyloxy groups, wherein the arylalkyl portion of the arylalkyloxy group is defined as for arylalkyl, polyarylalkylene oxide groups, such as polybenzyloxide groups ($—(C_6H_4—CH_2—O)_a—$) and the like, alkylaryloxy groups, wherein the alkylaryl portion of the alkylaryloxy group is as defined for alkylaryl, polyalkylarylene oxide groups, such as polytolueneoxide groups ($—(CH_3—C_6H_4—O)_a—$) and the like, wherein in each instance a represents the number of repeat monomer units. Also included are alkyl groups containing a sulfur atom (—S—) therein, such as those disclosed in, for example, U.S. Pat. No. 6,007,800, U.S. Pat. No. 5,976,517, U.S. Pat. No. 6,086,862, U.S. Pat. No. 5,362,485, and U.S. Pat. No. 6,132,707, the disclosures of each of which are totally incorporated herein by reference.

By "polymers" are meant compounds having two or more monomer repeat units, either directly bonded to each other or bonded to each other through spacer groups, including dimers, trimers, oligomers, and the like.

In one specific embodiment, one or both of $R_1$ and $R_2$ are terminated by methoxy groups ($—OCH_3$) or hydroxy groups.

The polymers can be terminated by any desired or effective terminal groups. Examples of suitable terminal groups include (but are not limited to) —H, —OH, $—OC_nH_{2n+1}$ wherein n is an integer of from 1 to about 20, $—C_nH_{2n+1}$ wherein n is an integer of from 1 to about 20, $—C_nH_{2n+1}OH$ wherein n is an integer of from 1 to about 20, $—C_nH_{2n+1}NH_2$ wherein n is an integer of from 1 to about 20,

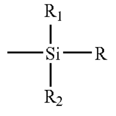

groups wherein R is $—C_nH_{2n+1}$ wherein n is an integer of from 1 to about 20, $—C_nH_{2n+1}OH$ wherein n is an integer of from 1 to about 20, $C_nH_{2n+1}NH_2$ wherein n is an integer of from 1 to about 20, or the like,

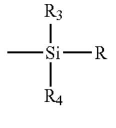

groups wherein R is $—C_nH_{2n+1}$ wherein n is an integer of from 1 to about 20, $—C_nH_{2n+1}OH$ wherein n is an integer of from 1 to about 20, $—C_nH_{2n+1}NH_2$ wherein n is an integer of from 1 to about 20, and the like, as well as mixtures thereof.

The letters x, y, and z each, independently of the others, are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1.

More specifically, in the embodiment wherein x is at least about 1 and wherein y and z each may be 0, in one specific embodiment x is at least 1, in another embodiment x is at least about 10, and in yet another embodiment x is at least about 20, and in one embodiment x is no more than about 1,000, in another embodiment x is no more than about 200, in yet another embodiment x is no more than about 100, and in still another embodiment x is no more than about 20, although the value of x can be outside of these ranges. When y is not 0, in one specific embodiment y is at least 1, in another embodiment y is at least about 3, and in yet another embodiment y is at least about 5, and in one embodiment y is no more than about 20, and in another embodiment y is no more than about 10, although the value of y can be outside of these ranges. When z is not 0, in one specific embodiment z is at least 1, in another embodiment z is at least about 10, and in yet another embodiment z is at least about 20, and in one embodiment z is no more than about 1,000, in another embodiment z is no more than about 200, and in yet another embodiment z is no more than about 100, although the value of z can be outside of these ranges.

In the embodiment wherein x may be 0, y is at least 1, and z is at least 1, when x is not 0, in one specific embodiment x is at least 1, in another embodiment x is at least about 2, and in yet another embodiment x is at least about 5, and in one embodiment x is no more than about 100, in another embodiment x is no more than about 30, and in yet another embodiment x is no more than about 20, although the value of x can be outside of these ranges. In this embodiment, in one specific embodiment y is at least 1, in another embodiment y is at least about 2, and in yet another embodiment y is at least about 10, and in one embodiment, y is no more than about 100, in another embodiment y is no more than about 20, and in yet another embodiment y is no more than about 10, although the value of y can be outside of these ranges. In this embodiment, in one specific embodiment z is at least 1, and in another embodiment z is at least about 2, and in one embodiment z is no more than about 50, and in another embodiment z is no more than about 20, although the value of z can be outside of these ranges.

The polymers can be homopolymers (when y and z are each 0), block copolymers, alternating copolymers, random copolymers, or the like.

Examples of suitable polymers include block, random, and alternating copolymers containing monomers of the formula

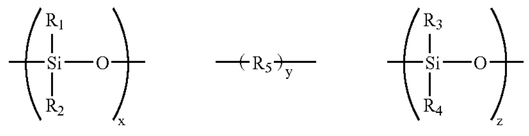

wherein the monomers can appear in any order and wherein x is at least 1 and y and z are each at least 1, block, alternating, and random copolymers containing monomers of the formula

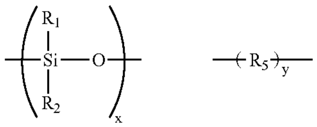

wherein x is at least 1 and y is at least 1, block copolymers containing monomers of the formula

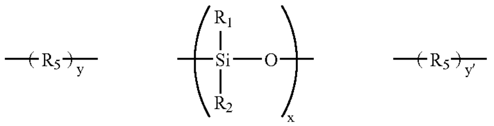

wherein the monomers are in blocks in the order shown and wherein x is at least 1 and y and y' are each at least 1, block copolymers containing monomers of the formula

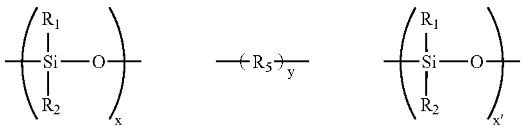

wherein the monomers are in blocks in the order shown and wherein x and x' are each at least 1 and y is at least 1, block, alternating, and random copolymers containing monomers of the formula

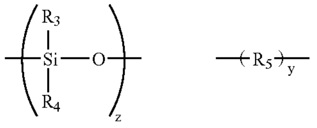

wherein y and z are each at least 1, block copolymers containing monomers of the formula

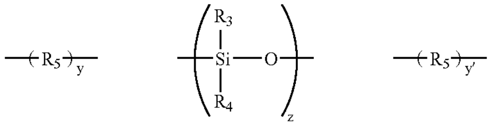

wherein the monomers are in blocks in the order shown and wherein z, y, and y' are each at least 1, block copolymers containing monomers of the formula

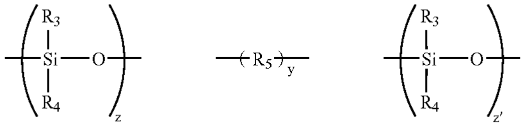

wherein the monomers are in blocks in the order shown and wherein z, z', and y are each at least 1, homopolymers containing monomers of the formula

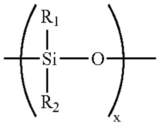

wherein x is at least 2, and the like. All of the above examples of polymers can be terminated by any desired or effective terminal groups. Examples of suitable terminal groups include (but are not limited to) —H, —OH, —$OC_nH_{2n+1}$ wherein n is an integer of from 1 to about 20, —$C_nH_{2n+1}$ wherein n is an integer of from 1 to about 20, —$C_nH_{2n+1}OH$ wherein n is an integer of from 1 to about 20, —$C_nH_{2n+1}NH_2$ wherein n is an integer of from 1 to about 20,

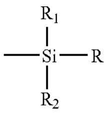

groups wherein R is —$C_nH_{2n+1}$ wherein n is an integer of from 1 to about 20, —$C_nH_{2n+1}OH$ wherein n is an integer of from 1 to about 20, —$C_nH_{2n+1}NH_2$ wherein n is an integer of from 1 to about 20, or the like,

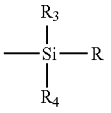

groups wherein R is —$C_nH_{2n+1}$ wherein n is an integer of from 1 to about 20, —$C_nH_{2n+1}OH$ wherein n is an integer of from 1 to about 20, —$C_nH_{2n+1}NH_2$ wherein n is an integer of from 1 to about 20, and the like, as well as mixtures thereof.

In embodiments wherein the polymer is a copolymer with one or more siloxane monomers of the formula

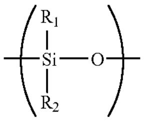

or

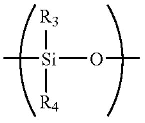

are chemically bonded to one or more monomers of the formula

the siloxane monomers can be bonded to the $R_5$ monomers by direct Si—C or Si—O—C bonds, or they can be bonded to the $R_5$ monomers through spacer groups.

Suitable as spacer groups are those of the formula $—CH_2—CH_2—CH_2—$ which are formed when the siloxane monomer or polymer and the $R_5$ monomer or polymer are linked through a reaction for example as follows:

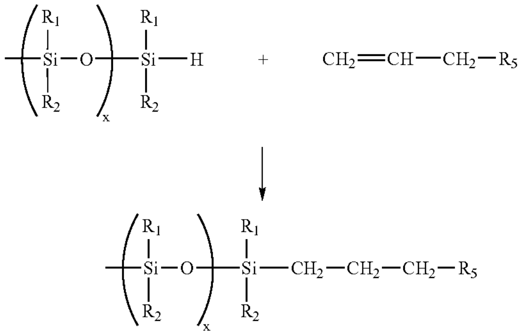

This reaction depends on the presence of the Si—H bond, which is moisture sensitive; accordingly, the reaction is performed in the absence of moisture. This reaction can also be used for linking siloxane monomers or polymers of the formula

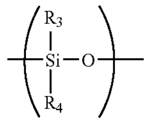

to $R_5$ monomers or polymers for example as follows:

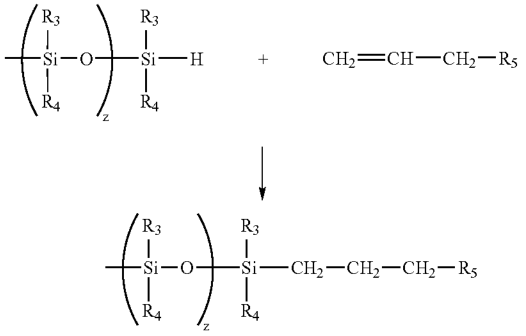

In addition, this reaction can be used to place $R_1$, $R_2$, $R_3$, and $R_4$ groups on a monomer or polymer by providing a siloxane monomer or polymer in which some of the repeat siloxane monomer units have hydrogen atoms in the locations where an $R_1$, $R_2$, $R_3$, and/or $R_4$ group is desired and reacting the monomer or polymer with an alpha-olefin of the formula $CH_2═CH—CH_2—R$ wherein R represents a portion of $R_1$, $R_2$, $R_3$, $R_4$, or a mixture thereof; by "portion" is meant that the final $R_1$, $R_2$, $R_3$, or $R_4$ group in this instance will, of course, have three additional carbon atoms in an aliphatic saturated linear chain attached to the original R group. The reaction can be carried out in a solvent, such as toluene, xylene, various ketones, other aprotic solvents, or the like in the presence of a catalyst, such as hexachloroplatinate, in water-free conditions at a temperature of, for example, about 80° C.

$R_5$ monomers or polymer can also bonded to siloxane monomers or polymers by providing a siloxane monomer or polymer having a terminal $—R_7—SH$ group, for example as follows:

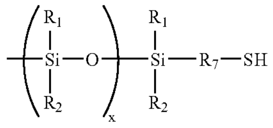

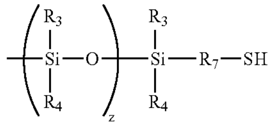

by reacting the siloxane monomer or polymer with a material of the formula $CH_2═CH—CH_2—R$ wherein R represents a portion of $R_5$; by "portion" is meant that the final $R_5$ group in this instance will, of course, have three additional carbon atoms in an aliphatic saturated linear chain attached to the original R group; and $R_1$, $R_2$, $R_3$, and $R_4$ groups can also be placed on a siloxane monomer or polymer by providing a siloxane monomer or polymer in which some of the repeat siloxane monomer units have $—R_7—SH$ groups in the locations where an $R_1$, $R_2$, $R_3$, and/or $R_4$ group is desired, for example as follows:

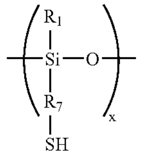 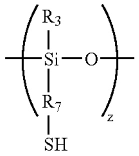

by reacting the siloxane monomer or polymer with a material of the formula $CH_2═CH—CH_2—R$ wherein R represents a portion of $R_1$, $R_2$, $R_3$, $R_4$, or a mixture thereof; by "portion" is meant that the final $R_1$, $R_2$, $R_3$, or $R_4$ group in this instance will, of course, have three additional carbon atoms in an aliphatic saturated linear chain attached to the original R group. $R_7$ can be an alkylene group (including linear, branched, cyclic, saturated, unsaturated, substituted, and unsubstituted alkylene groups, and wherein hetero atoms, such as oxygen, nitrogen, sulfur, silicon, phosphorus, and the like either may or may not be present in the alkylene group), in one embodiment with at least about 3 carbon atoms, and in one embodiment with no more than about 20 carbon atoms, although the number of carbon atoms can be outside of these ranges, an arylene group (including substituted and unsubstituted arylene groups, and wherein hetero atoms, such as oxygen, nitrogen, sulfur, silicon, phosphorus, and the like either may or may not be present in the arylene group), in one embodiment with at least about 5 carbon atoms, and in one embodiment with no more than about 20 carbon atoms, although the number of carbon atoms can be outside of these ranges, an arylalkylene group (including substituted and unsubstituted arylalkylene groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkylene group), in one embodiment with at least about 5 carbon atoms, and in one embodiment with no more than about 20 carbon atoms, although the number of carbon atoms can be outside of these ranges, or an alkylarylene group (including substituted and unsubstituted alkylarylene groups, wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the alkyl and the aryl portions of the alkylarylene group), in one embodiment with at least about 5 carbon atoms, and in one embodiment with no more than about 20 carbon atoms, although the number of carbon atoms can be outside of these ranges, wherein the substituents on the substituted alkylene, arylene, arylalkylene, and alkylarylene groups can be (but are not limited to) hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, ethylene oxide groups, oxiran groups, vinyl groups, allyl groups, mixtures thereof, and the like, wherein two or more substituents can be joined together to form a ring. The reaction can be carried out in a solvent, such as toluene, xylene, various ketones, other aprotic solvents, or the like, in the presence of a catalyst, such as hexachloroplatinate, in water-free conditions at a temperature of, for example, from about 80 to about 100° C.

Other examples of spacer groups include those of the formulae

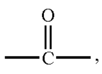, 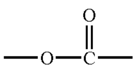 and 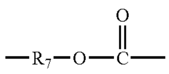

wherein $R_7$ is as defined hereinabove which are formed when the siloxane monomer or polymer and the $R_5$ monomer or polymer are linked through a reaction for example as follows:

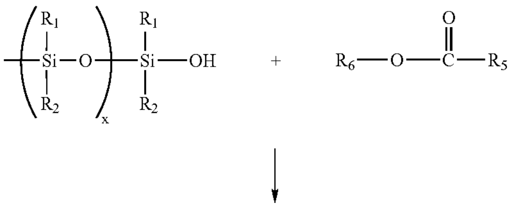

-continued

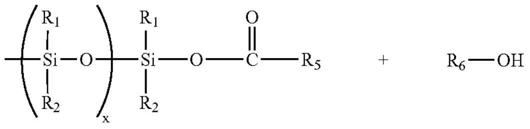

wherein $R_6$ is any desired hydrocarbon group, either with or without heteroatoms being present; in a preferred embodiment, $R_6$ is a relatively small moiety, such as —$CH_3$, $CH_3C(=O)$—, or the like, so that the resulting $R_6OH$ compound is sufficiently volatile to evaporate rapidly out of the reaction vessel. This reaction can also be used for linking siloxane monomers or polymers of the formula

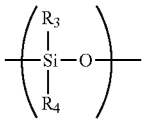

to $R_5$ monomers or polymers for example as follows:

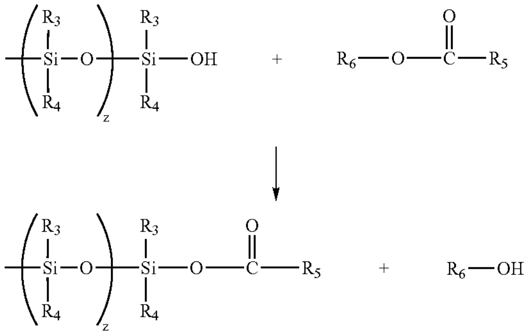

In addition, this reaction can be used to place $R_1$, $R_2$, $R_3$, and $R_4$ groups on a monomer or polymer by providing a siloxane monomer or polymer in which some of the repeat siloxane monomer units have —OH or —$R_7$—OH groups (wherein $R_7$ is defined as indicated hereinabove) in the locations where an $R_1$, $R_2$, $R_3$, and/or $R_4$ group is desired, for example as follows:

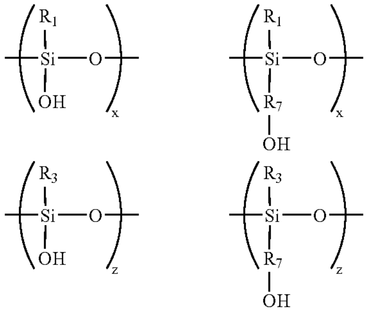

and reacting the monomer or polymer with a material of the formula

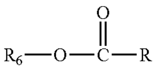

wherein R represents a portion of $R_1$, $R_2$, $R_3$, $R_4$, or a mixture thereof; by "portion" is meant that the final $R_1$, $R_2$, $R_3$, or $R_4$ group in this instance will, of course, have a

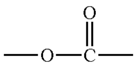

or

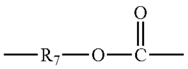

group attached to the original R group. The reaction can be carried out neat (i.e., no solvent is required, although solvents such as toluene, xylene, various ketones, other aprotic solvents, or the like can be employed if desired) in the presence of a metal organic catalyst, such as dibutyl tin dilaurate, in water-free conditions at a temperature of, for example, from about 80 to about 100° C.

Also suitable as spacer groups are those of the formulae

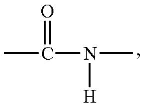

,

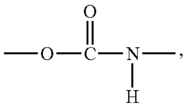

, and

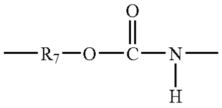

wherein $R_7$ is as defined hereinabove which are formed when the siloxane monomer or polymer and the $R_5$ monomer or polymer are linked through a reaction for example as follows:

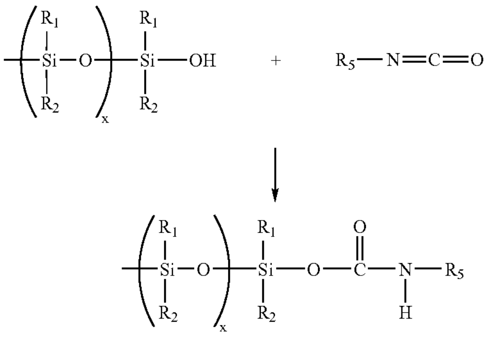

This reaction can also be used for linking siloxane monomers or polymers of the formula

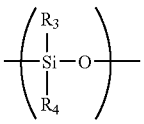

to $R_5$ monomers or polymers for example as follows:

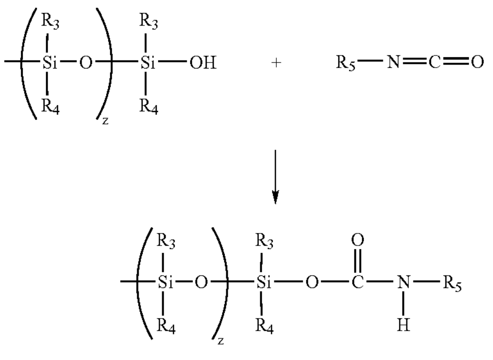

In addition, this reaction can be used to place $R_1$, $R_2$, $R_3$, and $R_4$ groups on a monomer or polymer by providing a siloxane monomer or polymer in which some of the repeat siloxane monomer units have —OH or —$R_7$—OH groups (wherein $R_7$ is defined as indicated hereinabove) in the locations where an $R_1$, $R_2$, $R_3$, and/or $R_4$ group is desired for example as follows:

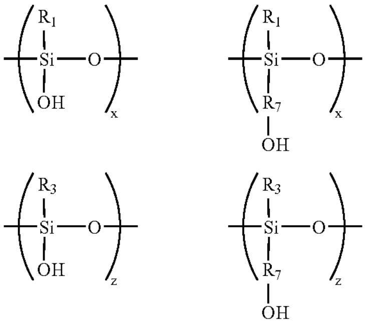

and reacting the monomer or polymer with a material of the formula

R—N=C=O wherein R represents a portion of $R_1$, $R_2$, $R_3$, $R_4$, or a mixture thereof; by "portion" is meant that the final $R_1$, $R_2$, $R_3$, or $R_4$ group in this instance will, of course, have a

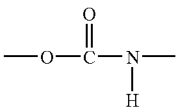

or

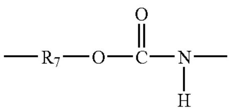

group attached to the original R group. The reaction can be carried out neat (i.e., no solvent is required, although solvents such as toluene, xylene, various ketones, other aprotic solvents, or the like can be employed if desired) in the presence of a metal organic catalyst, such as dibutyl tin dilaurate, in water-free conditions at a temperature of, for example, from about 60 to about 120° C.

Also suitable as spacer groups are those of the formula

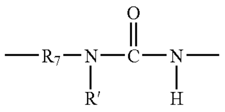

wherein $R_7$ is as defined hereinabove which are formed when the siloxane monomer or polymer and the $R_5$ monomer or polymer are linked through a reaction for example as follows:

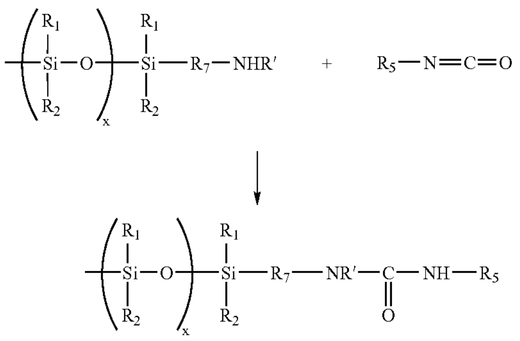

wherein $R_7$ is as defined hereinabove. R' is a hydrogen atom, an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least about 3 carbon atoms, and in one embodiment with no more than about 20 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in one embodiment with no more than about 20 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, and in one embodiment with no more than about 20 carbon atoms, although the number of carbon atoms can be outside of these ranges, or an alkylaryl group (including substituted and unsubstituted alkylaryl groups, wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the alkyl and the aryl portions of the alkylaryl group), in one embodiment with at least about 5 carbon atoms, and in one embodiment with no more than about 20 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, ethylene oxide groups, oxiran groups, vinyl groups, allyl groups, mixtures thereof, and the like, wherein two or more substituents can be joined together to form a ring. This reaction can also be used for linking siloxane monomers or polymers of the formula

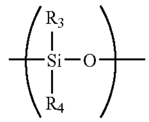

to $R_5$ monomers or polymers for example as follows:

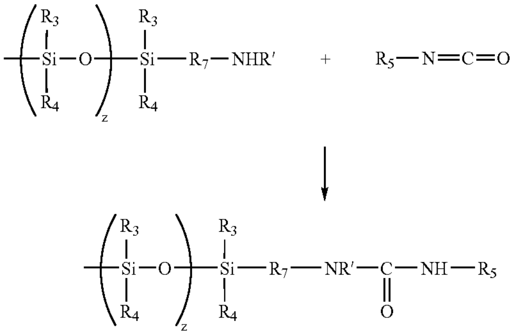

In addition, this reaction can be used to place $R_1$, $R_2$, $R_3$, and $R_4$ groups on a monomer or polymer by providing a siloxane monomer or polymer in which some of the repeat siloxane monomer units have —$R_7$—NHR' groups (wherein $R_7$ and R' are defined as indicated hereinabove) in the locations where an $R_1$, $R_2$, $R_3$, and/or $R_4$ group is desired for example as follows:

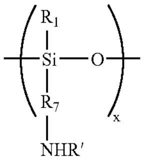 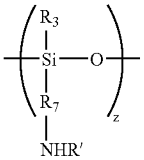

and reacting the monomer or polymer with a material of the formula $R—N=C=O$ wherein R represents a portion of $R_1$, $R_2$, $R_3$, $R_4$, or a mixture thereof; by "portion" is meant that the final $R_1$, $R_2$, $R_3$, or $R_4$ group in this instance will, of course, have a

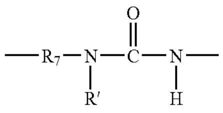

group attached to the original R group. The reaction can be carried out neat (i.e., no solvent is required, although solvents such as toluene, xylene, various ketones, other aprotic solvents, or the like can be employed if desired) in water-free conditions at room temperature.

Also suitable as spacer groups are those of the formulae

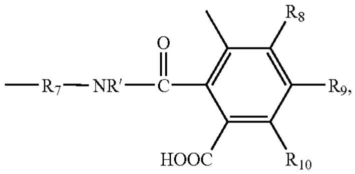

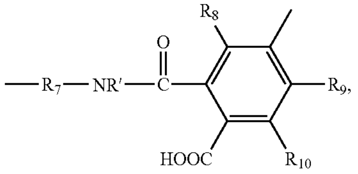

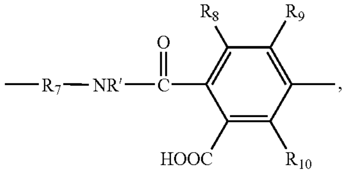

and

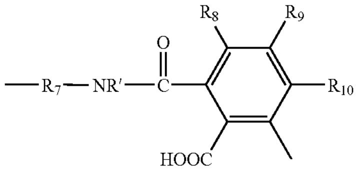

wherein $R_8$, $R_9$, and $R_{10}$ each, independently of the others, can be (but are not limited to) hydrogen atoms, hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, oxiran groups, alkyl groups (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 100 carbon atoms, and in another embodiment with no more than about 50 carbon atoms, although the number of carbon atoms can be outside of these ranges, aryl groups (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 100 carbon atoms, and in another embodiment with no more than about 50 carbon atoms, although the number of carbon atoms can be outside of these ranges, arylalkyl groups (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 100 carbon atoms, and in another embodiment with no more than about 50 carbon atoms, although the number of carbon atoms can be outside of these ranges, such as benzyl or the like, or alkylaryl groups (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 100 carbon atoms, and in another embodiment with no more than about 50 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, ethylene oxide groups, oxiran groups, vinyl groups, allyl groups, mixtures thereof, and the like, wherein two or more substituents can be joined together to form a ring. R' is a hydrogen atom, an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least about 3 carbon atoms, and in one embodiment with no more than about 20 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in one embodiment with no more than about 20 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, and in one embodiment with no more than about carbon atoms, although the number of carbon atoms can be outside of these ranges, or an alkylaryl group (including substituted and unsubstituted alkylaryl groups, wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the alkyl and the aryl portions of the alkylaryl group), in one embodiment with at least about 5 carbon atoms, and in one embodiment with no more than about 20 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, ethylene oxide groups, oxiran groups, vinyl groups, allyl groups, mixtures thereof, and the like, wherein two or more substituents can be joined together to form a ring. These spacer groups are formed when the siloxane monomer or polymer and the $R_5$ monomer or polymer are linked through a reaction for example as follows:

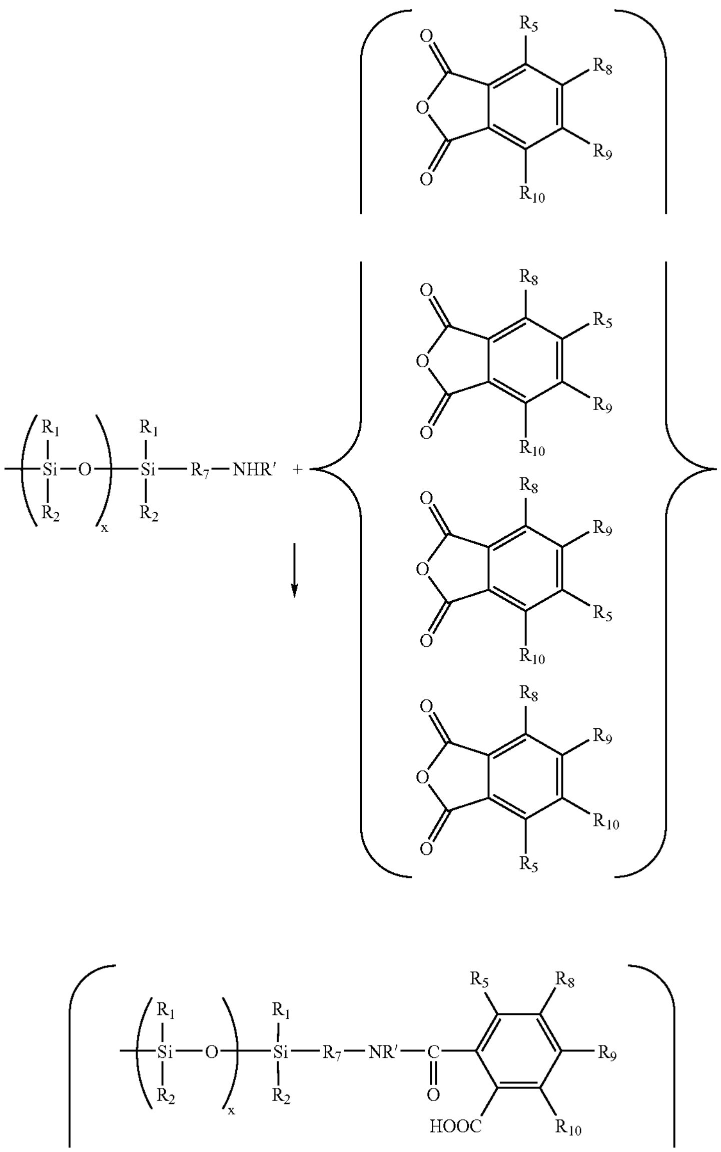

-continued
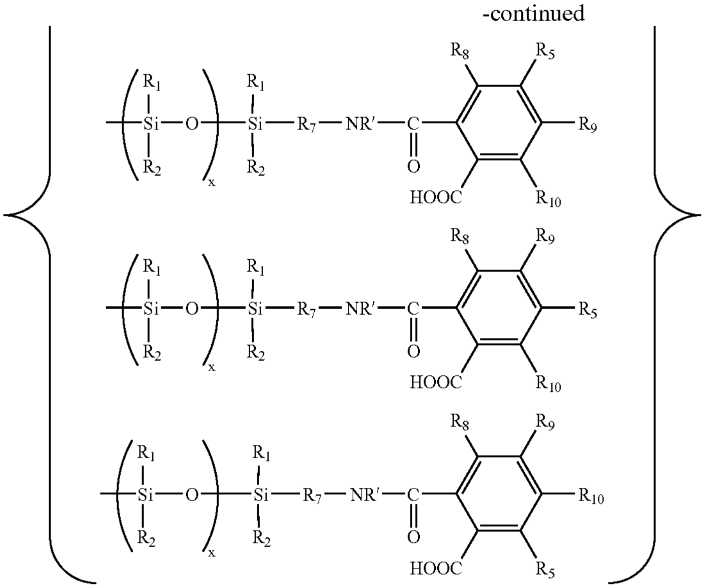
wherein $R_7$ and R' are as defined hereinabove. This reaction can also be used for linking siloxane monomers or polymers of the formula
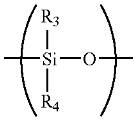
to $R_5$ monomers or polymers for example as follows:
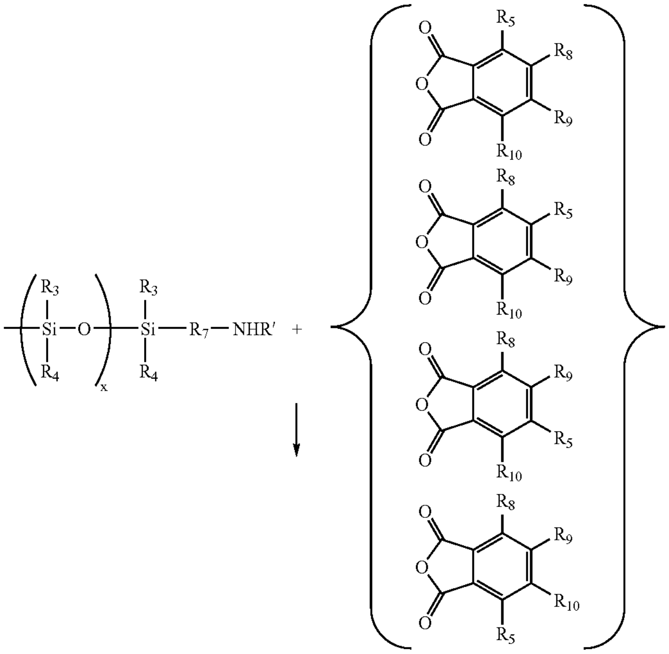

-continued

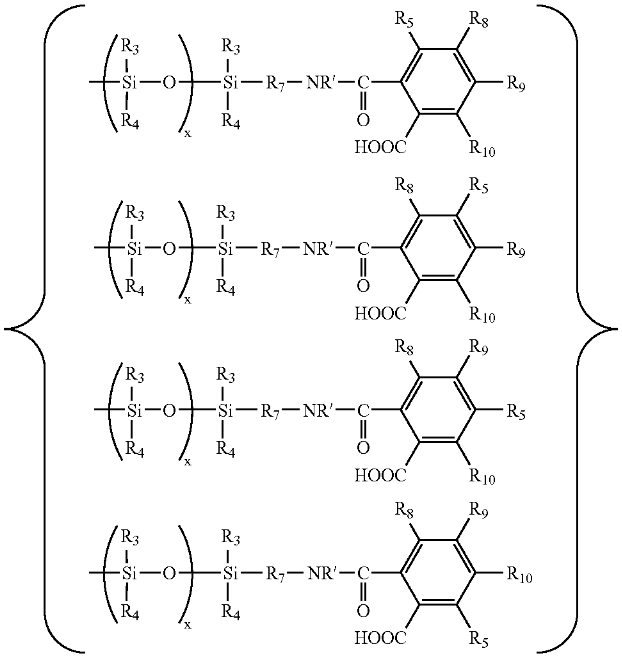

In addition, this reaction can be used to place $R_1$, $R_2$, $R_3$, and $R_4$ groups on a monomer or polymer by providing a siloxane monomer or polymer in which some of the repeat siloxane monomer units have —$R_7$—NHR' groups (wherein $R_7$ is defined as indicated hereinabove) in the locations where an $R_1$, $R_2$, $R_3$, and/or $R_4$ group is desired for example as follows:

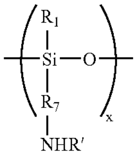

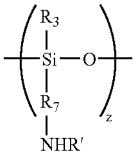

and reacting the monomer or polymer with a material of the formula

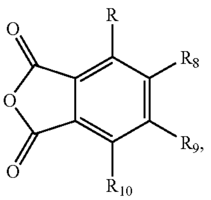

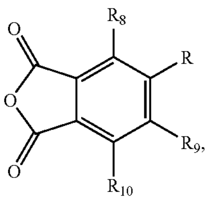

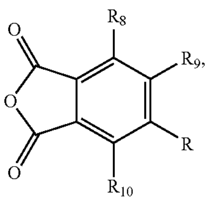

or

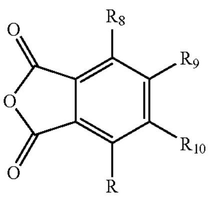

wherein R represents a portion of $R_1$, $R_2$, $R_3$, $R_4$, or a mixture thereof; by "portion" is meant that the final $R_1$, $R_2$, $R_3$, or $R_4$ group in this instance will, of course, have a

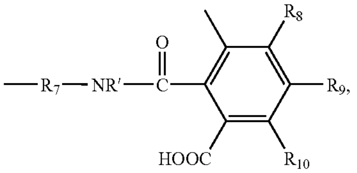

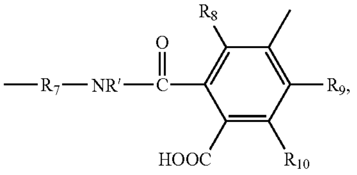

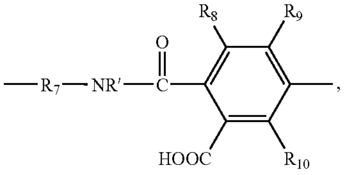

, or

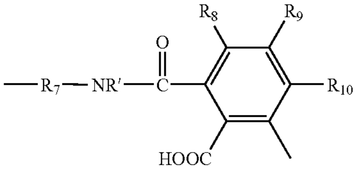

group attached to the original R group. The reaction can be carried out neat (i.e., no solvent is required, although solvents such as toluene, xylene, various ketones, other aprotic solvents, or the like can be employed if desired) in the presence of a metal organic catalyst, such as dibutyl tin dilaurate, in water-free conditions at a temperature of, for example, from about 60 to about 120° C.

Also suitable as spacer groups are those of the formula

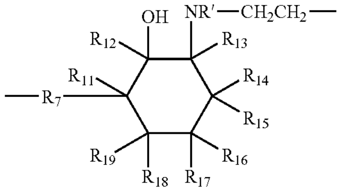

wherein $R_{11}$, $R_{12}$, $R_{13}$, $R_{14}$, $R_{15}$, $R_{16}$, $R_{17}$, $R_{18}$, and $R_{19}$ each, independently of the others, can be (but are not limited to) hydrogen atoms, hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, oxiran groups, alkyl groups (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 100 carbon atoms, and in another embodiment with no more than about 50 carbon atoms, although the number of carbon atoms can be outside of these ranges, aryl groups (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 100 carbon atoms, and in another embodiment with no more than about 50 carbon atoms, although the number of carbon atoms can be outside of these ranges, arylalkyl groups (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 100 carbon atoms, and in another embodiment with no more than about 50 carbon atoms, although the number of carbon atoms can be outside of these ranges, such as benzyl or the like, or alkylaryl groups (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 100 carbon atoms, and in another embodiment with no more than about 50 carbon atoms, although the number of carbon atoms can be outside of these ranges, such as tolyl or the like, wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, ethylene oxide groups, oxiran groups, vinyl groups, allyl groups, mixtures thereof, and the like, wherein two or more substituents can be joined together to form a ring. These spacer groups are formed when the siloxane monomer or polymer and the $R_5$ monomer or polymer are linked through a reaction for example as follows:

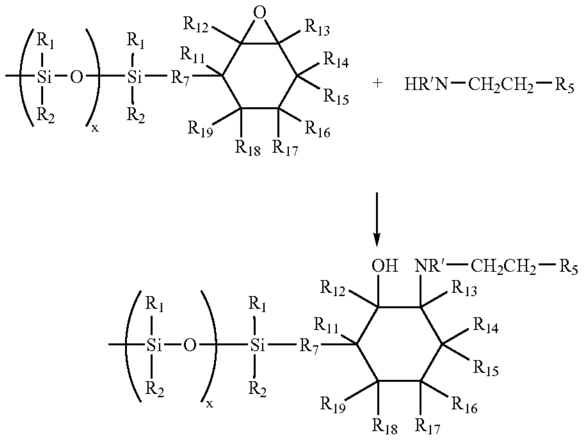

wherein $R_7$ and R' are as defined hereinabove. This reaction can also be used for linking siloxane monomers or polymers of the formula

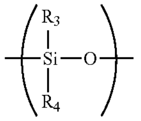

to $R_5$ monomers or polymers for example as follows:

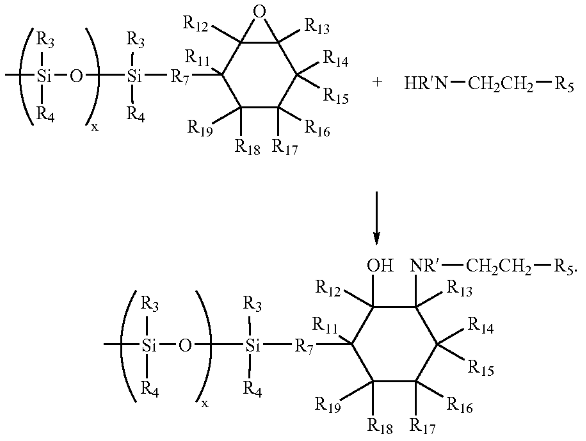

In addition, this reaction can be used to place $R_1$, $R_2$, $R_3$, and $R_4$ groups on a monomer or polymer by providing a siloxane monomer or polymer in which some of the repeat siloxane monomer units have

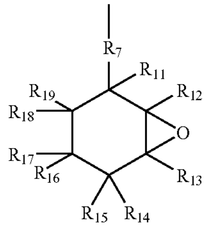

groups (wherein $R_7$ is defined as indicated hereinabove) in the locations where an $R_1$, $R_2$, $R_3$, and/or $R_4$ group is desired for example as follows:

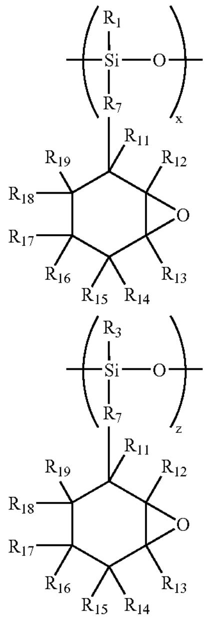

and reacting the monomer or polymer with a material of the formula $HR'N—CH_2CH_2—R$ wherein R represents a portion of $R_1$, $R_2$, $R_3$, $R_4$, or a mixture thereof; by "portion" is meant that the final $R_1$, $R_2$, $R_3$, or $R_4$ group in this instance will, of course, have a

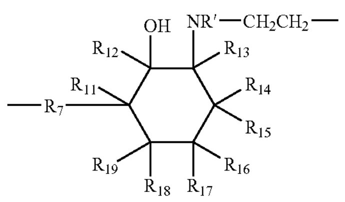

group attached to the original R group. The reaction can be carried out neat (i.e., no solvent is required, although solvents such as toluene, xylene, various ketones, other aprotic solvents, or the like can be employed if desired) in the presence of a metal organic catalyst, such as dibutyl tin dilaurate, in water-free conditions at a temperature of, for example, from about 60 to about 120° C.

Intermediate compounds suitable for the above reactions are commercially available. Examples of such materials include aminopropyl terminated polydimethylsiloxanes, such as those of the formula

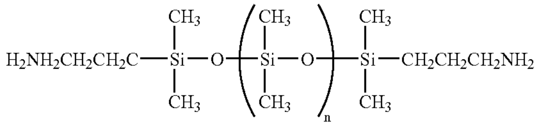

wherein n represents the number of repeat monomer units, including those with molecular weights of 850-900, 900-1,000, 3,000, 5,000, and 27,000, commercially available as DMS-A11, DMS-A12, DMS-A15, DMS-A21, and DMS-A32 from Gelest, Inc., Tullytown, Pa.; aminopropyl methylsiloxane-dimethylsiloxane copolymers, such as those of the formula

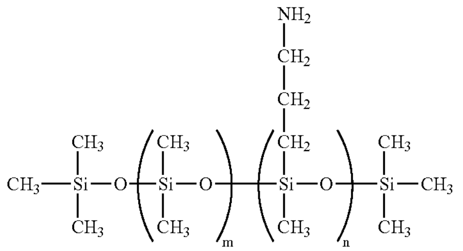

wherein m and n represent the number of repeat monomer units, including those with molecular weights of 4,500-5,500, 7,000-8,000, and 4,000-5,000, commercially available as AMS-132, AMS-152, and AMS-162 from Gelest, Inc., Tullytown, Pa.; aminoethylaminopropyl methyl siloxane-dimethylsiloxane copolymers, commercially available as AMS-233 from Gelest, Inc., Tullytown, Pa.; aminoethylaminoisobutyl methyl siloxane-dimethylsiloxane copolymers, commercially available as AMS-242 from Gelest, Inc., Tullytown, Pa.; aminoethylaminopropyl methoxy siloxane-dimethylsiloxane copolymers, commercially available as ATM-1112 and ATM-1322 from Gelest, Inc., Tullytown, Pa.; carbinol functional methylsiloxane-dimethylsiloxane copolymers, including those of the formula

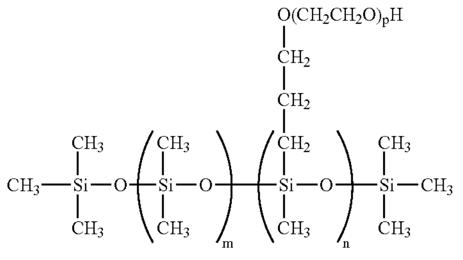

wherein m, n, and p represent the number of repeat monomer units, including those with molecular weights of 4,500-5,500 and 5,500-6,500, commercially available as CMS-626 and CMS-222 from Gelest, Inc., Tullytown, Pa.; carbinol (hydroxyl) terminated polydimethylsiloxanes, including those of the formula

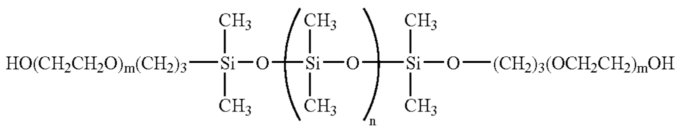

wherein m and n represent the number of repeat monomer units, including those with molecular weights of 1,000, 4,500-5,500, 3,600-4,400, 5,700-6,900, and 2,500-3,200, commercially available as DMS-C15, DMS-C21, DMS-C25, DMS-C31, and DMS-C22 from Gelest, Inc., Tullytown, Pa.; those of the formula

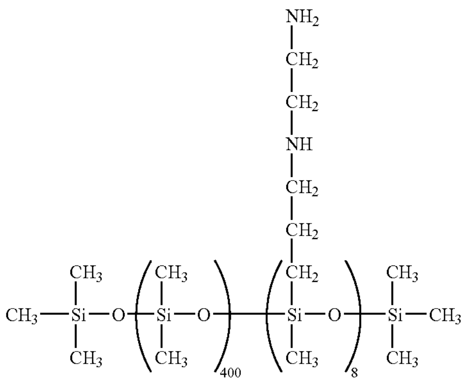

having a molecular weight of 31,042, commercially available as GP-316 from Genesee Polymers Corp. (Innovative Polymer Technology), Flint, Mich.; those of the formula

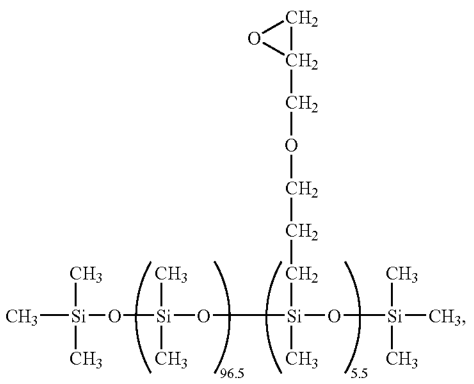

commercially available as EXP-32 from Genesee Polymers Corp. (Innovative Polymer Technology), Flint, Mich.; those of the formula

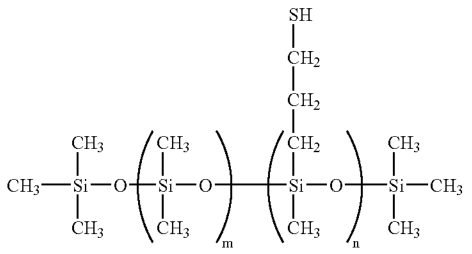

wherein m and n represent the number of repeat monomer units, commercially available from Genesee Polymers Corp. (Innovative Polymer Technology), Flint, Mich.; those of the formula

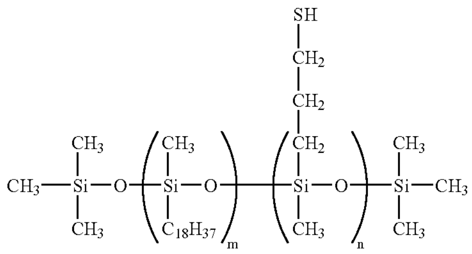

wherein m and n represent the number of repeat monomer units, commercially available from Genesee Polymers Corp. (Innovative Polymer Technology), Flint, Mich.; those of the formula

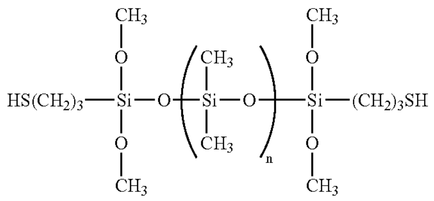

wherein n represents the number of repeat monomer units and is about 90, with a molecular weight of about 6,800, commercially available as GP-506 from Genesee Polymers Corp. (Innovative Polymer Technology), Flint, Mich.; those of the formula

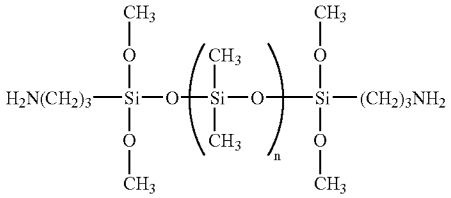

wherein n represents the number of repeat monomer units and is from about 400 to about 450, with a molecular weight of from about 36,000 to about 37,000, commercially available as EXP-34 from Genesee Polymers Corp. (Innovative Polymer Technology), Flint, Mich.; those of the formula

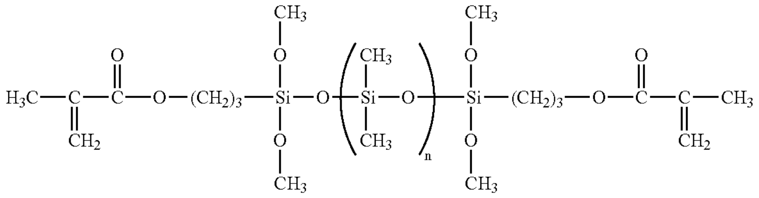

wherein n represents the number of repeat monomer units and is about 530, with a molecular weight of about 40,000, commercially available as GP-446 from Genesee Polymers Corp. (Innovative Polymer Technology), Flint, Mich.; those of the formula

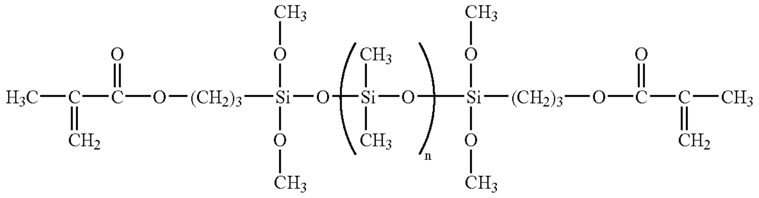

wherein n represents the number of repeat monomer units and is about 65, with a molecular weight of about 5,000, commercially available as GP-478 from Genesee Polymers Corp. (Innovative Polymer Technology), Flint, Mich.; those of the formula

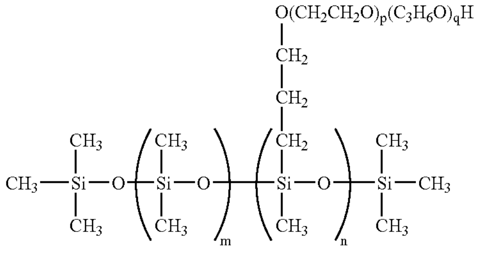

wherein m, n, p, and q represent the number of repeat monomer units, available as DOW CORNING®190, DOW CORNING® 193, and DOW CORNING® 2-5220 from Dow Corning Co., Midland, Mich.; those of the formula

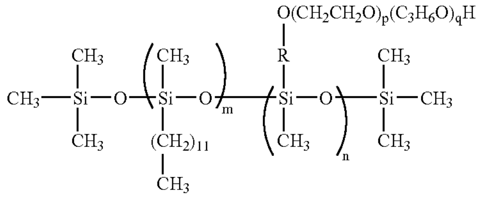

wherein m, n, p, and q represent the number of repeat monomer units, available as DOW CORNING® 5200 from Dow Corning Co., Midland, Mich.; and the like.

Silicone compositions suitable for the printing apparatus and process can be made by any desired or effective method. For example, suitable processes for preparing these polymers are disclosed in U.S. Pat. No. 6,007,800, U.S. Pat. No. 5,976,517, U.S. Pat. No. 6,132,707, U.S. Pat. No. 5,648,066, U.S. Pat. No. 5,670,686, U.S. Pat. No. 5,493,041, U.S. Pat. No. 5,744,529, U.S. Pat. No. 4,049,792, U.S. Pat. No. 4,083,956, U.S. Pat. No. 4,126,679, U.S. Pat. No. 5,102,656, U.S. Pat. No. 5,122,519, U.S. Pat. No. 6,090,376, U.S. Pat. No. 6,165,444, U.S. Pat. No. 6,086,862, U.S. Pat. No. 6,432,418, U.S. Pat. No. 5,362,485, U.S. Pat. No. 6,201,058, U.S. Pat. No. 5,620,942, U.S. Pat. No. 5,159,096, U.S. Pat. No. 5,070,171, U.S. Pat. No. 5,070,168, U.S. Pat. No. 5,136,063, U.S. Pat. No. 5,051,489, U.S. Pat. No. 5,164,471, U.S. Pat. No. 5,235,017, U.S. Pat. No. 5,260,401, U.S. Pat. No. 5,446,114, U.S. Pat. No. 5,473,038, U.S. Pat. No. 5,760,145, U.S. Pat. No. 6,218,445, U.S. Pat. No. 5,981,679, U.S. Pat. No. 5,939,491, U.S. Pat. No. 6,211,322, U.S. Pat. No. 6,271,309, U.S. Pat. No. 5,316,692, U.S. Pat. No. 5,300,299, U.S. Pat. No. 5,225,188, U.S. Pat. No. 4,311,695, U.S. Pat. No. 4,268,499, U.S. Pat. No. 4,265,878, U.S. Pat. No. 4,218,250, U.S. Pat. No. 5,136,068, U.S. Pat. No. 4,853,474, U.S. 2002/0028218 A1, WO 97/12592, WO 97/12593, WO 97/12585, WO 97/12596, WO 97/12587, WO 97/12586, WO 97/12588, WO 97/12584, WO 93/23009, WO 95/03776, WO 97/14400, WO 98/07798, WO 98/03574, WO 99/06487, WO 00/59992, WO 01/09250, EP 0 719 836, EP 0 769 290, EP 0 853 470, EP 0 582 152, EP 0 639 969, EP 0 714 275, EP 0 842 996, EP 0 916 702, EP 0 903 385, EP 0 940 422, EP 0 940 458, DE 19,749,380, DE 19,627,022, DE 19 746 909, DE 19 711 694, FR 2,756,176, FR 2 755 695, JP 11140090, and JP 11236532, the disclosures of each of which are totally incorporated herein by reference.

Suitable silicone compositions are also commercially available. For example, a material of the formula

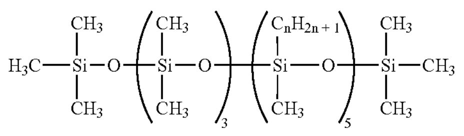

wherein n is from about 20 to about 24 is commercially available from PCR Inc., Gainesville, Fla. (now part of Clariant Corp.) as 41M70, a material of the formula

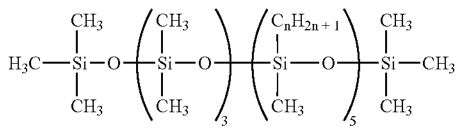

wherein n is from about 24 to about 28 is commercially available from PCR Inc., Gainesville, Fla. (now part of Clariant Corp.) as 41M80, and a material of the formula

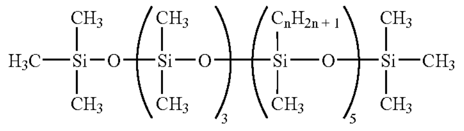

wherein n is 18 is commercially available from PCR Inc., Gainesville, Fla. (now part of Clariant Corp.) as 41M65. Also suitable are materials of the formula

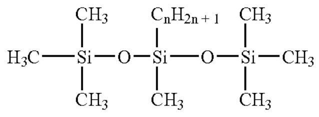

wherein n is from about 20 to about 24, commercially available from PCR Inc., Gainesville, Fla. (now part of Clariant Corp.) as 41M40, and materials of the formula

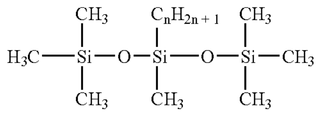

wherein n is from about 24 to about 28, commercially available from PCR Inc., Gainesville, Fla. (now part of Clariant Corp.) as 41M50. Also suitable is DOW CORNING® 2503 wax, commercially available from Dow Corning, Midland, Mich., of the formula

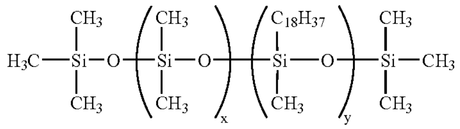

wherein x represents the number of polydimethylsiloxane repeat units and y represents the number of poly(methyl stearyl)siloxane repeat units. Also suitable are materials of the formula

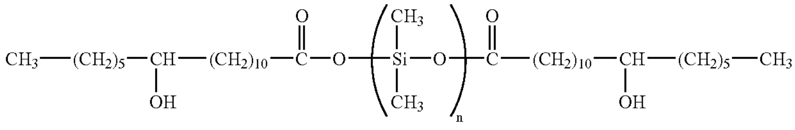

wherein n is an integer of from 1 to about 50, commercially available as SILWAX C from Siltech, Inc., Norcross, Ga., aka Lambent Technologies, materials of the formula

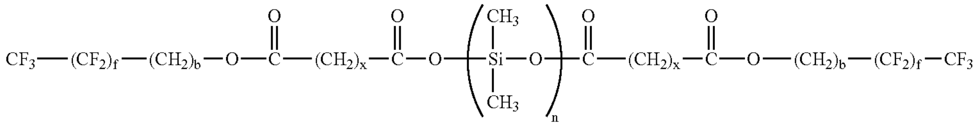

wherein n is an integer of from 1 to about 50, b is an integer representing the number of repeat —$CH_2$— units, and f is an integer representing the number of repeat —$CF_2$— units, commercially available as SILWAX F from Siltech, Inc., Norcross, Ga., aka Lambent Technologies, and materials of the formula

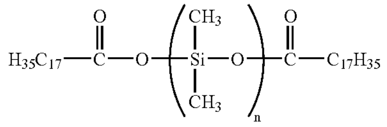

wherein n is an integer of from 1 to about 50, commercially available as SILWAX S from Siltech, Inc., Norcross, Ga., aka Lambent Technologies.

Suitable silicone materials are also available from, for example, Gelest, Inc., Tullytown, Pa., (http://www.gelest-.com/index.asp); Siltech, Inc., Norcross, Ga., aka Lambent Technologies (a Petroferm Company, http://www.petrofer-m.com); Genesee Polymers Corporation (Innovative Polymer Technology), Flint, Mich. (http://www.gpcsilico-nes.com); PCR Incorporated, Gainesville, Fla. (now part of Clariant Corp.) as the SilCare products; Air Products (Allentown, Pa.); BASF (Gurnee, Ill.); Crompton (OSi Specialties; Greenwich, Conn.); Dow Corning Corp. (Midland, Mich.); GE Silicones (Waterford, N.Y.); Kaneka America Corp. (New York, N.Y.); PPG Industries, Inc. (Gurnee, Ill.); Rhone-Poulenc Silicones (Lyon, France); Silar Laboratories (Wilmington, N.C.); TEGO Chemie Service USA (Hopewell, Va.); Wacker Silicones Corp. (Adrian, Mich.); Witco Corp. (Greenwich, Conn.); and the like.

While the apparatus and process have been described as suitable for use in hot melt or phase change ink jet printing processes, the invention is not limited to these printing processes, and can also be employed with other printing processes, including those employing nonaqueous liquid inks and those employing aqueous liquid inks, such as thermal, piezoelectric, acoustic, and continuous stream ink jet printing, offset printing, flexographic printing, and the like. For example, when aqueous inks are employed, an intermediate transfer material is selected with a hydrophobic/lipophobic balance appropriate to enable production of sharp images of the aqueous ink on the intermediate transfer member. The intermediate transfer material is selected so that in the molten form its surface tension is suitable for wetting the intermediate transfer member and allowing for film splitting. Substituents, comonomers, or side chains on silicone polymers, such as polyalkyleneoxy chains, can enable solubility in aqueous inks. For example, the presence of polyethylene oxide chains can enhance aqueous ink solubility and enable surface tension modification, and the presence of polypropylene oxide chains can enable surface tension modification and raise melting temperatures, as well as enabling wetting of the intermediate transfer member. The presence of substituents such as carboxylic acid groups, carboxylate anions (particularly when accompanied by quaternary ammonium cations), amides, and the like, as well as mixtures thereof, can also be helpful in tailoring a particular intermediate transfer material for a specific ink composition.

While not being limited to any particular theory, it is believed that when a phase change ink jet printing process is used with an ink containing a vehicle which includes compounds with long hydrocarbon chains, and when the silicone intermediate transfer material contains hydrocarbon side chains, these side chains can embed themselves within a semisolid ink image on the intermediate transfer member when both the ink and the intermediate transfer material are in the liquid phase, thereby resulting in the silicone intermediate transfer material becoming independently embedded in the surface of the drop or ink pixel. In the solid phase of the intermediate transfer material, however, the silicone portion of the intermediate transfer material tends to become "pushed out" of the liquid ink drop and to accumulate on the surface of the liquid ink drop, thereby enabling their release properties and making them available for optional post-printing curing processes.

Silicone compositions can be of any desired or effective number average molecular weight, in one embodiment at least about 400, in another embodiment at least about 800, and in another embodiment at least about 1,000, and in one embodiment no more than about 40,000, in another embodiment no more than about 25,000, and in yet another embodiment no more than about 8,000, although the molecular weight can be outside of these ranges.

The intermediate transfer material is a solid at room temperature. The intermediate transfer material has any desired or effective melting point, in one embodiment at least about 30° C., in another embodiment at least about 35° C., and in yet another embodiment at least about 40° C., and in one embodiment no more than about 90° C., in another embodiment no more than about 55° C., in yet another embodiment no more than about 50° C., and in still another embodiment no more than about 45° C., although the melting point can be outside of these ranges.

The intermediate transfer member is heated to any desired or effective temperature to cause the intermediate transfer material to melt upon contacting the intermediate transfer member, in one embodiment at least about 40° C., in another embodiment at least about 50° C., and in yet another embodiment at least about 60° C., and in one embodiment no more than about 120° C., in another embodiment no more than about 100° C., in-yet-another embodiment no more than about 80° C., and in still another embodiment no more than about 70° C., although the operating temperature of the intermediate transfer member can be outside of these ranges.

In one specific embodiment, the printing process is a phase change ink jet printing process and the intermediate transfer member is heated to and maintained at a temperature range selected by the dynamic mechanical analysis (DMA) profile of the ink so that the intermediate transfer member temperature range corresponds to the rubbery plateau of the ink. The intermediate transfer material is then selected so that it has a melting point within this range, and a molten layer of the intermediate transfer material is delivered to the intermediate transfer member by bringing the solid, unmelted intermediate transfer material into contact with the heated intermediate transfer member. When the intermediate transfer member is in the form of a drum, melting of the intermediate transfer material to a liquid while the drum is rotating delivers a well-metered thin layer of molten intermediate transfer material to the drum.

When melted and heated to the operating temperature of the intermediate transfer member, the molten intermediate transfer material has a viscosity in one embodiment of at least about 1 centistoke, in another embodiment of at least about 20 centistokes, and in yet another embodiment of at least about 80 centistokes, and in one embodiment of no more than about 1,000 centistokes, in another embodiment of no more than about 500 centistokes, and in yet another embodiment of no more than about 200 centistokes, although the viscosity at the temperature of the intermediate transfer member can be outside of these ranges.

The intermediate transfer material in a specific embodiment is selected so that it is substantially transparent when formed into a thin film on the final recording substrate. By "thin film" is meant a thickness of in one embodiment at least about 0.1 nanometer, and in another embodiment at least about 1 nanometer, and in one embodiment no more than about 100 nanometers, and in another embodiment no more than about 10 nanometers, although the thickness can be outside of these ranges.

Optionally, the intermediate transfer material can contain additional materials which can be formulated into the molten intermediate transfer material prior to casting the intermediate transfer material into the desired shape for use in the printer. Examples of additional materials include UV absorbers, UV protectors, overcoat varnishes, small particles, viscosity modifiers, other intermediate transfer oils, waxes, or derivatives, antioxidants, plasticizers, tougheners, crosslinking reactive monomers, oligomers, or polymers, colorants, and the like, as well as mixtures thereof.

In the instance of reactive materials such as crosslinking materials, one advantage of incorporating these materials into a solid intermediate transfer material is that the reactivity of the reactive materials is greatly reduced while in the solid matrix of the intermediate transfer material, and these materials accordingly are relatively stable for extended periods of time; when melted onto the intermediate transfer member, they are then available for reaction, being no longer locked within the solid matrix. Any toxicity of a reactive material can also be alleviated by incorporating it into a solid intermediate transfer material, since the possibilities for human exposure are minimized when the reactive material is in the solid matrix of the intermediate transfer material. One example of a suitable crosslinking material is DOW CORNING® 31 additive, a mixture of compounds containing, among others, 40 to 70 weight percent of a dimethyl siloxane polyglycol acrylate-terminated, 5 to 10 weight percent of a polyoxyethylene oxide ester, and 3 to 7 weight percent methacrylic acid. Other examples of suitable crosslinking materials include various materials available from Gelest, Inc., Tullytown, Pa., such as methacryloxypropyl-terminated polydimethylsiloxanes, including DMS-R18 (molecular weight 4,500-5,500), acryloxy-terminated polydimethylsiloxanes, including DMS-U22 (molecular weight 1,000-1,200), (methacryloxypropyl)methylsiloxane-dimethylsiloxane copolymers, including RMS-033, (acryloxypropyl)methylsiloxane-dimethylsiloxane copolymers, including UMS-182, methacryloxypropyl T-structure siloxanes, including RTT-1011 (molecular weight 570-620), vinyl silicone, and the like, as well as mixtures thereof. Reactive materials and crosslinking materials also include those having a Si—O—$CH_3$ group therein, which is reactive to moisture. Reactive materials and crosslinking materials also include those having functional groups such as —$NH_2$, —OH, —SH, epoxy, or the like thereon, such as DMS-A11, DMS-A12, DMS-A15, DMS-A21, and DMS-A32 from Gelest, Inc., Tullytown, Pa.; AMS-132, AMS-152, and AMS-162 from Gelest, Inc., Tullytown, Pa.; AMS-233 from Gelest, Inc., Tullytown, Pa.; AMS-242 from Gelest, Inc., Tullytown, Pa.; ATM-1112 and ATM-1322 from Gelest, Inc., Tullytown, Pa.; CMS-626 and CMS-222 from Gelest, Inc., Tullytown, Pa.; DMS-C15, DMS-C21, DMS-C25, DMS-C31, and DMS-C22 from Gelest, Inc., Tullytown, Pa.; GP-316 from Genesee Polymers Corp. (Innovative Polymer Technology), Flint, Mich.; EXP-32 from Genesee Polymers Corp. (Innovative Polymer Technology), Flint, Mich.; GP-506 from Genesee Polymers Corp. (Innovative Polymer Technology), Flint, Mich.; EXP-34 from Genesee Polymers Corp. (Innovative Polymer Technology), Flint, Mich.; GP-446 from Genesee Polymers Corp. (Innovative Polymer Technology), Flint, Mich.; GP-478 from Genesee Polymers Corp. (Innovative Polymer Technology), Flint, Mich.; DOW CORNING®190, DOW CORNING® 193, and DOW CORNING® 2-5220 from Dow Corning Co., Midland, Mich.; DOW CORNING® 5200 from Dow Corning Co., Midland, Mich.; and the like, as well as mixtures thereof. When present, the optional reactive material is present in the intermediate transfer material in any desired or effective amount, in one embodiment at least about 0.01 percent by weight of the intermediate transfer material, in another embodiment at least about 0.1 percent by weight of the intermediate transfer material, and in yet another embodiment at least about 1 percent by weight of the intermediate transfer material, and in one embodiment no more than about 10 percent by weight of the intermediate transfer material, in another embodiment no more than about 5 percent by weight of the intermediate transfer material, and in yet another embodiment no more than about 2 percent by weight of the intermediate transfer material, although the amount can be outside of these ranges.

If desired, the reactive material in the intermediate transfer material can be one that reacts upon contact with another material contained in the marking material, such as a catalyst, initiator, promoter, or the like. Examples of such materials that can be contained within the marking material include (but are not limited to) tin-containing catalysts, such as dibutyltin oxide, dibutyltin dilaurate, dibutyltin diacetate, dibutyltin carboxylate, other organotin carboxylates, and the like, such as the COTIN® series of catalysts available from CasChem, Inc., Bayonne, N.J. and the FASCAT® 4201 and 4202 catalysts available from Atofina-Chemicals, Inc., Philadelphia, Pa., bismuth-containing catalysts, such as organobismuth carboxylates, such as the COSCAT® series of catalysts available from CasChem, Inc., Bayonne, N.J. and the BICAT® V catalysts available from Shepherd Chemical Co., Cincinnati, Ohio, mercury-containing catalysts, such as organomercury carboxylates, such as the COCURE® series of catalysts available from CasChem, Inc., Bayonne, N.J., various metal carboxylates, such as bismuth, aluminum, calcium, lithium, magnesium, copper, chromium, iron, lead, and cerium, available from Mooney Chemicals, Inc., Cleveland, Ohio, zirconium octoates, manganese octoates, aluminum octoates, peroxides, such as benzoyl peroxide (available as LUPROX® from Atofina Chemicals, Inc., Philadelphia, Pa.), 2,2'-azobisisobutyronitrile (AIBN), benzoin, of the formula

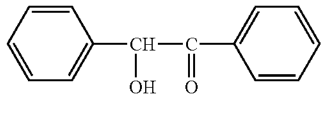

, ethylbenzoin (2-ethoxy-2-phenylacetophenone, of the formula

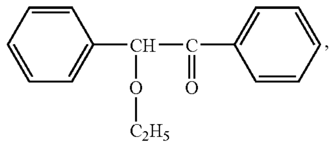

, available from Aldrich Chemicals, Milwaukee, Wis.), bifunctional reactants such as dicarboxylic acids and anhydrides of the formula HOOC—$(CH_2)_n$—COOH or its anhydride wherein n is an integer of from 0 to about 30, diisocyanates and polyisocyanates, such as isophorone diisocyanate (VESTANAT® IPDI, available from Creanova, Inc., Piscataway, N.J.), hexamethylene diisocyanate, and 4,4'-dicyclohexylmethane diisocyanate (DESMODUR W, available from Bayer AG, Ludwigshafen, Germany), trimethylhexamethylene diisocyanate (VESTANAT® TMDI, available from Creanova, Inc., Piscataway, N.J.), prepolymers (VESTANAT® T-series), blocked adducts (VESTANAT® B-series), moisture activated chain extenders and hardeners (VESTAMIN® A 139 and VESTAMIN®) V 214), DESMODUR N3300 from HDI, available from Bayer AG, isocyanates available from Cytec Industries, Inc. (West Paterson, N.J.), BASF (Geismar, La.), Dow (Freeport, Tex.), ICI (Geismar, La.), Lyondell (Lake Charles, La.; LUXATE®), other isocyanates disclosed in the Kirk-Othmer *Encyclopedia of Chemical Technology* ($4^{th}$ Edition, pp. 789-818), and the like, as well as mixtures thereof. When present, the optional catalyst, initiator, promoter, or the like is present in the marking material in any desired or effective amount, in one embodiment at least about 0.001 percent by weight of the marking material, in another embodiment at least about 0.01 percent by weight of the marking material, and in yet another embodiment at least about 0.1 percent by weight of the marking material, and in one embodiment no more than about 5 percent by weight of the marking material, in another embodiment no more than about 1 percent by weight of the marking material, and in yet another embodiment no more than about 0.5 percent by weight of the marking material, although the amount can be outside of these ranges. Curing can also take place by other mechanisms, such as exposure to heat, exposure to radiation such as UV or IR radiation, exposure to moisture or the like as well as combinations thereof.

Small particles can also be formulated into the molten intermediate transfer material prior to casting the intermediate transfer material into the desired shape for use in the printer. Such particles can be used for purposes such as reducing the coefficient of friction of the print on the final substrate, thereby improving feeding of the final substrate through automatic document handlers in apparatus such as copiers, collators, paper folders, or the like, improving the ability to write on the prints on the final substrate with pens, or the like. Examples of suitable small particles include polymethyl methacrylate beads (PMMA), such as those available as MP-1000 (0.5 micron size), MP-2701 (0.4 micron size), MX-150 (1.5 micron size), MX-500 (5 micron size), and MR-20G (20 micron size), polystyrene beads (PS) SGP-70C (20 micron size), Melamine-Formaldehyde Resin beads Epostar S6 (0.6 micron size) and S12 (1.2 micron size), all available from Esprit Chemical Co., Sarasota, Fla., a representative of Soken Chemical and Engineering Co., Ltd. of Tokyo, Japan, coated and uncoated fine glass beads, such as Grade 4000 Spheriglass® (20 micron size), Grade 6000 Spheriglass® (7 micron size), Grad 4000 CP01 Spheriglass® methoxysilane-coated (20 micron size), Grade 6000 CPO3 SPHERIGLASS® aminosilane-coated (7 micron size), and Grade 400 Crystafill (25 micron size), all available from Potters Industries, Inc., Valley Forge, Pa., 3M S22 “Hollow Spheres” (35 micron size), S60/10000 (30 micron size), H50/10000 epoxysilane-coated (40 micron size), all available from Minnesota Mining and Manufacturing Co., St. Paul, Minn., XLX73010 glass spheres (43 micron size) available from Cataphote, Inc., Jackson, Miss., and Grade 6920L (55 micron size, available from PQ Corp., silica particles, ceramic particles, such as W-610 Zeeospheres (10 micron size), available from Minnesota Mining and Manufacturing Co., St. Paul, Minn., crushed glass particles, kaolin clay, such as Polygloss 90 (0.2 micron size) and Lithosperse 7015H, available from J. M. Huber Corp., Macon, Ga., micronized polyethylene, such as Polysilk 750 (5 to 7 micron size), available from Micro Powders, Inc., Tarrytown, N.Y., and Taber Tiger 5512 (18 micron size), available from Shamrock, Newark, N.J., micronized polytetrafluoroethylene, such as Grade XC-149B (8 to 9 micron size), available from Lawter International, Inc., Northbrook, Ill., micronized polyethylene and polytetrafluoroethylene, such as Polysilk 14 (9 to 11 micron size), available from Micro Powders, Inc., Tarrytown, N.Y., calcium carbonate powder, such as HUBERCARB™ Q6 (6 micron size), HUBERCARB™ Q3 (3 micron size), and HUBERCARB™ Q3T (3 micron size), all available from J. M. Huber Corp., Macon, Ga., talc, such as MICROTALC® MP15-38 (2 micron size and TALCRON® MP44-26 (5 micron size), both available from Barretts Minerals, Inc., Dillon, Mont., zinc oxide, such as Grade 318 (0.38 micron size), Grade 318T (0.38 micron size), and Grade M14 Meadowbrook Zinc Dust (5 micron size), all available from Eagle Zinc Co., Hillsboro, Ill., hard waxes, toner powders, Reichhold Chemicals, Inc. (Research Triangle Park, N.C.): SOFT-CLAD® CFB-101-40 Urethane Color Beads (5 to 10 micron size); Jaygo, Inc. (Union, N.J.): DRAGONITE®) Solid Glass Beads, Art. # 5210 (50 micron size); GREFCO, Inc. (Torrance, Calif.): DICAPERL® Hollow Glass microspheres, HP-710 (65 micron size); Celite Corp. (Lompoc, Calif.): SUPER FLOSS® Diatomite (9 micron size); Engelhard Corp. (Iselin, N.J.): ASP® 400 Aluminum Silicates (5 micron size); and the like, as well as mixtures thereof. The average particle diameter of the small particles is in one embodiment at least about 0.1 micron, in another embodiment at least about 5 microns, and in yet another embodiment at least about 7 microns, and in one embodiment no more than about 80 microns, in another embodiment no more than about 35 microns, in yet another embodiment no more than about 30 microns, and in still another embodiment no more than about 25 microns, although the average particle diameter can be outside of these ranges. The small particles are present in the intermediate transfer material in any desired or effective amount, in one embodiment at least about 0.1 percent by weight, in another embodiment at least about 1 percent by weight, and in yet another embodiment at least about 5 percent by weight, and in one embodiment no more than about 50 percent by weight, in another embodiment no more than about 20 percent by weight, and in yet another embodiment no more than about 10 percent by weight, although the amount can be outside of these ranges. The application of small particles to the surface of phase change ink prints is also disclosed in U.S. Pat. No. 6,481,840, the disclosure of which is totally incorporated herein by reference.

Other suitable additives include (but are not limited to) liquid silicone-based materials, such as DOW CORNING® 3225C formulation aid, DOW CORNING® 5200 formulation aid, DOW CORNING® 2-5220 resin modifier, DOW CORNING® 190 surfactant, DOW CORNING® 193 surfactant, and the like.

If desired, the intermediate transfer material can also be tinted for special effects printing with any desired or effective colorant, such as dyes, pigments, polymeric colorants, UV markers, infrared absorbers, light scattering substances such as titanium dioxide and the like, or the like, as well as mixtures thereof.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

To a 4-neck, round bottom flask equipped with a stirrer, condenser, temperature controller, and sparge tube are charged 200 grams of 1-octadecene (available from CPChem Company, The Woodlands, Tex.), 100 grams of toluene, and 52.8 grams of polymethylhydrosilane HMS-991 (available from Gelest, Inc., Tullytown, Pa.) of the following formula:

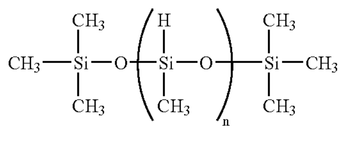

(n=22-30, MW=1,500-1,900 g/mol). The flask contents are agitated and heated to 100° C. The reaction mixture is sparged with a light stream of nitrogen gas. After equilibrating at the mentioned temperature, heating and sparging are discontinued, and the reaction is catalyzed with 0.3 cc of 3.3% chloroplatinic acid solution in ethanol. Subsequently, the temperature of the reaction mixture goes to a maximum of 110° C. within 10 minutes. After the reaction goes to completion, the mixture is treated with 2% water and 0.2% concentrated HCI at a temperature of approximately 60° C. for one hour. Afterwards, the reaction mixture is neutralized with dry $NaHCO_3$, and toluene and water are stripped from the product. Finally, the product is filtered. It is believed that the product obtained will have the formula

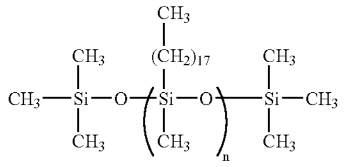

wherein n=22-30.

EXAMPLE II

To a 4-neck, round bottom flask equipped with a stirrer, condenser, temperature controller, and sparge tube are charged 200 grams of allyl alcohol propoxylate (available from Aldrich Chemical Co., Milwaukee, Wis., Cat. Number 43,037-4), of the formula

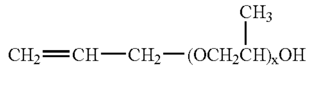

wherein x represents the number of repeat propoxylate groups (average value of from about 1.4 to about 1.8; average number average molecular weight 140-160), 90 grams of toluene, and 283.8 grams of methylhydrosiloxane dimethylsiloxane Copolymer HMS-301 (available from Gelest, Inc., Tullytown, Pa.) of the following formula:

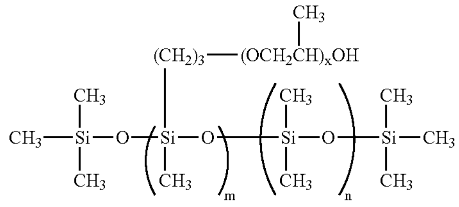

(m=7-9, n=17-19, MW=1,900-2,000 g/mol). The flask contents are agitated and heated to 95° C. with a light nitrogen sparge. After equilibrating at this temperature, heating and sparging are discontinued, and the reaction is catalyzed with 0.3 cc of 3.3% chloroplatinic acid solution in ethanol. Subsequently, the temperature of the reaction mixture goes to a maximum of 110° C. within 10 minutes. After the reaction goes to completion, the mixture is treated with 2% water and 0.2% concentrated HCl at a temperature of approximately 60° C. for one hour. Afterwards, the reaction mixture is neutralized with dry $NaHCO_3$, and toluene and water are stripped from the product. Finally, the product is filtered. It is believed that the product obtained will have the formula

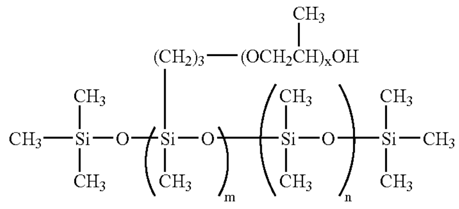

wherein m=7-9, n=17-19, and x has an average value of from about 1.4 to about 1.8.

EXAMPLE III

To a 4-neck, round bottom flask equipped with a stirrer, condenser, temperature controller, and sparge tube are charged 300 grams of the product prepared in Example II and 310 grams of stearyl isocyanate (available as Mondur O from Bayer Corp., Pittsburgh, Pa.). The mixture is melted in the flask, brought to a temperature of 120° C., and stirred. After thermal equilibrium has been reached, 2 drops of a catalyst solution (dibutyltin oxide, FASCAT® 4202, available from Atofina Chemicals, Philadelphia, Pa.) are added. The reaction becomes exothermic, and the temperature peaks at 150° C. Subsequently, the reaction mixture is stirred for another 1.5 hours. FTIR analysis can be used to determine that all of the isocyanate has reacted with the alcohol groups of the dimethicone copolyol from Example II. It is believed that the product obtained will have the formula

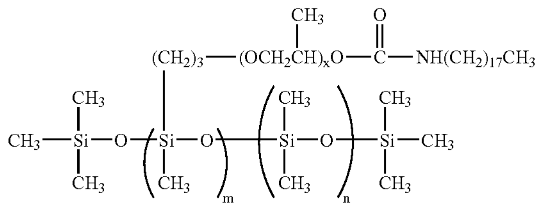

wherein m=7-9, n=17-19, and x has an average value of from about 1.4 to about 1.8.

EXAMPLE IV

To a 4-neck, round bottom flask equipped with a stirrer, condenser, temperature controller, and sparge tube are charged 200 grams of alpha olefin 20-24 (available from CPChem Company, The Woodlands, Tex., of the formula $CH_2{=}CH—(CH_2)_m—CH_3$ wherein m is from about 17 to about 21), 90 grams of toluene, and 139.7 grams of hydride terminated polydimethylsiloxane DMS-H03 (available from Gelest, Inc., Tullytown, Pa.) of the following formula:

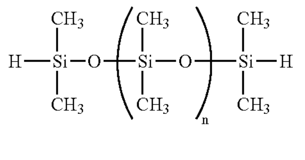

(n=3-5, MW=400-500 g/mol). The flask contents are agitated and heated to 90° C. with a light nitrogren sparge. After equilibrating at this temperature, heating and sparging are discontinued, and the reaction is catalyzed with 0.3 cc of 3.3% chloroplatinic acid solution in ethanol. Subsequently, the temperature of the reaction mixture goes to a maximum of 110° C. within 10 minutes. After the reaction goes to completion, the mixture is treated with 2% water and 0.2% concentrated HCl at a temperature of approximately 60° C. for one hour. Afterwards, the reaction mixture is neutralized with dry $NaHCO_3$, and toluene and water are stripped from the product. Finally, the product is filtered. It is believed that the product obtained will have the formula

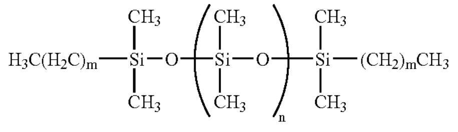

wherein m is from about 17 to about 21 and n=3-5.

EXAMPLE V

Into a 2 ounce jar equipped with a magnetic stirrer were charged 10 grams of a pentakis (3-aminopropyl) polydimethyl siloxane (89M10, obtained from PCR, Gainesville, Fla., now Clariant Corp.) with the following formula:

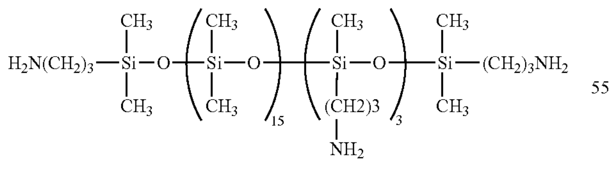

and 3.5 grams of octadecyl isocyanate (MONDUR O®, obtained from Bayer Corp., Pittsburgh, Pa.). The mixture was heated in an oil bath to 120° C. and stirred. Subsequent to thermal equilibration, 1 drop of catalyst (dibutyltin dilaurate, FASCAT® 4202, obtained from Atofina Chemicals, Philadelphia, Pa.) was added, and the mixture continued to stir for approximately one hour. After this time, no remnant isocyanate could be observed by FTIR. The product was a soft wax with a melting point at 60° C. It is believed that the product obtained had the formula

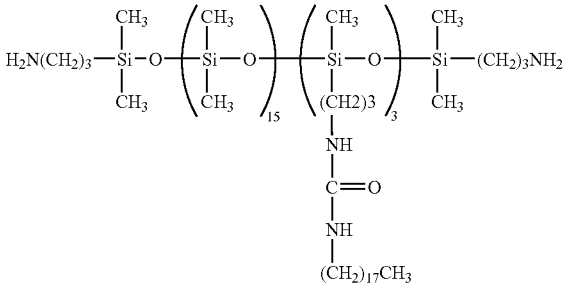

EXAMPLE VI

Into a 4 ounce jar equipped with a magnetic stirrer were charged 25 grams of a bis(3-hydroxpropyl) polydimethyl siloxane (8LPP-09, obtained from PCR, Gainesville, Fla., now Clariant Corp.) with the following formula:

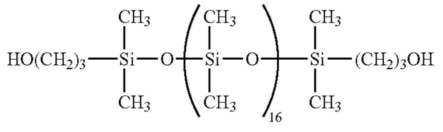

and 8.8 grams of a polyoxyethylene(2) stearyl ether (BRIJ 72®, obtained from ICI Americas, Inc., Wilmington, Del., of the formula $CH_3(CH_2)_{17}—OCH_2CH_2—OCH_2CH_2—OH$). The mixture was heated in an oil bath to 120° C. and stirred. After thermally equilibrating the mixture for 20 minutes, 1 drop of catalyst (dibutyltin dilaurate, FASCAT® 4202, obtained from Atofina Chemicals, Philadelphia, Pa.) was added. Then, 5 grams of hexamethylene diisocyanate (DESMODUR H®, obtained from Bayer, Pittsburgh, Pa.) were added, and the mixture continued to stir for approximately one hour. After this time, no remnant isocyanate could be observed by FTIR. The product was a soft wax with a melting point at 31° C. It is believed that the product obtained had the formula

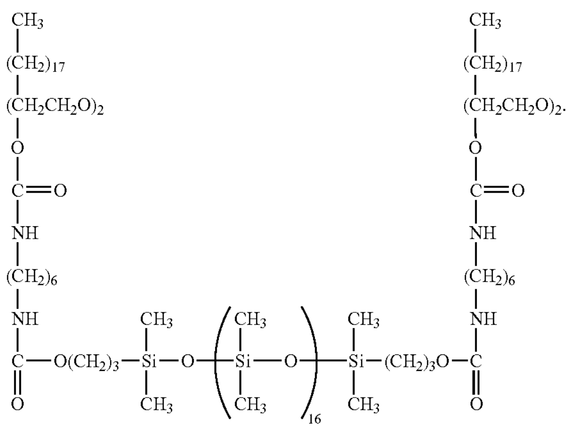

Oligomeric forms of this molecule with correspondingly higher molecular weight may also have been part of the product mixture; to reduce the production of higher viscosity and higher melting oligomers, the reaction temperature was relatively low to slow down the reaction and enable formation of lower molecular weight products, and the stoichiometric ratio of starting materials was also selected to reduce production of higher molecular weight products.

EXAMPLE VII

50 Grams of the intermediate transfer wax 41M70, of the formula

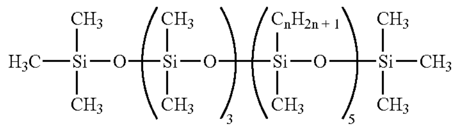

wherein n is from about 24 to about 28 (obtained from PCR Inc., Gainesville, Fla., now Clariant Corp.; melting point 41° C.; viscosity 30 centipoise at 70° C.) was cast into an elongated rectangular block by heating the wax to 60° C. and pouring it into a metal mold of length 8.500 inches, width 1.375 inch, and depth 0.4375 inch, wherein the resulting item cast from the mold had a top surface (two smallest dimensions forming the plane of this surface) of 16 degrees from horizontal. After cooling to room temperature, solidification, and release of the cast from the mold, the resulting stick was inserted into a device which originally housed the oil reservoir and oil felt for drum maintenance of a phase change ink printer as disclosed in U.S. Pat. No. 5,389,958, the disclosure of which is totally incorporated herein by reference. The maintenance unit so prepared was then inserted into the printer and the drum temperature was set to about 62° C. Solid fill prints of primary and secondary colors as well as other types of prints were prepared without any cohesive failure during the printing process.

EXAMPLE VIII

50 Grams of the intermediate transfer wax 41M70 (obtained from PCR Inc., Gainesville, Fla., now Clariant Corp.) was heated to 60° C. and stirred in a vessel equipped with a heating mantle. Keeping the temperature constant, 15 grams of a powder of polymethyl methacrylate (PMMA) beads with an average particle diameter of 0.5 microns (MP-1000, obtained from Esprit Chemical Corp., Sarasota, Fla.) were added. The mixture was then stirred for another 5 to 10 minutes followed by pouring the mixture into the mold described in Example VII. The stick thus produced was modified in shape, placed in a printer, and used in the drum maintenance process as described in Example VII. In addition to the advantages described in Example VII, the prints generated with this printer exhibited excellent results when fed through the automatic document feeder of a copier, with no prints being misfed or jammed in the feeding mechanism. It is believed that coefficients of friction tested versus a glass surface will assume stable low values for the static coefficient and the kinetic coefficient of no higher than 0.6, preferably no higher than 0.45, and more preferably no more than 0.35 for a solid fill print during repeated testing at a sliding velocity of 2 inches per minute. The friction coefficient is measured with a horizontal arrangement in a Friction/Peel Tester #225/1 from Thwing-Albert Instrument Company (Pittsburgh, Pa.). It drags a sled with a weight of 200 grams, onto which lower surface is mounted the print sample, over a stationary surface (a tempered glass). The sled is connected to a load cell, which measures the tangential force. Further details about this measurement method are disclosed in, for example, W. Wedler, "Measurement and Improvement of Automatic Document Feed Performance of Solid Ink Prints," IS&T Conference NIP17, Autumn 2001, the disclosure of which is totally incorporated herein by reference.

EXAMPLE IX

15 Grams of DOW CORNING® 31 additive, which is a clear liquid oil at room temperature with a viscosity at room temperature of 300 centipoise, obtained from Dow Corning Co., Midland, Mich., was blended with 45 grams of heated (60° C.) intermediate transfer wax 41M70 (obtained from PCR Inc., Gainesville, Fla., now Clariant Corp.) and stirred at 60° C. for 5 minutes. The mixture was then poured into the mold described in Example VII. The stick thus produced was modified in shape, placed in a printer, and used in the drum maintenance process as described in Example VII. Subsequent to print generation, the prints were exposed to ultraviolet radiation from a mercury lamp for 0.5, 2, and 5 minutes. It is believed that, in addition to the advantages described in Example VII, the prints generated with this printer will exhibit coefficients of friction tested versus a glass surface of about 0.4 for both the static coefficient and the kinetic coefficient for a solid fill print during repeated testing at a sliding velocity of 2 inches per minute. It is also believed that enhanced performance during blocking and gauging tests, as well as excellent foldability of printed surfaces will be observed.

EXAMPLE X

In a 250 milliliter beaker, 96.94 grams of the silicone wax 41M70 (obtained from PCR, Inc., now Clariant Corp., Gainesville, Fla.) were heated to 85° C. and stirred at a high speed using a dispersion blade. After the wax had been completely turned into a liquid, 18.47 grams of a powder containing PMMA beads with an average diameter of 1.5 microns (MX-150, obtained from Esprit, Sarasota, Fla.) were added. Also during this process, 1.68 grams of amino-functionalized silicone oil (COPY AID® 300, obtained from Wacker Silicones Corp., Adrian, Mich.) were added. The mixture was then stirred at high speed for 30 minutes. Afterwards, the mixture was cast into an aluminum mold and solidified. The resulting intermediate transfer wax stick had a mass of 76 grams and contained 82.8% silicone wax 41M70, 15.8% PMMA beads MX-150, and 1.4% amino functionalized silicone oil.

EXAMPLE XI

In a 250 milliliter beaker, 102 grams of the silicone wax 41M70 (obtained from PCR, Inc., now Clariant Corp., Gainesville, Fla.) were heated to 65° C. and stirred at a high speed using a dispersion blade. After the wax had been completely turned into a liquid, 20 grams of a powder containing PMMA beads with an average diameter of 1.5 microns (MX-150, obtained from Esprit, Sarasota, Fla.) were added. The mixture was then stirred at high speed for 15 minutes. Afterwards, the mixture was cast into an aluminum mold and solidified. The resulting intermediate transfer wax stick had a mass of 71 grams and contained 16.4% PMMA beads MX-150.

EXAMPLE XII

In a 250 milliliter beaker, 100 grams of the silicone wax 41M70 (obtained from PCR, Inc., now Clariant Corp., Gainesville, Fla.) were heated to 65° C. and stirred at a high speed using a dispersion blade. After the wax had been completely turned into a liquid, 20 grams of a powder containing kaolin clay with an effective average diameter of 2 microns (Lithosperse 7015 HS, obtained from J. M. Huber Corp., Macon, Ga.) were added. The mixture was then stirred at high speed for 15 minutes. Afterwards, the mixture was cast into an aluminum mold and solidified. The resulting intermediate transfer wax stick had a mass of 83 grams and contained 16.8% kaolin clay Lithosperse 7015.

EXAMPLE XIII

In a 250 milliliter beaker, 100 grams of the silicone wax 41M70 (obtained from PCR, Inc., now Clariant Corp., Gainesville, Fla.) were heated to 85° C. and stirred. After the wax had been completely turned into a liquid, it was cast into an aluminum mold and solidified. The resulting intermediate transfer wax stick had a mass of 71 grams. It was inserted into the drum maintenance unit of an experimental printer, and prints with a phase-change ink were made, using a drum temperature of 63° C.

EXAMPLE XIV

In a 250 milliliter beaker, 157.31 grams of the silicone wax 41M70 (obtained from PCR, Inc., now Clariant Corp., Gainesville, Fla.) were heated to 85° C. and stirred at a high speed using a dispersion blade. After the wax had been completely turned into a liquid, 7.31 grams of amino-functionalized silicone oil (COPY AID® 300, obtained from Wacker Silicones Corp., Adrian, Mich.) were added. The mixture was then stirred at high speed for 30 minutes. Afterwards, the mixture was cast into an aluminum mold and solidified. The resulting intermediate transfer wax stick had a mass of 69 grams, and contained 4.4% amino functionalized silicone oil. It was inserted into the drum maintenance unit of an experimental printer, and prints with a phase-change ink were made, using a drum temperature of 63° C.

Other embodiments and modifications may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A block of intermediate transfer material for use in a printing apparatus having (a) an intermediate transfer member having a surface with a first shape; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

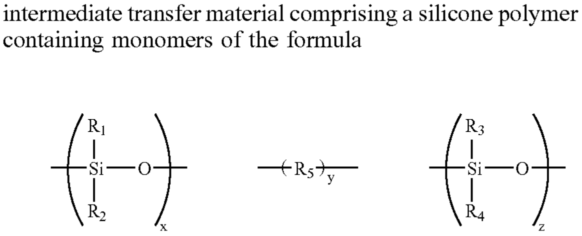

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_2$ has at least about 12 carbon atoms, wherein $R_1+R_2$ have a total number of carbon atoms ot no more than about 100, $R_3$ and $R_4$ each, independently ot the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others, are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape capable of coming into operative contact with the intermediate transfer surface, wherein the second shape is substantially the complement of the first shape.

2. A block according to claim 1 wherein the second shape is an arc.

3. A block according to claim 1 wherein at least one of $R_1$ and $R_2$ has at least about 28 carbon atoms.

4. A block according to claim 1 wherein at least one of $R_1$ and $R_2$ has from about 12 carbon atoms to about 28 carbon atoms.

5. A block according to claim 1 wherein the total number of carbon atoms in $R_3+R_4$ is no more than about 10.

6. A block according to claim 1 wherein the total number of carbon atoms in $R_3+R_4$ is no more than about 2.

7. A block according to claim 1 wherein $R_1$ and $R_2$ each, independently of the other, are hydrogen atoms, hydroxy groups, unsubstituted alkyl groups, substituted alkyl groups, unsubstituted aryl groups, substituted aryl groups, unsubstituted arylalkyl groups, substituted arylalkyl groups, unsubstituted alkylaryl groups, or substituted alkylaryl groups, $R_3$ and $R_4$ each, independently of the other, are hydrogen atoms, hydroxy groups, unsubstituted alkyl groups, substituted alkyl groups, unsubstituted aryl groups, substituted aryl groups, unsubstituted arylalkyl groups, substituted arylalkyl groups, unsubstituted alkylaryl groups, or substituted alkylaryl groups, and $R_5$ is an unsubstituted alkylene group, a substituted alkylene group, an unsubstituted arylene group, a substituted arylene group, an unsubstituted arylalkylene group, a substituted arylalkylene group, an unsubstituted alkylarylene group, or a substituted alkylarylene group.

8. A block according to claim 1 wherein $R_1$ and $R_2$ each, independently of the other, are hydrogen atoms, hydroxy groups, alkyl groups having no hetero atoms therein, alkyl groups having heteroatoms therein, aryl groups having no hetero atoms therein, aryl groups having hetero atoms therein, arylalkyl groups having no hetero atoms therein, arylalkyl groups having hetero atoms therein, alkylaryl groups having no hetero atoms therein, or alkylaryl groups having hetero atoms therein, $R_3$ and $R_4$ each, independently of the other, are hydrogen atoms, hydroxy groups, alkyl groups having no hetero atoms therein, alkyl groups having hetero atoms therein, aryl groups having no hetero atoms therein, aryl groups having hetero atoms therein, arylalkyl groups having no hetero atoms therein, arylalkyl groups having hetero atoms therein, alkylaryl groups having no hetero atoms therein, or alkylaryl groups having hetero atoms therein, and $R_5$ is an alkylene group having no hetero atoms therein, an alkylene group having hetero atoms therein, an arylene group having no hetero atoms therein, an arylene group having hetero atoms therein, an arylalkylene group having no hetero atoms therein, an arylalkylene group having hetero atoms therein, an alkylarylene group having no hetero atoms therein, or an alkylarylene group having hetero atoms therein.

9. A block according to claim 1 wherein the silicone polymer has terminal groups selected from the group consisting of (a) —H, (b) —OH, (c) $—OC_nH_{2n+1}$ wherein n is an integer of from 1 to about 20, (d) $—C_nH_{2n+1}$ wherein n is an integer of from 1 to about 20, (e) $—C_nH_{2+1}OH$ wherein n is an integer of from 1 to about 20, (f) $—C_nH_{2n+1}NH_2$ wherein n is an integer of from 1 to about 20, (g)

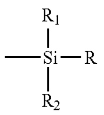

groups wherein R is (I) $—C_nH_{2n+1}$ wherein n is an integer of from 1 to about 20, (II) $—C_nH_{2n+1}OH$ wherein n is an integer of from 1 to about 20, or (III) $C_nH_{2n+1}NH_2$ wherein n is an integer of from 1 to about 20, (h)

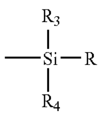

groups wherein R is (I) $—C_nH_{2n+1}$ wherein n is an integer of from 1 to about 20, (II) $—C_nH_{2n+1}OH$ wherein n is an integer of from 1 to about 20, or (III) $—C_nH_{2n+1}NH_2$ wherein n is an integer of from 1 to about 20, and (i) mixtures thereof.

10. A block according to claim 1 wherein x is at least about 1 and wherein y and z each may be 0 but may also be greater than 0, provided that at least 2 monomer units are present in the silicone polymer.

11. A block according to claim 1 wherein x may be 0 but may also be greater than 0, y is at least 1, and z is at least 1.

12. A block according to claim 1 wherein the polymer is selected from the group consisting of (a) block, random, and alternating copolymers containing monomers of the formula

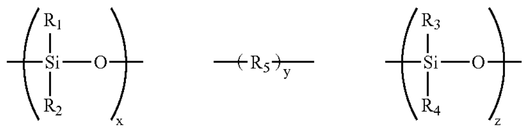

wherein the monomers can appear in any order and wherein x is at least 1 and y and z are each at least 1; (b) block, alternating, and random copolymers containing monomers of the formula

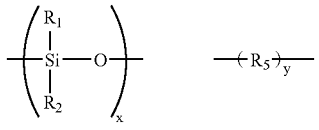

wherein x is at least 1 and y is at least 1; (c) block copolymers containing monomers of the formula

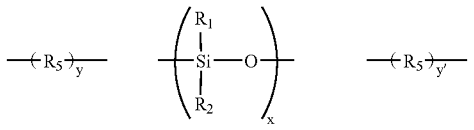

wherein the monomers are in blocks in the order shown and wherein x is at least 1 and y and y are each at least 1; (d) block copolymers containing monomers of the formula

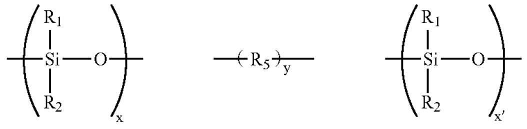

wherein the monomers are in blocks in the order shown and wherein x and x' are each at least 1 and y is at least 1; (e) block, alternating, and random copolymers containing monomers of the formula

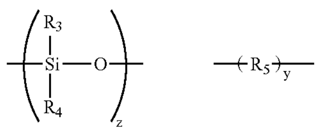

wherein y and z are each at least 1; (f) block copolymers containing monomers of the formula

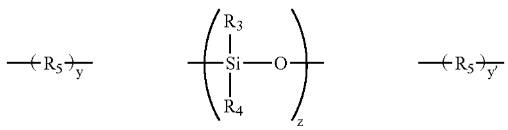

wherein the monomers are in blocks in the order shown and wherein z, y, and y are each at least 1; (g) block copolymers containing monomers of the formula

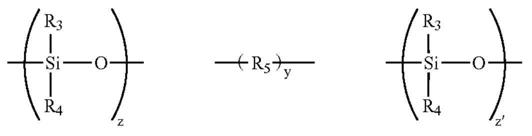

wherein the monomers are in blocks in the order shown and wherein z, z', and y' are each at least 1; (h) homopolymers containing monomers of the formula

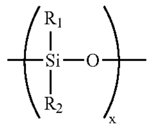

wherein x is at least 2; and (i) mixtures thereof.

13. A block according to claim 1 wherein at least some of the monomers are bonded to each oilier through spacer groups.

14. A block according to claim 13 wherein at least some of the spacer groups are of the formula $—R_7—$ wherein $R_7$ is an alkylene group, an arylene group, an arylalkylene group, or an alkylarylene group.

15. A block according to claim 14 wherein $R_7$ is an unsubstituted alkylene group, an unsubstituted arylene group, an unsubsittuted arylalkylene group, or an unsubstituted alkylarylene group.

16. A block according to claim 14 wherein $R_7$ is a substituted alkylene group, a substituted arylene group, a substituted arylalkylene group, or a substituted alkylarylene group.

17. A block according to claim 14 wherein $R_7$ is an alkylene group having no hetero atoms therein, an arylene group having no hetero atoms therein, an arylalkylene group having no hetero atoms therein, or an alkylarylene group having no hetero atoms therein.

18. A block according to claim 14 wherein $R_7$ is an alkylene group having hetero atoms therein, an arylene group having hetero atoms therein, an arylalkylene group having heteroatoms therein, or an alkylarylene group having hetero atoms therein.

19. A block according to claim 13 wherein at least some at the spacer groups are of the formula $—CH_2—CH_2—CH_2—.$

20. A block according to claim 13 wherein at least some of the spacer groups are of the formulae

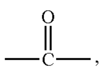, 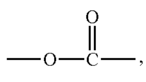, 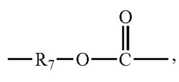, or mixtures thereof, wherein $R_7$ is an alkylene group, an arylene group, an arylalkylene group, or an alkylarylene group.

21. A block according to claim 13 wherein at least some of the spacer groups are of the formulae

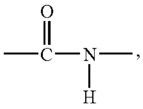, 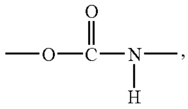,

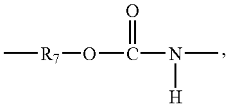, or mixtures thereof, wherein $R_7$ is an alkylene group, an arylene group, an arylalkylene group, or an alkylarylene group.

22. A block according to claim 13 wherein at least some of the spacer groups are of the formula

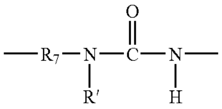

wherein $R_7$ is an alkylene group, an arylene group, an arylalkylene group, or an alkylarylene group and wherein R' is an alkyl group, an aryl group, an arylalkyl group, or an alkylaryl group.

23. A block according to claim 1 wherein the silicone polymer has a number average molecular weight of at least about 400.

24. A block according to claim 1 wherein the silicone polymer has a number average molecular weight of at least about 800.

25. A block according to claim 1 wherein the silicone polymer has a number average molecular weight of at least about 1,000.

26. A block according to claim 1 wherein the silicone polymer has a number average molecular weight of no more than about 40,000.

27. A block according to claim 1 wherein the silicone polymer has a number average molecular weight of no more than about 25,000.

28. A block according to claim 1 wherein the silicone polymer has a number average molecular weight of no more than about 8,000.

29. A block according to claim 1 wherein the intermediate transfer material has a melting point of at least about 30° C.

30. A block according to claim 1 wherein the intermediate transfer material has a melting point of at least about 35° C.

31. A block according to claim 1 wherein the intermediate transfer material has a melting point of at least about 40° C.

32. A block according to claim 1 wherein the intermediate transfer material has a melting point of no more than about 90° C.

33. A block according to claim 1 wherein the intermediate transfer material has a melting point of no more than about 55° C.

34. A block according to claim 1 wherein the intermediate transfer material has a melting point of no more than about 45° C.

35. A block according to claim 1 wherein the intermediate transfer material further comprises at least one material selected from UV absorbers, UV protectors, overcoat varnishes, viscosity modifiers, intermediate transfer oils, intermediate transfer waxes, antioxidants, plasticizers, tougheners, colorant or mixtures thereof.

36. A block of intermediate transfer material for use in a printing apparatus having (a) an intermediate transfer member having a surface with a first shape; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

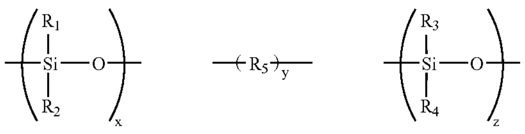

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_1$ has at least about 12 carbon atoms, wherein $R_1+R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others, are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape capable of coming into operative contact with the intermediate transfer surface, wherein the second shape is substantially the complement of the first shape, wherein at least some of the monomers are bonded to each other through spacer groups, wherein at least some of the spacer groups are of the formulae

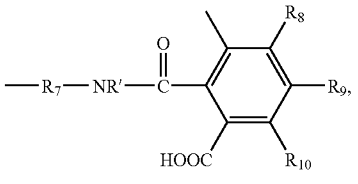

-continued

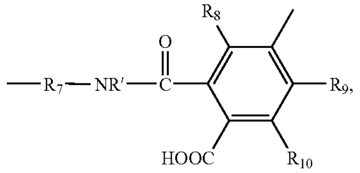

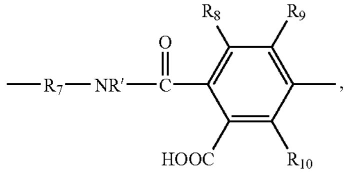

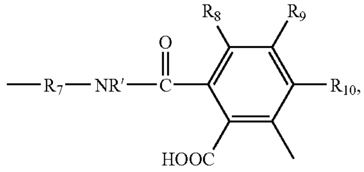

or mixtures thereof, wherein $R_7$ is an alkylene group, an arylene group, an arylalkylene group, or an alkylarylene group, R' is an alkyl group, an aryl group, an arylalkyl group, or an alkylaryl group, and $R_8$, $R_9$, and $R_{10}$ each, independently of the others, are hydrogen atoms, hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, oxiran groups, alkyl groups, aryl groups, arylalkyl groups, or alkylaryl groups.

37. A block of intermediate transfer material for use in a printing apparatus having (a) an intermediate transfer member having a surface with a first shape; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, sold block of intermediate transfer material comprising a silicone polymer containing monomers of the formula

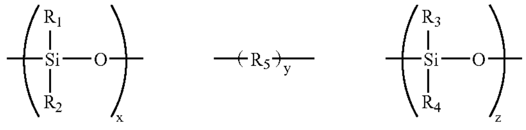

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_1$ has at least about 12 carbon atoms, wherein $R_1+R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape capable of coming into operative contact with the intermediate transfer surface, wherein the second shape is substantially the complement of the first shape, wherein at least some of the monomers are bonded to each other through spacer groups, wherein at least some of the spacer groups are of the formula

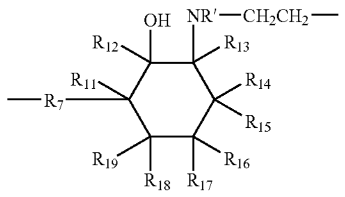

wherein $R_7$ is an alkylene group, an arylene group, an arylalkylene group, or an alkylarylene group, R' is an alkyl group, an aryl group, an arylalkyl group, or an alkylaryl group, and $R_{11}$, $R_{12}$, $R_{13}$, $R_{14}$, $R_{15}$, $R_{16}$, $R_{17}$, $R_{18}$, and $R_{19}$ each, independently of the others are hydrogen atoms, hydroxy groups, halogen atoms, amine groups, imine groups, ammonium groups, azo groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, cyanato groups, isocyanato groups, thiocyanato groups, isothiocyanato groups, oxiran groups, alkyl groups, aryl groups, arylalkyl groups, or alkylaryl groups.

38. A block of intermediate transfer material for use in a printing apparatus having (a) an intermediate transfer member having a surface with a first shape; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

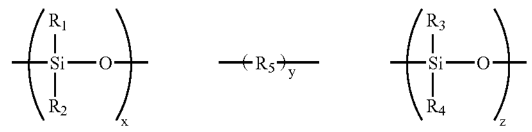

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_2$ has at least about 12 carbon atoms, wherein $R_1+R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape capable of coming into operative contact with the intermediate transfer surface, wherein the second shape is substantially the complement of the first shape, wherein the silicone polymer is selected from the group consisting of (a) those of the formula

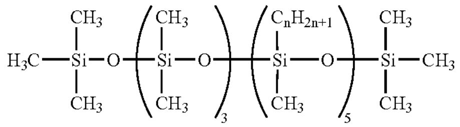

wherein n is from about 20 to about 24, (b) those of the formula

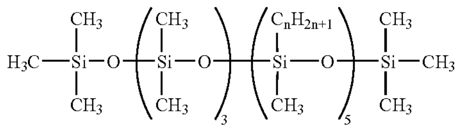

wherein n is from about 24 to about 28, (c) those of the formula

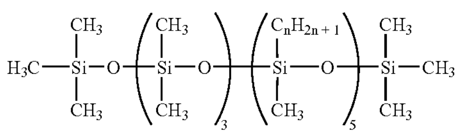

wherein n is 18, (d) those of the formula

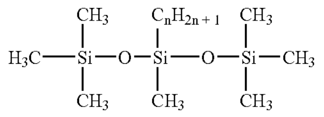

wherein n is from about 20 to about 24, (e) those of the formula

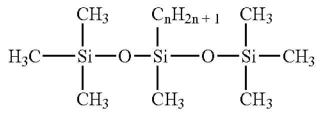

wherein n is from about 24 to about 28, (f) those of the formula

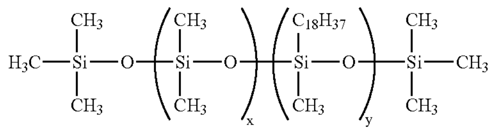

wherein x represents the number of polydimethylsiloxane repeat units and y represents the number of poly(methyl stearyl)siloxane repeat units, (g) those of the formula

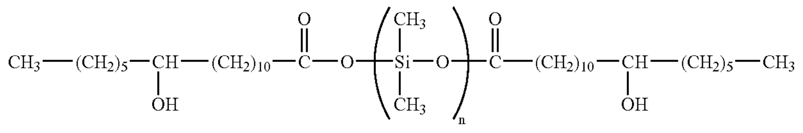

wherein n is an integer of from 1 to about 50, (h) those of the formula

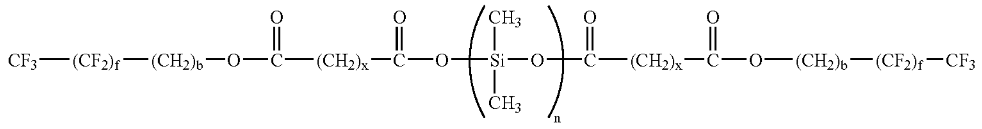

wherein n is an integer of from 1 to about 50, b is an integer representing the number of repeat —$CH_2$— units, and f is an integer representing the number of repeat —$CF_2$— units, (i) those of the formula

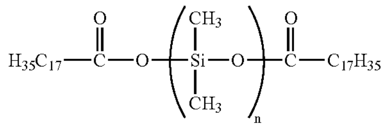

wherein n is an integer of from 1 to about 50, and(j) mixtures thereof.

39. A block of intermediate transfer material for use in a printing apparatus having (a) an intermediate transfer member having a surface with a first shape; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

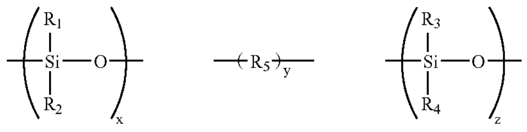

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_1$ has at least about 12 carbon atoms, wherein $R_1$+$R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3$+$R_4$ have a total number of carbon atoms of no more than about 20, $R_5$ is an alkylene group, an arylene group, an arylalkylene group, an alkylarylene group, and x, y, and z each, independently of the others are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape capable of coming into operative contact with the intermediate transfer surface, wherein the second shape is substantially the complement of the first shape, wherein the silicone polymer is selected from the group consisting of (a) those of the formula

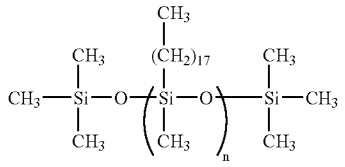

wherein n=22-30; (b) those of the formula

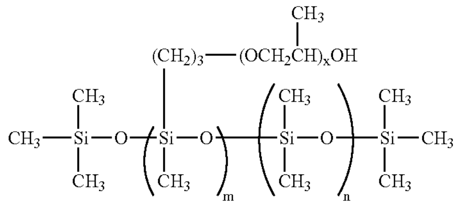

wherein m=7-9, n=17-19, and x has an average value of from about 1.4 to about 1.8; (c) those of the formula

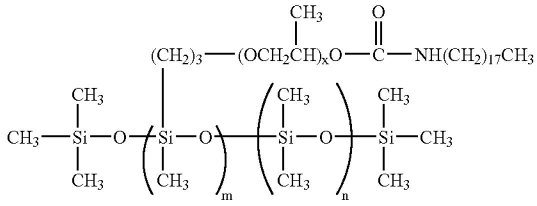

wherein m=7-9, n=17-19, and x has an average value of from about 1.4 to about 1.8; (d) those of the formula

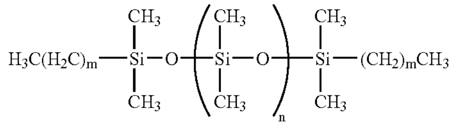

wherein m is from about 17 to about 21 and n=3-5; (e) those of the formula

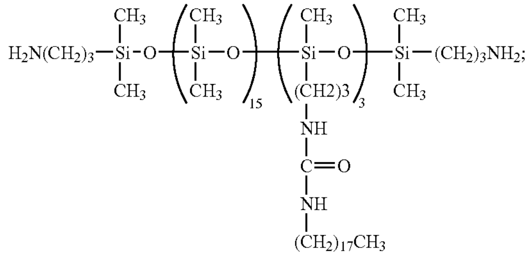

(f) those of the formula

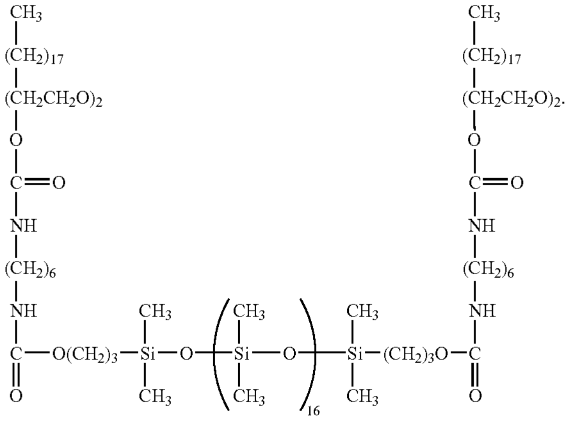

(g) those of the formula

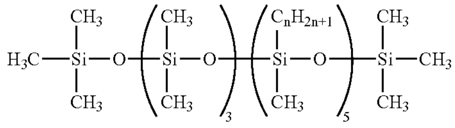

wherein n is from about 24 to about 28; and (h) mixtures thereof.

40. A block of intermediate transfer material for use in a printing apparatus having (a) an intermediate transfer member having a surface with a first shape; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise paffern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

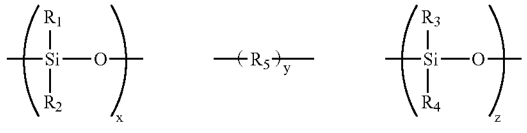

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_2$ has at least about 12 carbon atoms, wherein $R_1+R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others, are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape capable of coming into operative contact with the intermediate transfer surface, wherein the second shape is substantially the complement of the first shape, wherein the intermediate transfer material further comprises at least one reactive material that can be crosslinked by application of ultraviolet radiation, infrared radiation, light in the visible wavelength range, e-beam radiation, X-ray radiation, heat, moisture, additional reactants, or combinations thereof.

41. A block according to claim 40 wherein the reactive material is present in the intermediate transfer material in an amount of at least about 0.1 percent by weight of the intermediate transfer material.

42. A block of intermediate transfer material for use in a printing apparatus having (a) an intermediate transfer member having a surface with a first shape; (b) an intermediate transfer material applicator for transferring intermediate transfer material from a solid block of intermediate transfer material to form a molten layer of intermediate transfer material on the intermediate transfer member; (c) a marking material applicator situated to apply marking material in an imagewise pattern to the molten layer of intermediate transfer material on the intermediate transfer member; and (d) a transferring apparatus to transfer the imagewise pattern of marking material to a final recording substrate, said block of intermediate transfer material comprising a silicone polymer containing monomers of the formula

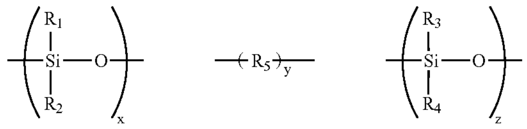

wherein $R_1$ and $R_2$ each, independently of the other, are hydrogen atoms, hydroxy groups, alkyl groups, aryl groups, arylalkyl groups, or alkylaryl groups, provided that at least one of $R_1$ and $R_2$ has at least about 12 carbon atoms, wherein $R_1+R_2$ have a total number of carbon atoms of no more than about 100, $R_3$ and $R_4$ each, independently of the other, are hydrogen atoms, hydroxy groups, alkyl groups, aryl groups, arylalkyl groups, or alkylaryl groups, wherein $R_3+R_4$ have a total number of carbon atoms of no more than about 20, $R_5$ is an alkylene group, an arylene group, an arylalkylene group, an alkylarylene group, and x, y, and z each, independently of the others, are integers representing the number of repeat monomer units, wherein either (a) x is at least about 1 and wherein y and z each may be 0 but may also be greater than 0, provided that at least 2 monomer units are present in the silicone polymer, or (b) x may be 0 but may also be greater than 0, y is at least 1, and z is at least 1, wherein the monomers can be either directly bonded to each other or bonded to each other through spacer groups, said block of intermediate transfer material having a surface with a second shape capable of coming into operative contact with the intermediate transfer surface, wherein the second shape is substantially the complement of the first shape, wherein the intermediate transfer material further comprises small particles.

43. A block according to claim 42 wherein the small particles are present in the intermediate transfer material in an amount of at least about 0.1 percent by weight.

44. A block according to claim 42 wherein the small particles have an average particle diameter of at least about 0.1 micron.

45. A block according to claim 42 wherein the small particles have an average particle diameter of no more than about 80 microns.

* * * * *